US012799298B2

(12) United States Patent
Furgal et al.

(10) Patent No.: US 12,799,298 B2
(45) Date of Patent: Nov. 17, 2026

(54) FLUORIDE CATALYZED POLYSILOXANE DEPOLYMERIZATION

(71) Applicant: Bowling Green State University, Bowling Green, OH (US)

(72) Inventors: Joseph Coy Furgal, Bowling Green, OH (US); Buddhima Rupasinghe, Bowling Green, OH (US)

(73) Assignee: Bowling Green State University, Bowling Green, OH (US)

( * ) Notice: Subject to any disclaimer, the term of this patent is extended or adjusted under 35 U.S.C. 154(b) by 574 days.

(21) Appl. No.: 18/274,768

(22) PCT Filed: Jan. 31, 2022

(86) PCT No.: PCT/US2022/014500
§ 371 (c)(1),
(2) Date: Jul. 28, 2023

(87) PCT Pub. No.: WO2022/165305
PCT Pub. Date: Aug. 4, 2022

(65) Prior Publication Data

US 2024/0117143 A1 Apr. 11, 2024

Related U.S. Application Data

(60) Provisional application No. 63/144,074, filed on Feb. 1, 2021.

(51) Int. Cl.

| | |
|---|---|
| ***C08J 11/16*** | (2006.01) |
| ***C07F 7/21*** | (2006.01) |
| ***C08G 77/00*** | (2006.01) |
| ***C08G 77/06*** | (2006.01) |

(52) U.S. Cl.
CPC ................ *C08J 11/16* (2013.01); *C07F 7/21* (2013.01); *C08G 77/06* (2013.01); *C08G 77/80* (2013.01); *C08J 2383/04* (2013.01)

(58) Field of Classification Search
USPC ........................................................ 521/47.5
See application file for complete search history.

(56) References Cited

U.S. PATENT DOCUMENTS

| | | | |
|---|---|---|---|
| 5,674,963 | A | 10/1997 | Friebe |
| 5,747,624 | A | 5/1998 | Rubinsztajn et al. |
| 5,772,788 | A | 6/1998 | Ikeda et al. |
| 6,001,888 | A | 12/1999 | Friebe et al. |
| 6,448,360 | B2 | 9/2002 | Okawa et al. |
| 2009/0281202 | A1 | 11/2009 | Perry et al. |
| 2010/0222503 | A1 | 9/2010 | Aine et al. |
| 2014/0120243 | A1 | 5/2014 | Laine et al. |
| 2018/0265819 | A1 | 9/2018 | Kang et al. |
| 2022/0348721 | A1 | 11/2022 | Knott et al. |

FOREIGN PATENT DOCUMENTS

| | | | |
|---|---|---|---|
| CN | 108727590 | A | 11/2018 |
| EP | 0523323 | A1 | 1/1993 |
| EP | 1008621 | A2 | 6/2000 |
| JP | H07292114 | A | 11/1995 |
| KR | 20160070385 | A | 6/2016 |
| WO | 2008097306 | A1 | 8/2008 |
| WO | 2014130948 | A1 | 8/2014 |

OTHER PUBLICATIONS

Enthaler, “Iron-Catalyzed Depolymerization of Polysiloxanes to Produce Dichlorodimethylsilane, or Dimethoxydimethylsilane”, Journal of Applied Polymer Science, 2015, pp. 1-8.
Ronchi et al., “Fluoride catalyzed rearrangements of polysilsesquioxanes, mixed Me, vinyl T8, Me, vinyl T10 and T12 cages”, Applied Organometallic Chemistry, 2010, vol. 24, pp. 551-557.
Chang et al., “Nucleophilic Cleavage of Crosslinked Polysiloxanes to Cyclic Siloxane Monomers: Mild Catalysis by a Designed Polar Solvent System”, Journal of Polymer Research, 2005, vol. 12, pp. 433-438.
The Extended European Search Report, Application No. 227467826, dated May 22, 2025.
Krug III, “Synthesis, Recycling, and Modification of Thermoset Silicone Resins via Fluoride Ion Catalyzed Rearrangement”, A dissertation submitted in partial fulfillment of the requirements for the degree of Doctor of Philosophy, (Macromolecular Science and Engineering), The University of Michigan, 2019, pp. 1-154.
Krug et al., “Facile Approach to Recycling Highly Cross-Linked Thermoset Silicone Resins under Ambient Conditions”, ACS Omega, 2019, vol. 4, pp. 3782-3789.
Japanese Office Action, Application No. JP2023546415, dated Feb. 24, 2026.

*Primary Examiner* — Terressa Boykin

(74) *Attorney, Agent, or Firm* — MacMillan, Sobanski & Todd, LLC

(57) ABSTRACT

Methods and kits for depolymerizing a siloxane polymer, and methods for recycling a material comprising silicone, are described.

28 Claims, 64 Drawing Sheets
(48 of 64 Drawing Sheet(s) Filed in Color)

PDMS → $D_4$ or $D_5$ or $D_6$

PMPS

Mn ~ 2700 $gmol^{-1}$ $D^{Ph}{}_4$ or $D^{Ph}{}_5$

FLUORIDE CATALYZED POLYSILOXANE DEPOLYMERIZATION

RELATED APPLICATIONS

This is the national phase application of international application PCT/US2022/014500, filed under the authority of the Patent Cooperation Treaty on Aug. 4, 2022, published; which claims priority to U.S. Provisional Application No. 63/144,074, filed under 35 U.S.C. § 111(b) on Feb. 1, 2021. The entire disclosure of each of the aforementioned applications is incorporated herein by reference for all purposes.

STATEMENT REGARDING FEDERALLY SPONSORED RESEARCH

This invention was made with no government support. The government has no rights in this invention.

BACKGROUND

From the beginning of life, numerous polymers, both natural and artificial, have surrounded us. In 1872, Ladenburg found polysiloxane, an organosilicon polymer which connects through Si and O atoms. The hybrid nature of siloxanes with organic and inorganic components leads to unique properties not possible with other materials. Furthermore, the number of organic substituents attached to the silicon atom decides the functionality of the polymer. For instance, if the silicon atom does not attach to any oxygen atoms, it is called a nonfunctional organosilicon compound. Likewise, mono (M), di (D), tri (T), and tetra (Q) functional compounds can be formed based on the oxygen valency to the silicon atom. In other words, the properties of these siloxanes mainly depend on the type of organic substituents attached to the siloxane polymer and nature of Si—O bonding in the polymer. As a result, polysiloxanes have become widely used exceptional polymers due to their excellent physical, chemical, and mechanical properties, as well as their thermal stability and low-toxicity, important in medical, cosmetic, aerospace, and other high tech industries. Noteworthy, the "classical" products of the polysiloxanes are polydimethylsiloxanes and to a smaller extent polyphenylmethylsiloxanes, as they make up the majority of technical products.

Due to high and low-temperature resistance, suitable siloxanes can be heated up to 200° C. for a year, and even short terms at 450° C., without degradation. This, as well as a high degree of chemical inertness, makes them especially difficult to degrade and recycle controllably. This is due to the strength of the Si—O bond, which is 452 kJ/mol. Thus, despite the usefulness of siloxane based polymeric materials, a critical issue is the accumulation of these materials in the environment, and the need to instead recycle them effectively, which has thus far been challenging. The current methods used to recycle silicone-based materials such as polydimethylsiloxane (PDMS) involve high temperatures and complicated setups.

End of life accumulation is a crucial problem as it goes through long, slow degradation pathways in nature. Consequently, land filling, various depolymerization processes, and downcycling methods are used to address the end life accumulation. One of the biggest reasons to care about recyclability is that the synthesis of siloxanes is an energy intensive process. Most of these synthetic methods involve inefficient, non-ecofriendly, or high energy cost methods. For instance, polysiloxanes are generally prepared by ring opening polymerization, which involves 250° C. to 600° C. heating and 4 atm to 8 atm pressures. Recycling of silicones that have already been made into consumer or industrial materials is still not well explored. Therefore, there is an urgent need to find efficient and mild reaction conditions to recycle these polymers to decrease the environmental impact.

Over the years, silicon chemists have attempted silicone depolymerization and cleavage using several chemical reagents and most often thermal energy. The methods of depolymerization and polymerization of siloxanes are similar in their first step (the scission of the siloxane bond). Differences in operating conditions such as temperature, pressure, catalytic activity, or type of catalyst give an equilibrium stability relationship between the initial and final products. The first step of both processes is to open up siloxane bonds when polymerizing from cyclic monomers.

Although thermal polymerization of low molecular weight cyclic siloxane compounds occur at 250-300° C. under their own vapor pressures in a closed system, depolymerization of higher molecular weight polysiloxanes occurs at even higher temperatures and pressures. For instance, mixtures of cyclic polydimethylsiloxanes n=3 to n=8 degrade at 350-400° C. in vacuum (~20 mmHg). Depolymerization from steam can form specific length siloxanols from high molecular weight polydimethylsiloxanes at 200-220° C. Also, the depolymerization reaction time or heating time of the steam determines the fragment size of linear siloxanols.

Breakage of the siloxane bond from primary or secondary alcohols and acid or an alkaline catalyst in the presence of heat can depolymerize high molecular weight polydimethylsiloxanes to alkoxysilanes and are the most common reactions for siloxane depolymerization. However, depolymerization from alcohols is an equilibrium reaction and therefore, to make it efficient, the rection needs continuous removal of the byproduct water, and also usage of stoichiometric amounts of chlorides and amines, leading to environmentally unfriendly reactions.

Depolymerization of high molecular weight polysiloxanes from stoichiometric Bronsted or Lewis acids results in organohalosilanes and heterosiloxanes with the help of heat. In this process the electron deficient acid attaches itself to the electron rich oxygen atom, which weakens the Si—O bond, resulting in cleavage. Depolymerization of polydimethylsiloxane with $AlCl_3$, reaction with A1:Si ratio with 1:1 in hexane at room temperature yielded a large amount of colorless crystals of $[\{ClSiMe_2OAlCl_2\}_2]$. However, as per the reaction ratios, $AlCl_3$ is not used in catalytic amounts, and the products are difficult to reuse.

Siloxane polymerization and subsequent cleavage also occurs in alkali conditions with heat. While alkaline polymerization occurs below 250° C., their depolymerization occurs around 400° C. For example, even a small amount of NaOH (0.1%) can depolymerize higher molecular weight polydimethylsiloxane to cyclic trimers and tetramers. A complex metal hydride cleavage with lithium tetrahydroaluminate was observed for linear polysiloxanes, where lithium tetrahydroaluminate in ether is able to cleave linear polysiloxane polymers if the polymer is added dropwise under heat. Elution of $(CH_3)_2SiH_2$ gas and the conversion of the siloxane bond to the aluminosiloxane bond is observed during the reaction. While effective, the evolution of flammable gases is not ideal for simple recycling methods.

There remains a need in the art for better methods of depolymerizing and recycling siloxane polymers.

SUMMARY

Provided is a method of depolymerizing a siloxane polymer, the method comprising immersing the siloxane polymer in a solvent, incorporating a source of fluoride into the solvent, allowing a reaction between the fluoride and the siloxane polymer to cause rearrangement of the siloxane polymer into a cyclic monomer, and quenching the reaction to prevent repolymerization of the cyclic monomer.

In certain embodiments, the source of fluoride comprises an ionic liquid. In certain embodiments, the source of fluoride comprises tetrabutylammonium fluoride (TBAF). In certain embodiments, the source of fluoride comprises TBAF, hydrogen fluoride, ammonium fluorides, hydrogen dialkylammonium fluoride ($NR_2H_2F$), hydrogen trifluoride ammonium ($NR_3(3HF)$), alkali metal salts (e.g., LiF, NaF, KF), alkaline earth metal salts (e.g., $CaF_2$, $MgF_2$), alkyl hydrogen fluoride, hydrogen dialkylammonium fluoride, 1-fluoro-4-chloromethyl-1,4-diazoniabicyclo[2.2.2]octane bis (tetrafluoroborate) (trade name Accufluor®), N,N'-difluoro-2,2'-bipyridinium bis(tetrafluoroborate), diethylaminosulfur trifluoride (DAST), $R_aR_bN—CF_2—R_c$ where $R_a$ is hydrogen or alkyl and $R_b$ and $R_c$ are each selected from alkyl or aryl (tradename Fluorinox®), 1-fluoro-4-chloromethyl-1, 4-diazoniabicyclo[2.2.2]octane bis (tetrafluoroborate) (trade name Selectfluor®), or a combination thereof.

In certain embodiment, the source of fluoride is incorporated into the solvent prior to immersing the siloxane polymer in the solvent. In certain embodiments, the source of fluoride is incorporated into the solvent after immersing the siloxane polymer in the solvent.

In certain embodiments, the quenching comprises adding a salt to the solvent and stirring for at least about 30 minutes. In particular embodiments, the salt is a chloride salt. In particular embodiments, the salt comprises $CaCl_2$. In particular embodiments, the salt comprises $CaCl_2$, AgCl, NaCl, KCl, chlorotrimethylsilane (TMSCl), or a combination thereof. In particular embodiments, the salt comprises an iodide, a chromate, a bromide, a sulfide, a carbonate, a sulfate, a phosphate, a hydroxide, or a combination thereof.

In certain embodiments, the quenching comprises an aqueous wash, where the aqueous wash comprises adding water to the solvent to form two phases.

In certain embodiments, the quenching comprises scavenging remaining fluoride ions and stopping the depolymerization.

In certain embodiments, the solvent is a network-penetrating liquid at room temperature and has intermediate polarity. In certain embodiments, the solvent comprises tetrahydrofuran (THF), dichloromethane (DCM), chloroform, acetone, 2-methyltetrahydrofuran, or toluene.

In certain embodiments, the reaction is at room temperature. In certain embodiments, the reaction is at a temperature ranging from about a freezing point of water to about a boiling point of the solvent. In particular embodiments, the solvent comprises tetrahydrofuran (THF), and the reaction is at a temperature ranging from about 0° C. to about 66° C. In particular embodiments, the solvent comprises dichloromethane (DCM), and the reaction is at a temperature ranging from about 0° C. to about 40° C. In particular embodiments, the solvent comprises 2-methyltetrahydrofuran, and the reaction is at a temperature ranging from about 0° C. to about 80° C. In particular embodiments, the solvent comprises acetone, and the reaction is at a temperature ranging from about 0° C. to about 56° C. In particular embodiments, the solvent comprises toluene, and the reaction is at a temperature ranging from about 0° C. to about 110° C.

In certain embodiments, the siloxane polymer is a linear siloxane polymer having Formula I:

Formula I

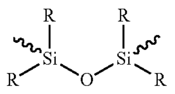

wherein each R is, independently, H or any organic group.

In certain embodiments, the siloxane polymer is a linear siloxane polymer comprising a silcoxy group that is methyl terminated, hydroxide terminated, vinyl terminated, or hydride terminated.

In certain embodiments, the siloxane polymer is a linear siloxane polymer having a structure of $R(CH_3)SiO[(CH_3)_2SiO]_x[(R^1)(R^2)SiO]_ySi(CH_3)_2R$, where R, $R^1$, and $R^2$ can be identical or different.

In certain embodiments, the siloxane polymer is a linear siloxane polymer having one of the following D units:

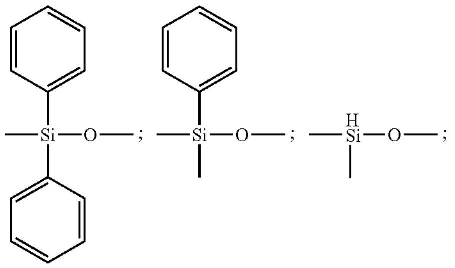

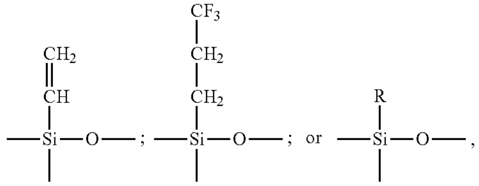

where R is a C2-C14 alkyl.

In certain embodiments, the cyclic monomer has one of Formula II, Formula III, or Formula IV:

Formula II

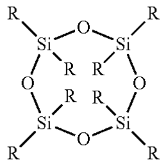

Formula III

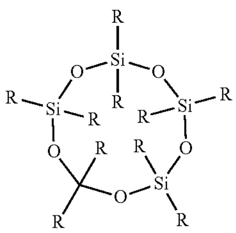

-continued

Formula IV

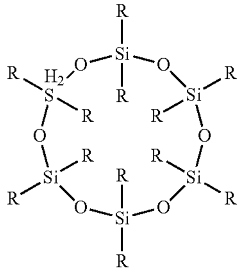

wherein each R is, independently, H or any organic group.

In certain embodiments, the siloxane polymer comprises polydimethylsiloxane (PDMS), phenylmethylsiloxane (PMPS), or polydiphenylsiloxane.

In certain embodiments, the cyclic monomer comprises $D_4$, $D_5$, $D_6$, $D^{Ph}{}_4$, or $D^{Ph}{}_5$:

$D_4$

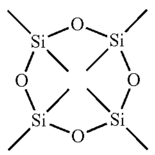

$D_5$

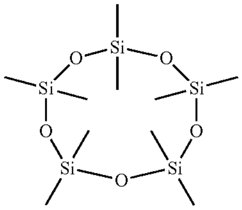

$D_6$

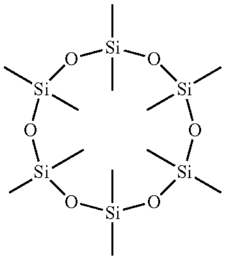

$D^{Ph}{}_4$

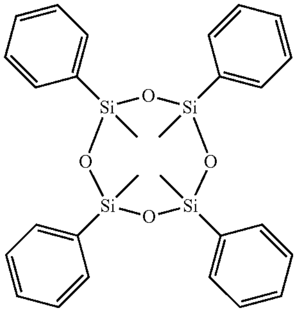

-continued $D^{Ph}{}_5$

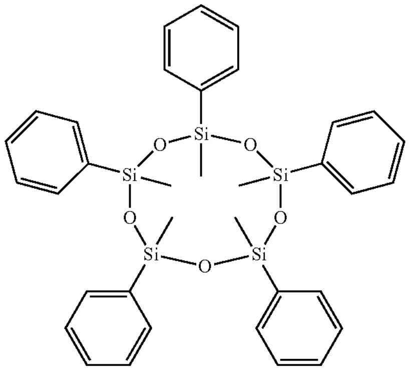

In certain embodiments, the reaction is allowed to proceed for at least about 20 minutes before the quenching. In certain embodiments, the reaction is allowed to proceed for at least about 45 minutes before the quenching.

In certain embodiments, the method further comprises repolymerizing the cyclic monomer. In particular embodiments, the repolymerizing comprises cationaic and anionic polymerization. Anionic polymerization may occur from lewis bases, and suitable catalysts include alkali metal oxides and hydroxides, and bases in general. Cationic polymerization may be carried out with strong protic or lewis acids. Perfluoroalkanesulfonic acids, like trifillic acid or sulfuric acids, are non-limiting examples suitable for this type of repolymerizing reactions.

In certain embodiments, the source of fluoride is incorporated into the solvent in an amount of up to about 2 mol %. In certain embodiments, the source of fluoride is incorporated into the solvent in an amount of about 0.5 mol %.

Further provided is a method of recycling a material comprising silicone and a second substance, the method comprising immersing the silicone in a solvent; incorporating a source of fluoride into the solvent; allowing a reaction between the fluoride and the silicone to cause rearrangement of a siloxane polymer into a cyclic monomer, thereby dissolving the silicone off of the second substance; quenching the reaction to prevent repolymerization of the cyclic monomer; and separating the second substance from the solvent containing the cyclic monomer. In certain embodiments, the reaction is at room temperature. In certain embodiments, the second substance comprises a second polymer. In certain embodiments, the material is immersed in the solvent.

Further provided is a kit for recycling a polysiloxane, the kit comprising a first container housing a solvent, and a second container housing a source of fluoride. In certain embodiments, the kit further comprises a quenching salt. In certain embodiments, the kit further comprises a repolymerization catalyst.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 6A shows the polymer region, and FIG. 6B shows the cyclics region.

FIG. 7A shows the $^{29}Si$ NMR spectrum of Wacker Elastosil 3003-40AB. A is $D_5$, B is $D_6$, and C is $D_4$. FIGS. 7B-7D show the GCMS of Wacker Elastosil 3003-40AB $D_5$ (FIG. 7B), $D_6$ (FIG. 7C), and $D_4$ (FIG. 7D).

FIG. 11A shows $^1H$ NMR spectra of $D_5$ at 300 MHz, showing one peak for the starting material. FIG. 11B shows $^{13}C$ NMR spectra of $D_5$ at 75.468 MHz, showing one peak for the starting material. FIG. 11C shows $^{29}Si$ NMR of $D_5$ at 59.6 MHz, showing a single peak. FIG. 11D shows GCMS of products of decamethylcyclopentasiloxane ($D_5$), showing the $D_6$, $D_5$ structures and small fragments. FIG. 11E shows GPC of the product of $D_5$ polymer, showing the negative peak due to the polymer.

FIG. 12A shows $^1H$ NMR spectra of the products of $D_5$ at 300 MHz. The peak at 1.5 ppm is for $H_2O$, the peak at 7.26 ppm is for the solvent, peak A is for $D_5$ and $D_6$ (seen as a doublet from the zoomed picture), peak B is for $D_4$ (de-shielded more due to the ring strain). It is noted that more small de-shielded proton peaks can be observed. This is due to the ring opened linear structure. Rearrangement, methyl peak at 0.4 ppm. FIG. 12B shows $^{13}C$ NMR spectra of the products of $D_5$ at 75.468 MHz, where Peak A is for $D_6$, peak B is for $D_5$, peak C is for $D_4$, and peak at 0.41 is for methyl radical carbon. FIG. 12C shows $^{29}Si$ NMR of the products of $D_5$ at 59.6 MHz, where peak A is for $D_4$, peak C is for $D_5$, and peak B is for $D_6$. −19.28 $D_4$, −21.69 $D_5$, −22.08 $D_6$. FIG. 12D shows GCMS of products of decamethylcyclopentasiloxane ($D_5$) rearrangement, where the $D_6$, $D_5$ structures and small fragments can be observed. FIG. 12E shows GPC of the products of $D_5$ polymer.

FIG. 13A shows MALDI-ToF of polyphenylmethylsiloxane polymer (Mn≈2700 $gmol^{-1}$) reactant, showing multiple weak peaks due to difficulty with flight. FIG. 13B shows GPC of the polyphenylmethylsiloxane polymer (Mn≈2700 $gmol^{-1}$) reactant, with polymeric pattern from the broad peak centered at 30.5 min.

FIG. 14A shows GCMS of the products of polyphenylmethylsiloxane, where the product 5 can be clearly observed. FIG. 14B shows GPC of polyphenylmethylsiloxane products, where the two peaks can be observed. FIG. 14C shows $^{29}Si$ NMR of polyphenylmethylsiloxane products; A is the $D^{Ph}{}_5$ and B is $D^{Ph}{}_4$.

FIG. 18A shows GPC graphs of polydimethylsiloxane~500 mw kinetic study, 2 g of polydimethylsiloxane polymer, 200 mL of THF, and 0.2 mL of TBAF under room temperature, after $CaCl_2$ quenched time points. FIG. 18B shows GPC of quenched time points from the kinetic study for depolymerization of polyphenylmethylsiloxane (PMPS).

FIG. 19A shows GCMS of the polydimethylsiloxane 500 mw, showing $D_4$, $D_5$, and $D_6$ cyclic structures. FIG. 19B shows GPC of the polydimethylsiloxane 500 mw, showing the depolymerization and main rearranged two peaks.

FIG. 20A shows GCMS of products of polydimethylsiloxane, in which the $D_4$, $D_5$, and $D_6$ structures can be observed. FIG. 20B shows $^{29}Si$ NMR products of polydimethylsiloxane at 59.6 MHz, where peak A is due to the product $D_5$, peak B is due to the product $D_5$, and peak C is due to the product $D_6$. FIG. 20C shows GPC of products of polydimethylsiloxane 6000 mw, where the main rearranged two peaks can be observed.

FIG. 22A shows GCMS of the Sylgard, in which the $D_4$ and $D_5$ structures can be observed. FIG. 22B shows GPC of the Sylgard, in which the two rearrangement peaks can be observed.

FIG. 23A shows GCMS of the Ecoflex 00-30, in which the $D_5$ and $D_6$ structures can be observed. FIG. 23B shows GPC of the Ecoflex 00-30, in which the two rearrangement peaks can be observed.

FIG. 24A shows GCMS of the Smooth-Sil 950, in which $D_5$ and $D_6$ structures can be observed. FIG. 24B shows GPC of the Smooth-Sil 950, in which the two rearrangement peaks can be observed.

FIG. 25A shows GCMS of the Dragon Skin 10 FAST, in which $D_4$, $D_5$, and $D_6$ structures can be observed. FIG. 25B shows $^{29}Si$ NMR products of Dragon Skin 10 FAST at 59.6 MHz, where peak A is due to the product $D_5$, peak B is due to the product $D_4$, and peak C is due to the product $D_6$.

FIG. 26A shows GCMS of the Silicone caulk, in which $D_4$, $D_5$, and $D_6$ structures can be observed. FIG. 26B shows $^{29}Si$ NMR products of Silicone caulk at 59.6 MHz, where peak A is due to the product $D_5$, peak B is due to the product $D_4$, and peak C is due to the product $D_6$. FIG. 26C shows GPC of the Silicone caulk, in which the two rearrangement peaks can be observed.

FIG. 27A shows GCMS of the Wacker (Elastosil), in which $D_4$, $D_5$, and $D_6$ structures can be observed. FIG. 27B shows $^{29}Si$ NMR products of Wacker (Elastosil) at 59.6 MHz, where peak A is due to the product $D_5$, peak B is due to the product $D_4$, and peak C is due to the product $D_6$. FIG. 27C shows GPC of the Wacker (Elastosil), in which the two rearrangement peaks can be observed.

FIG. 29A shows a TGA graph of Elastosil before depolymerization. FIG. 29B shows a TGA graph of the fluoride oligomerized Elastosil.

DETAILED DESCRIPTION

Figure 1:
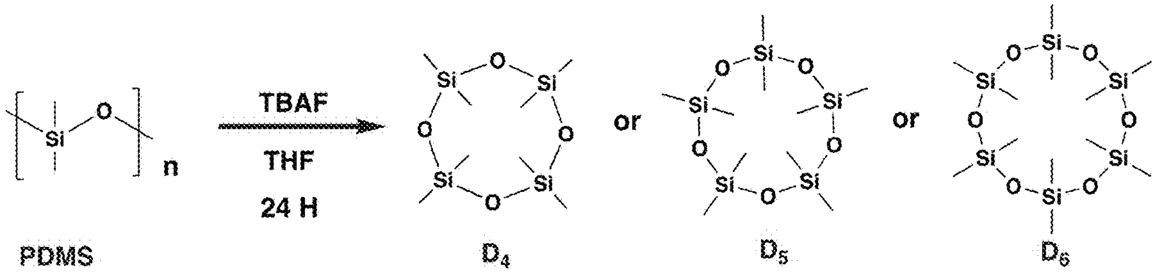
FIG. 1: Scheme 1, showing depolymerization of polydimethylsiloxanes at room temperature with catalytic fluoride catalyst and the formation of cyclic products.

Throughout this disclosure, various publications, patents, and published patent specifications are referenced by an identifying citation. The disclosures of these publications, patents, and published patent specifications are hereby incorporated by reference into the present disclosure in their entirety to more fully describe the state of the art to which this invention pertains.

To address the need for a better method to recycle silicone-based materials, an efficient room temperature technique for depolymerization of silicone-based polymers and resins is described herein. The products can primarily contain cyclic siloxane units ($D_4$, $D_5$, $D_6$), as verified by GCMS and $^{29}Si$ NMR and described in the examples herein. Nearly any silicone resin can be depolymerized quite rapidly, with silicone-rich systems resulting in the best conversions and most identifiable cyclics, while complex resins depolymerize rapidly to a broader array of cyclic and slightly cross-linked products. Cyclic monomers can be repolymerized to reform silicones by acid, base, or fluoride catalysis. The method can be scaled up for large scale industrial processing due to the use of mild conditions and solvent recycling.

In accordance with the present disclosure, the room temperature fluoride depolymerization of siloxane polymers to cyclic monomers is possible after quenching, such as with a salt or an aqueous wash. The quenching step is important to lock the final products from becoming polymers again. The repolymerization of the cylic siloxane monomers back to siloxane polymers has also been demonstrated. The process works for any silicone resins that may be used in construction, automotive, aerospace, or cookware application, as just a few examples.

In general, the method involves immersing the siloxane polymer in a solvent, where either the solvent already contains a source of fluoride or a source of fluoride is added to the solvent. The fluoride then reacts with the siloxane polymer to cause a rearrangement of the siloxane polymer into a cyclic monomer, as depicted in the scheme shown in FIG. 10. The reaction is then quenched to scavenge fluoride ions, stop the depolymerization reaction, and prevent repolymerization of the cyclic monomer. The reaction can take place at room temperature, and can proceed for as long as the siloxane polymer is solvated. The method is a procedure for the conversion of silicone/siloxane polymers and resins back into cylic starting materials at room temperature using a catalytic process. The process is also fast, resulting in complete depolymerization of most resins in less than 4 hours.

The source of fluoride is not particularly limited. In some embodiments, the source of fluoride is an ionic liquid. In one non-limiting example, the source of fluoride is tetrabutylammonium fluoride (TBAF). However, many other sources of fluoride are possible and encompassed within the scope of the present disclosure. For example, other sources of fluoride may include hydrogen fluoride, ammonium fluorides, hydrogen dialkylammonium fluoride ($NR_2H_2F$ where R is an alkyl group), hydrogen trifluoride ammonium, alkali metal salts (e.g., LiF, NaF, KF), alkaline earth metal salts (e.g., $CaF_2$, $MgF_2$), alkyl hydrogen fluoride, 1-fluoro-4-chloromethyl-1,4-diazoniabicyclo[2.2.2]octane bis (tetrafluoroborate) (trade name Accufluor®), N,N'-difluoro-2, 2'-bipyridinium bis(tetrafluoroborate), diethylaminosulfur trifluoride (DAST), $R_aR_bN—CF_2—R_c$ where $R_a$ is hydrogen or alkyl and $R_b$ and $R_c$ are each selected from alkyl or aryl (tradename Fluorinox®), 1-fluoro-4-chloromethyl-1,4-diazoniabicyclo[2.2.2]octane bis(tetrafluoroborate) (trade name Selectfluor®), or combinations thereof.

While the use of fluoride is known to affect silicon based materials, stoichiometric fluoride sources are most often used, which limits applicability. Here, the source of fluoride may be present in the solvent at only a catalytic level, for example up to about 2 mol %. In one non-limiting example, the source of fluoride is present in the solvent at a concentration of only about 0.5 mol %. Thus, the method does not require a significant amount of the source of fluoride.

The solvent is a network-penetrating liquid under the reaction conditions (i.e., at room temperature), and may have intermediate polarity. Thus, non-limiting examples of suitable solvents include THF, DCM, 2-methyl THF, chloroform, acetone, and toluene. However, other solvents are possible and encompassed within the scope of the present disclosure, though it has been found that alcohols and alkanes (e.g., hexanes) are generally not good solvents for this process.

The temperature range at which the reaction can proceed is bounded only by the freezing point of water and the boiling point of the solvent being used. This is because when water freezes, the ice crystals can stop the depolymerization reaction. Also, when the solvent boils off, cyclic monomers repolymerize if the reaction has not been quenched. Inside this temperature range, the depolymerization reaction can proceed freely and without significant repolymerization. Thus, in some embodiments, the solvent is THF, and the reaction may proceed in the temperature range of from about 0° C. to about 66° C. In other embodiments, the solvent is DCM, and the reaction may proceed in the temperature range of from about 0° C. to about 40° C. In other embodiments, the solvent is 2-methyltetrahydrofuran, and the reaction may proceed in the temperature range of from about 0° C. to about 80° C. In other embodiments, the solvent is acetone, and the reaction may proceed in the temperature range of from about 0° C. to about 56° C. In other embodiments, the solvent is toluene, and the reaction may proceed in the temperature range of from about 0° C. to about 110° C.

The quenching can be done through any suitable method that scavenges fluoride ions, stops the depolymerization reaction, and prevents repolymerization of cyclic monomers. Two non-limiting example quenching methods are the addition of a salt and an aqueous wash. A salt, such as, but not limited to, a chloride salt, may be added to the reaction and stirred for a period of time of at least about 30 minutes so as to quench the reaction. The quenching step with a salt such as $CaCl_2$ works to quench small catalytic amounts of fluoride since it relies on the exchange of active fluoride catalyst with non-reactive chloride to form $CaF_2$. Non-limiting examples of chloride salts include $CaCl_2$, AgCl, NaCl, KCl, and chlorotrimethylsilane (TMSCl). Other suitable salts include, but are not limited to, iodides, chromates, bromides, sulfides, carbonates, sulfates, phosphates, and hydroxides.

Alternatively, an aqueous wash can create two layers and cause the remaining fluoride ions to enter the aqueous phase, quenching the reaction. The advantage of the aqueous wash method is that it is instantaneous, as opposed to the salt method. However, the drawback of the aqueous wash method is that water may get into the organic layer and cause some repolymerization of the cyclic monomers. These quenching methods are given purely as examples, and are by no means the only ways to quench the reaction. Other quenching methods are possible and entirely encompassed within the scope of the present disclosure.

Without the quenching step, solvent removal would result in repolymerization to a random resin without control over structure, and no cyclic monomers could be recovered. The formation of cyclic monomers, which are among the most common starting materials for silicones, is a huge benefit, allowing for complete recycling to new materials. The cyclic monomers can be distilled to separate as well as to gain further control. This process is extremely useful in the recycling of silicone resins that currently end up in landfills, stemming from its simple setup, which gives broad applicability to be applied in many polymer, waste, and recycling industries. This process can keep expensive silicones out of landfills by allowing for the opportunity for reuse.

The method is an industrially favorable, economical way of recycling silicone polymers back to their cyclic starting materials so they can be repolymerized again. The method can depolymerize silicones at room temperature with the ability to recycle solvent used in the process. Fluoride interacts with silicones preferentially and causes them to rearrange. Quenching stops the process from continuing or reverting back to polymer, locking in the cyclic monomers for future use by desired polymerization methods.

The method can be used to recycle mixed systems. For example, the method can be used to recycle a household item that contains a silicone portion and a second material portion. The silicone portion can simply be dissolved off of the second material portion by immersing the item or the silicone portion in a solvent, incorporating fluoride into the solvent, allowing the depolymerization reaction to proceed for at least about 30 minutes, and then quenching the reaction as described above and separating the second material portion from the solvent containing dissolved cyclic monomers. Advantageously, this allows for the recycling of the silicone.

The method offers many advantages over previously developed technologies for recycling polysiloxanes. Most other technologies apply high heat (e.g., >200° C.) to break down silicones in the presence of a sub-stoichiometric acid, base, or Lewis acid catalyst to give a mixture of silanol based products, which can be difficult to controllably repolymerize. These methods result in cyclic byproducts, but the need for heat and slow activation limit their commercial applicability compared to the present disclosure. Other known methods never isolate cyclic monomers by quenching the reaction so that general siloxane polymerization methods can be used. The method described herein has significant advantages in that it can take place at room temperature, needs only small amounts of catalyst, results in cyclic silicone starting materials which can be controllably repolymerized, and uses a method which can be applied in large scales.

The presently described method solves the problem of being able to apply silicone recycling economically at scale by allowing for the recycling of silicone components, as well as the solvent used in the process, with the only sacrificial reagents being a cheap quenching salt such as $CaCl_2$ (when a salt is used in the quenching step) and a small amount of fluoride catalyst. The method is suitable for large scale industrial processing due to the use of mild conditions and solvent recycling ability.

The method may also be embodied in the form of a kit or kits. A non-limiting example of such a kit is a kit comprising a solvent and a source of fluoride in separate containers, where the containers may or may not be present in a combined configuration. Many other kits are possible, such as kits further including a quenching salt or a repolymerization catalyst. The kits may further include instructions for using the components of the kit to practice the subject methods. The instructions for practicing the subject methods are generally recorded on a suitable recording medium. For example, the instructions may be present in the kits as a package insert or in the labeling of the container of the kit or components thereof. In other embodiments, the instructions are present as an electronic storage data file present on a suitable computer readable storage medium, such as a flash drive. In other embodiments, the actual instructions are not present in the kit, but means for obtaining the instructions from a remote source, such as via the internet, are provided. An example of this embodiment is a kit that includes a web address where the instructions can be viewed and/or from which the instructions can be downloaded. As with the instructions, this means for obtaining the instructions is recorded on a suitable substrate.

EXAMPLES

In these examples, an efficient room temperature technique for depolymerization of silicone-based polymers and resins in the presence of low catalytic amounts of fluoride in specific high swell organic solvents (Scheme 1, FIG. 1) is demonstrated. This process leads to the near exclusive formation of cyclics, which can then be repolymerized to make new materials. The products primarily contain cyclic siloxane units ($D_4$, $D_5$, $D_6$) as verified by GCMS and $^{29}Si$ NMR. Nearly any silicone resin can be depolymerized by these methods quite rapidly. Silicone rich systems result in the best conversions and the highest quantity of identifiable cyclics, while complex resins resulted in complicated products alongside discernable cyclics. How dimethyl, methylphenyl, and commercial resin-based siloxanes are depolymerized with different solvents, reactants, catalyst concentrations, and reaction times was evaluated. To go full circle, the products of this process have also been repolymerized to reform silicones by acid, base, and fluoride catalysis.

Results and Discussion

Siloxane depolymerization using polyphenylmethylsiloxanes was performed first, since it was previously determined that fluoride interacted well with this system due to the slight electron withdrawing ability of the phenyl. After establishing the phenylmethyl system, the effects of fluoride on the rearrangement of a model compound, decamethylcyclopentasiloxane ($D_5$), were evaluated. A series of linear polydimethylsiloxanes (PDMS) of differing molecular weights was then analyzed to determine their products and efficiencies of catalytic rearrangement. This was followed by studies with a series of commercial cross-linked PDMS based resins of varying complexity. The described systems were tested in various solvents and with different catalyst amounts. Reactions were followed by GPC and products were analyzed by GPC, GCMS, and $^{29}$Si NMR. Advantageous conditions for general depolymerization including solvent and catalyst were determined.

Polyphenylmethylsiloxanes

Figure 2:
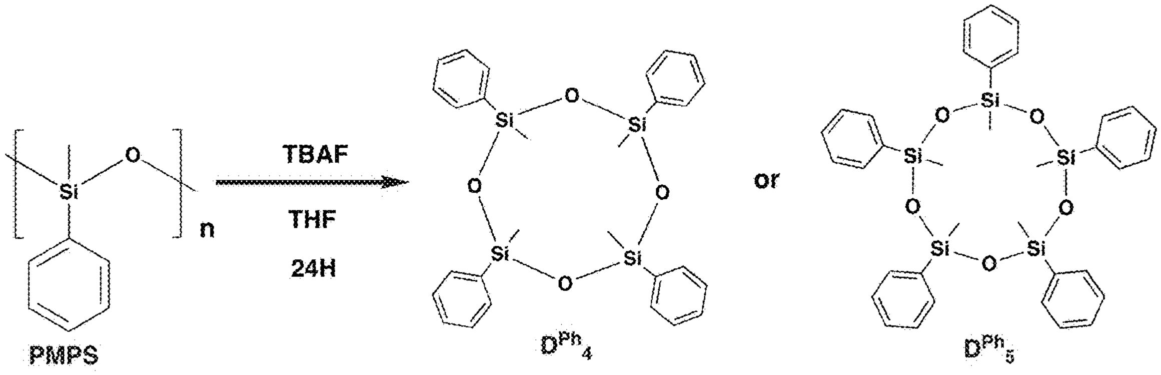
FIG. 2: Scheme 2, showing fluoride catalyzed depolymerization of phenylmethylsiloxane (PMPS, Mn~2700 g/mol).
Figure 3A:
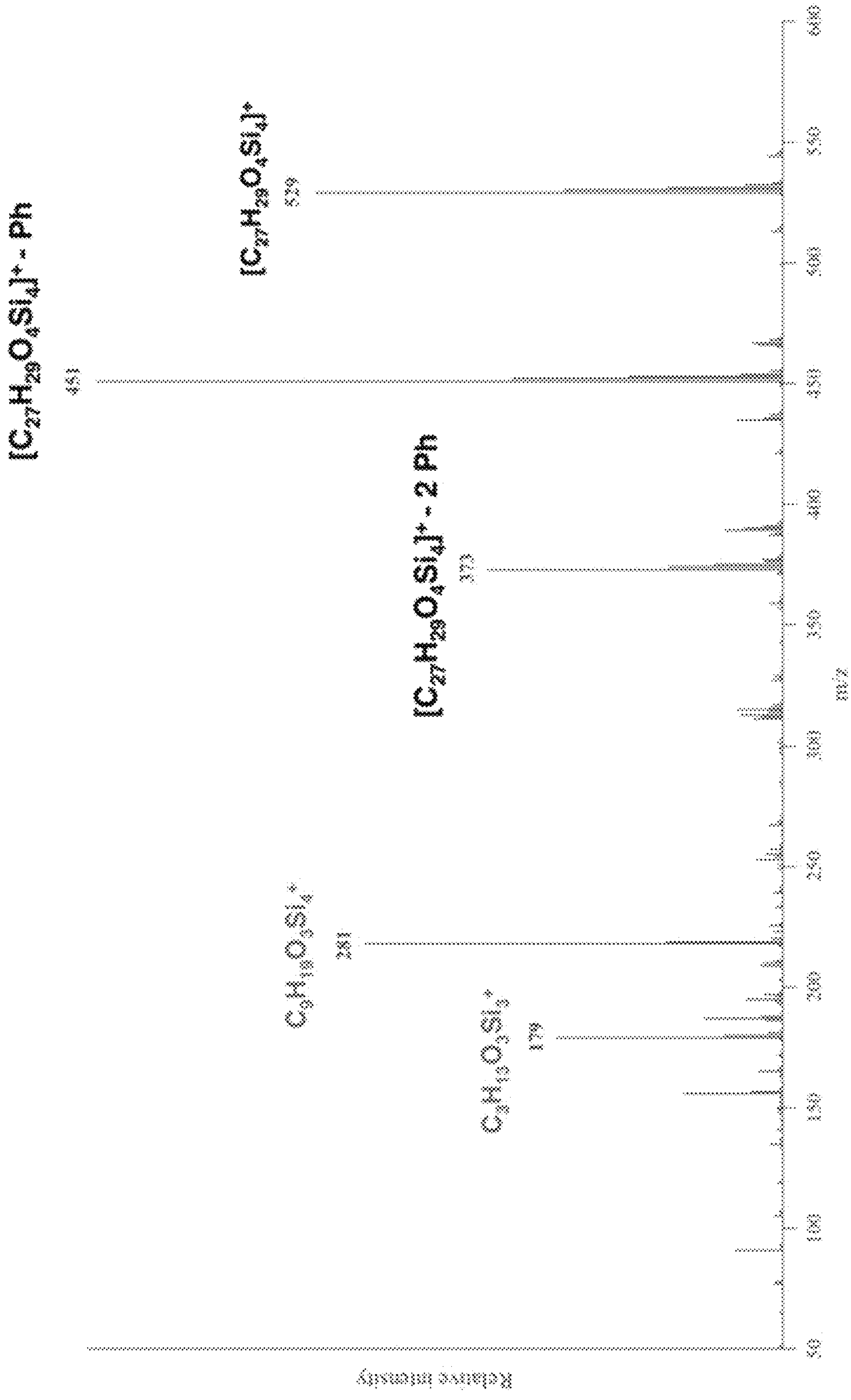
FIGS. 3A-3B: GCMS of a representative polyphenylmethylsiloxane depolymerization study (FIG. 3A), and a $^{29}Si$ NMR of polyphenylmethylsiloxane products (FIG. 3B). B is the product $D^{Ph}{}_4$ and A is the product $D^{Ph}{}_5$.
Figure 3B:
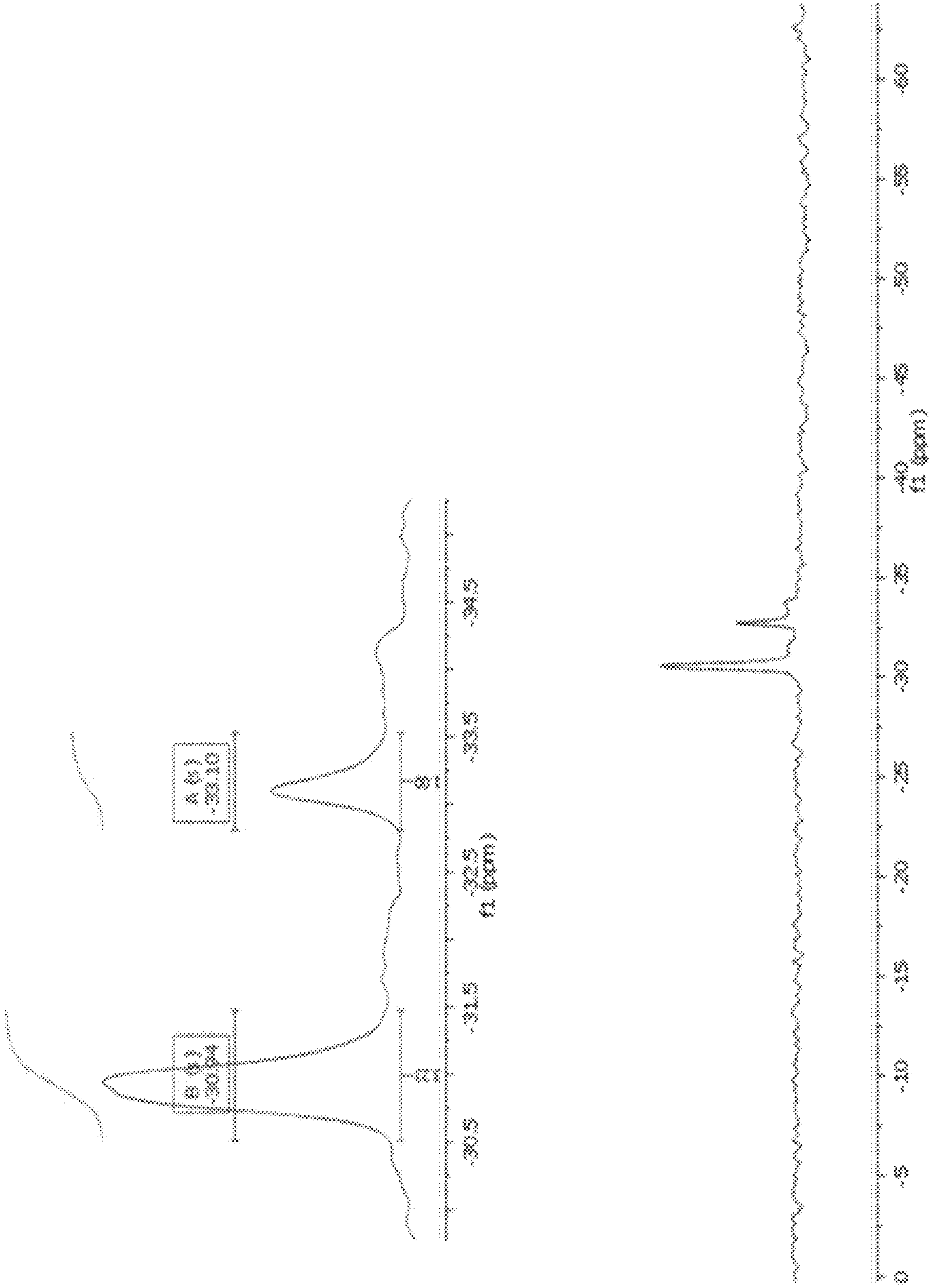

Initial attempts at siloxane depolymerization began with a polyphenylmethylsiloxane (PMPS, Mn~2700 g/mol). The slight electron withdrawing ability of the phenyl has been found to improve fluoride interactions with siloxane species. The synthesis method is outlined in Scheme 2 (FIG. 2). Since fluoride reacts readily with this polymer, a series of experiments was set up to determine useful conditions for depolymerization (i.e., solvent, concentration, and catalyst (TBAF) amounts). The systematic trials and conditions of testing are shown in Table 1.

Figure 16:
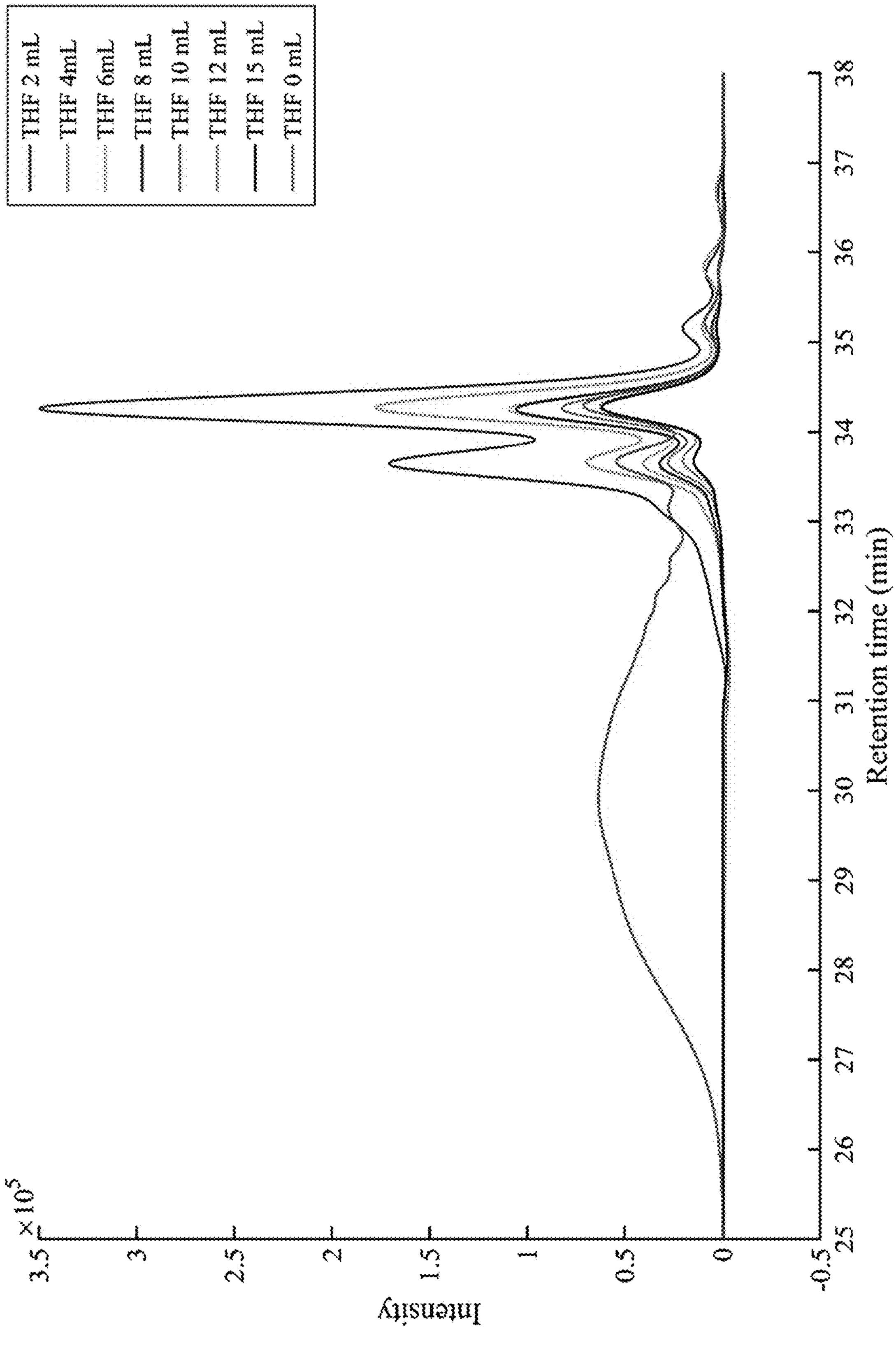
FIG. 16: GPC of depolymerization of polyphenylmethylsiloxane with different volumes of THF.
Figure 17:
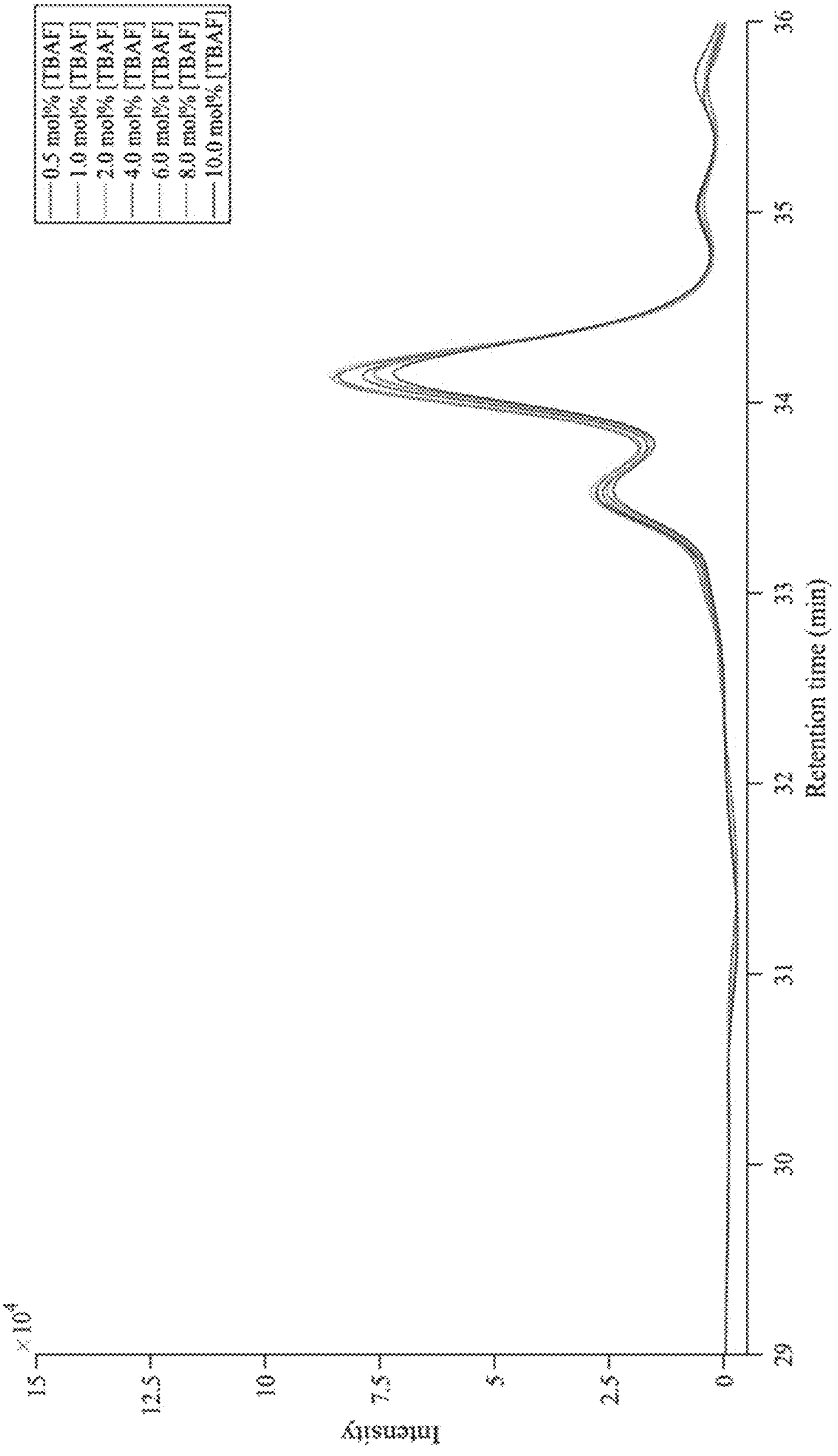
FIG. 17: GPC of depolymerization of polyphenylmethylsiloxane TBAF mol % study.

In the first experiments, various solvents and solvent free conditions were explored with a consistent amount of PMPS (100 mg), TBAF at 0.5 mol %, and constant solvent volume all at room temperature (Table 1, entries 1-10). All of these reactions were quenched with ~1 g $CaCl_2$ to remove fluoride (4 hours after 24 h of reaction). Most solvent systems showed little reaction after 24 h, with exceptions being slight depolymerization in DCM and 2-methylTHF, with extensive and complete depolymerization in THF. This is most likely due to the increased swelling and solubilization ability of THF over the other solvents tested. The reaction in THF showed near quantitative depolymerization to $D^{Ph}_4$ and $D^{Ph}_5$. The products were identified using GCMS, GPC, and $^{29}$Si NMR, as shown in FIGS. 3A-3B, 14-17, respectively. After establishing that THF is an advantageous solvent, a solvent volume study was done to determine whether the amount of solvent has a significant impact on the depolymerization (Table 1, entries 11-17). It was found that solvent volumes from 2-15 mL have little impact on the overall outcome of the reaction with similar conversion ratios and depolymerization efficiencies by GPC (FIG. 16). Lastly, the amount of TBAF needed to imbue effective depolymerization was determined (Table 1, entries 18-23). It was found that increasing the amount of TBAF did little to change the product distributions of depolymerization over 24 h, however higher quantities of fluoride ion did slightly decrease the amount of time required. From this study, it was determined that THF and 0.5 mol % of TBAF were adequate for instilling depolymerization of PMPS to cyclic monomers and that solvent volume, as long as it was present, had little impact. This is all shown very clearly by GPC conversions given in FIG. 17.

TABLE 1

Polyphenylmethylsiloxane (MP) depolymerization study

| Entry | Solvent | Solvent volume | Catalyst/ TBAF mol (%) | Recovered mass, mg | *Yield of $D_4^{Ph}$/ mg | *Yield of $D_5^{Ph}$/ mg |
|---|---|---|---|---|---|---|
| 1 [a] | — | — | 0.5 | — | — | — |
| 2 [a] | DCM | 10 mL | 0.5 | 8.2 | 6.3 | 1.9 |
| 3 [a] | Acetone | 10 mL | 0.5 | — | — | — |
| 4 [a] | Acetonitrile | 10 mL | 0.5 | 18.7 | 14.3 | 4.4 |
| 5 [a] | Water | 10 mL | 0.5 | — | — | — |
| 6 [a] | Dioxane | 10 mL | 0.5 | — | — | — |
| 7 [a] | Toluene | 10 mL | 0.5 | — | — | — |
| 8 [a] | Methanol | 10 mL | 0.5 | — | — | — |
| 9 [a] | 2-methylTHF | 10 mL | 0.5 | 24.3 | 18.6 | 5.7 |
| 10 [b] | THF | 10 mL | 0.5 | 94.5 | 72.3 | 22.2 |
| 11 [b] | THF | 2 mL | 0.5 | 90.8 | 69.4 | 21.4 |
| 12 [b] | THF | 4 mL | 0.5 | 93.3 | 71.3 | 22.0 |
| 13 [b] | THF | 6 mL | 0.5 | 92.4 | 70.7 | 21.7 |
| 14 [b] | THF | 8 mL | 0.5 | 95.6 | 73.1 | 22.5 |
| 15 [b] | THF | 10 mL | 0.5 | 96.1 | 73.5 | 22.6 |
| 16 [b] | THF | 12 mL | 0.5 | 94.4 | 72.2 | 22.2 |
| 17 [c] | THF | 15 mL | 0.5 | 95.6 | 73.1 | 22.5 |
| 18 [c] | THF | 10 mL | 1 | 95.7 | 73.2 | 22.5 |
| 19 [c] | THF | 10 mL | 2 | 95.1 | 72.7 | 22.4 |
| 20 [c] | THF | 10 mL | 4 | 94.3 | 72.1 | 22.2 |
| 21 [c] | THF | 10 mL | 6 | 95.5 | 73.0 | 22.5 |
| 22 [c] | THF | 10 mL | 8 | 95.1 | 72.7 | 22.4 |
| 23 [c] | THF | 10 mL | 10 | 96.3 | 73.6 | 22.7 |

[a] Reaction conditions: polyphenylmethylsiloxane 100 mg, TBAF 0.5 mol %, solvent 10 mL, RT, 24 h.
[b] Reaction conditions: polyphenylmethylsiloxane 100 mg, TBAF 0.5 mol %, solvent THF (volume), RT, 24 h.
[c] Reaction conditions: polyphenylmethylsiloxane 100 mg, TBAF, THF solvent 10 mL, RT, 24 h.
*The two products yields were calculated using their respective $^{29}$Si NMR peak areas and absolute yield.
— not applicable or negligible formation; it is noted that entries 2[a] and 4[a], showed some conversion to products compared to the other solvents.

Polydimethylsiloxane Study

Once a set of conditions that worked well for the PMPS system was established, whether they also worked for other siloxane polymers including polydimethylsiloxanes was evaluated (Scheme 1, FIG. 1). Two linear silicone fluids (Mn~500 and Mn~6000 Da) and one cyclic ($D_5$) were applied to the conditions determined above. Each of the systems showed very clean depolymerization and/or rearrangement ($D_5$) using 10 mL of THF, 0.5 mol % TBAF, and 100 mg of starting siloxane (Table 2). The key step is then quenching to stop the equilibration process and remove fluoride. $CaCl_2$ was used for the quenching.

TABLE 2

Polydimethylsiloxane depolymerization conditions and product ratios

| Entry | Polymer | Solvent | Solvent volume | Catalyst/ TBAF mol % | Total yield, mg | Yield of $D_4$/mg | Yield of $D_5$/mg | Yield of $D_6$ mg |
|---|---|---|---|---|---|---|---|---|
| 1 | Decamethylcyclopentasiloxane ($D_5$, Mw = 370 Da) | THF | 10 mL | 0.5 | 96.2 | 26.2 | 11.6 | 58.4 |

TABLE 2-continued

| Polydimethylsiloxane depolymerization conditions and product ratios | | | | | | | | |
|---|---|---|---|---|---|---|---|---|
| Entry | Polymer | Solvent | Solvent volume | Catalyst/ TBAF mol % | Total yield, mg | Yield of $D_4$/mg | Yield of $D_5$/mg | Yield of $D_6$ mg |
| 2 | polydimethyl-siloxane-vinyl terminated (Mw » 500 Da) | THF | 10 mL | 0.5 | 96.0 | 64.0 | 26.7 | 5.3 |
| 3 | polydimethyl-siloxane-vinyl terminated (Mw » 6000 Da) | THF | 10 mL | 0.5 | 94.6 | 63.0 | 26.3 | 5.3 |

Figure 11A:
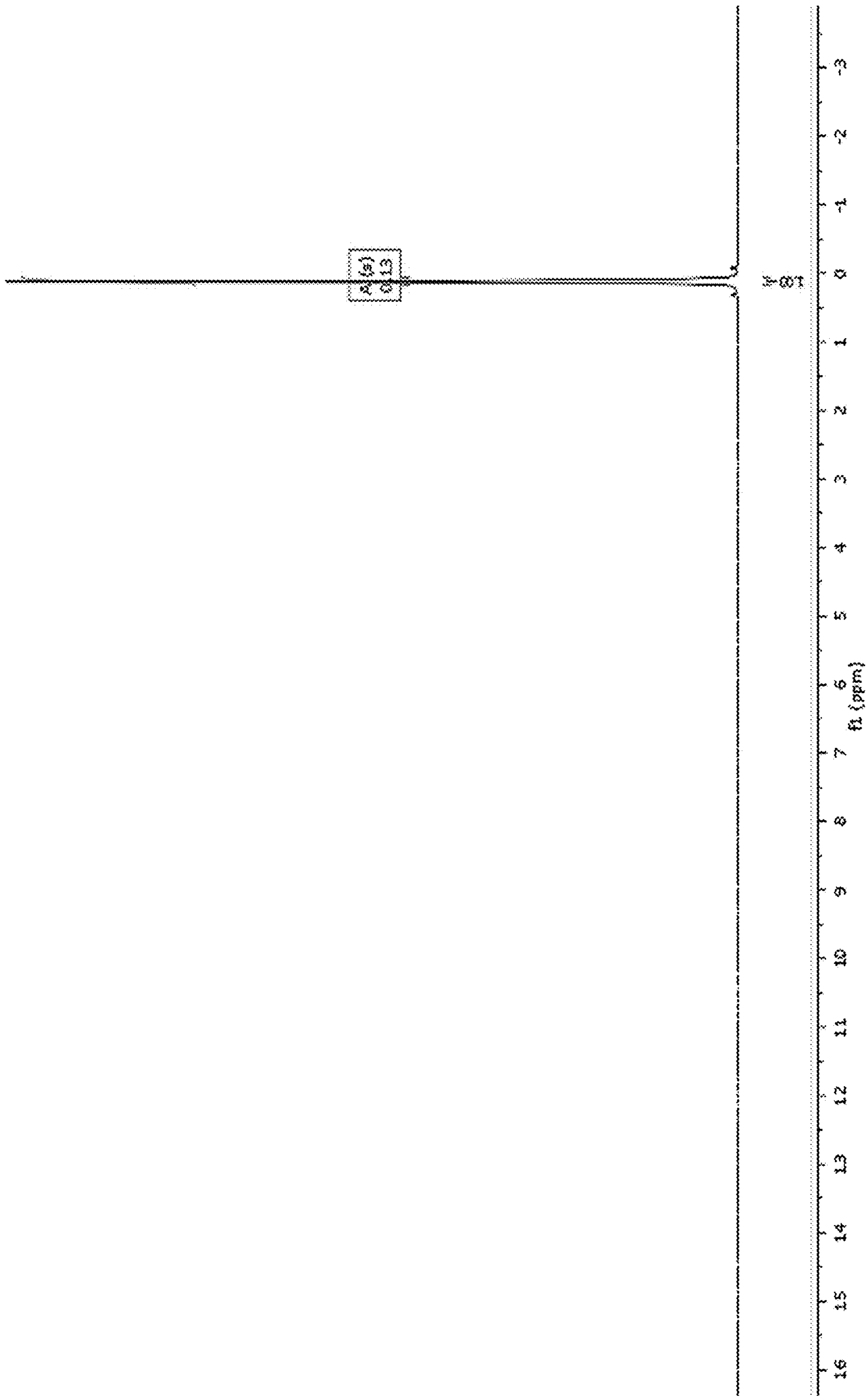
FIGS. 11A-11E.
Figure 11B:
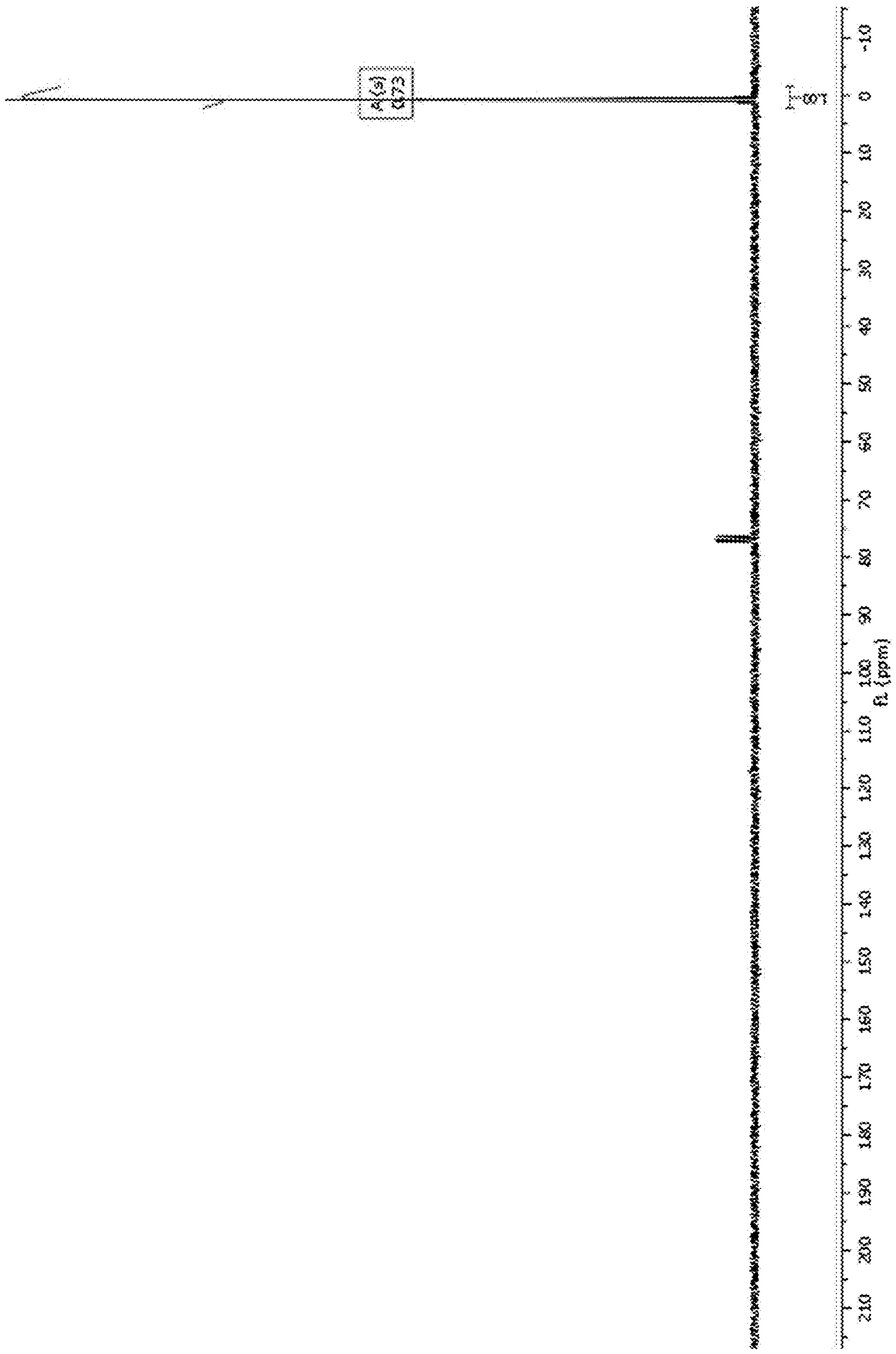
Figure 11C:
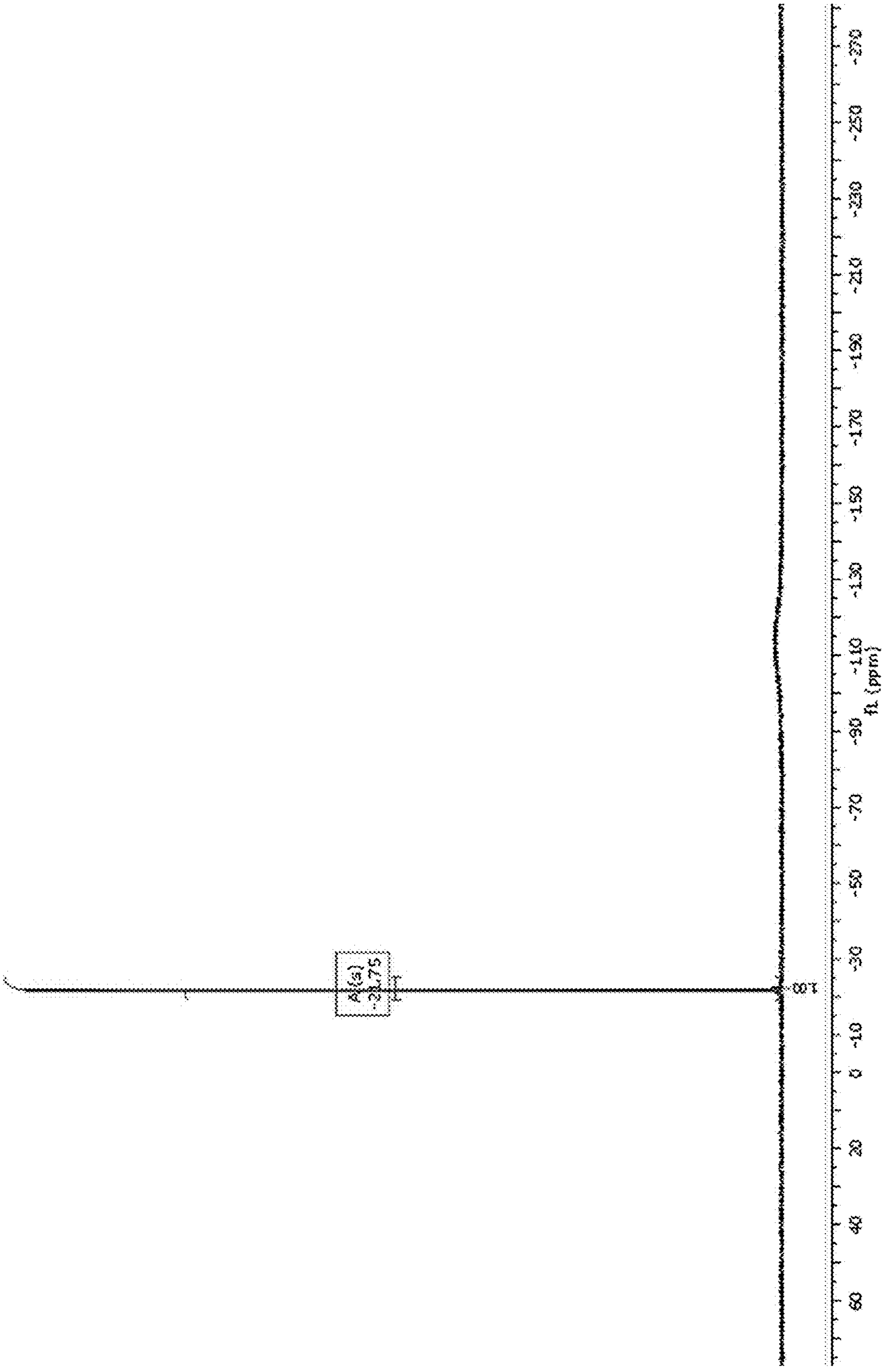
Figure 11D:
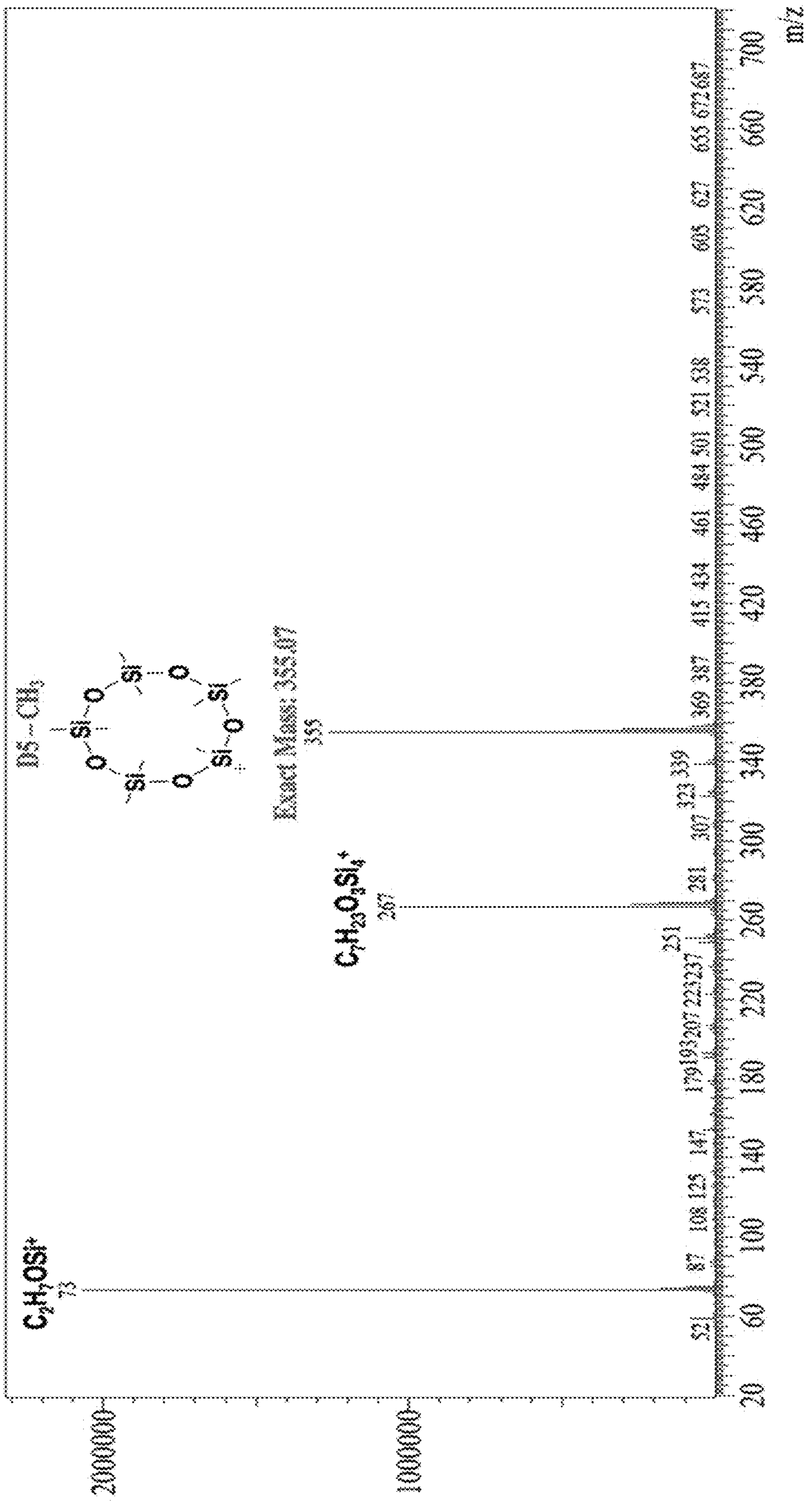
Figure 11E:
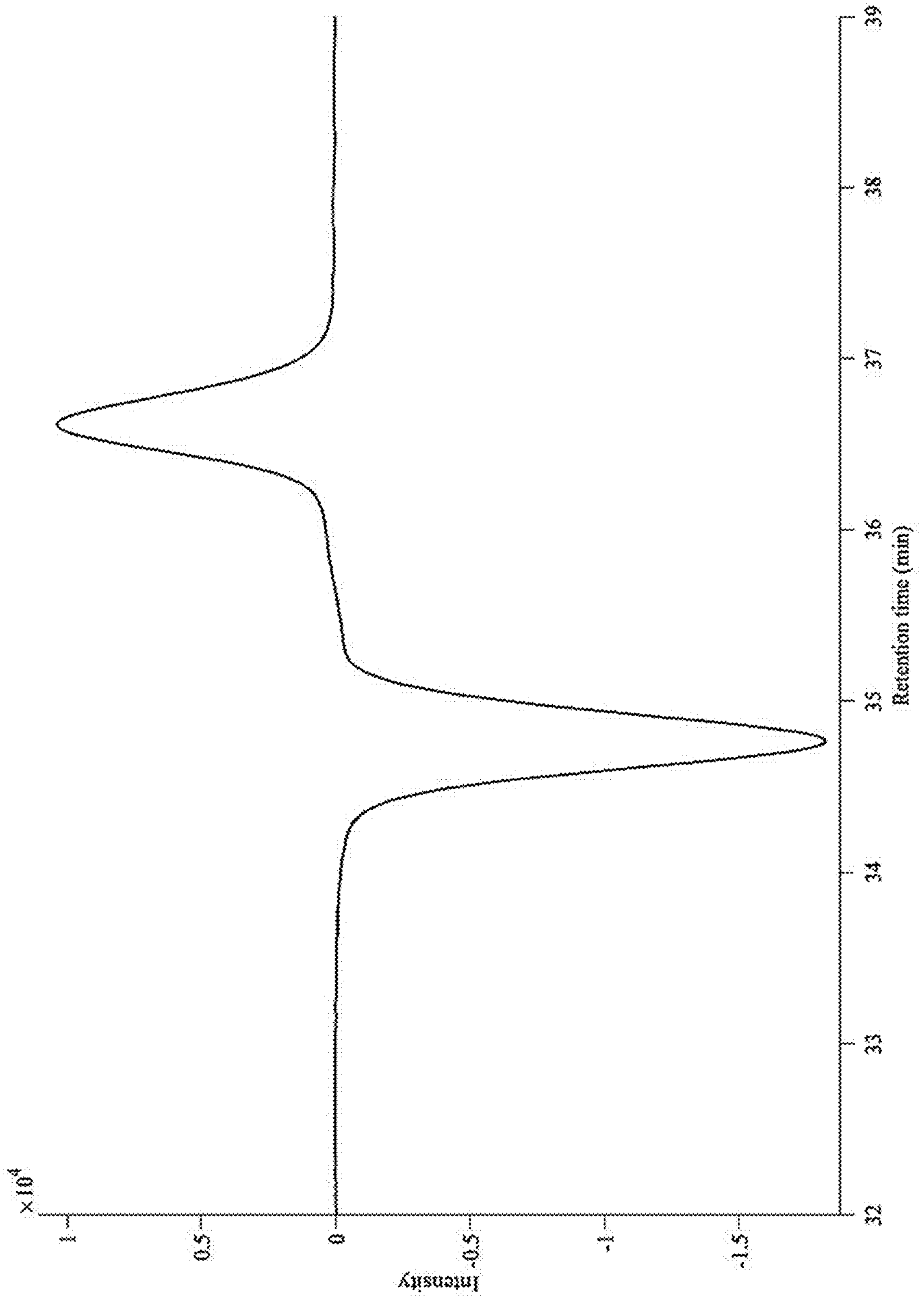
Figure 12A:
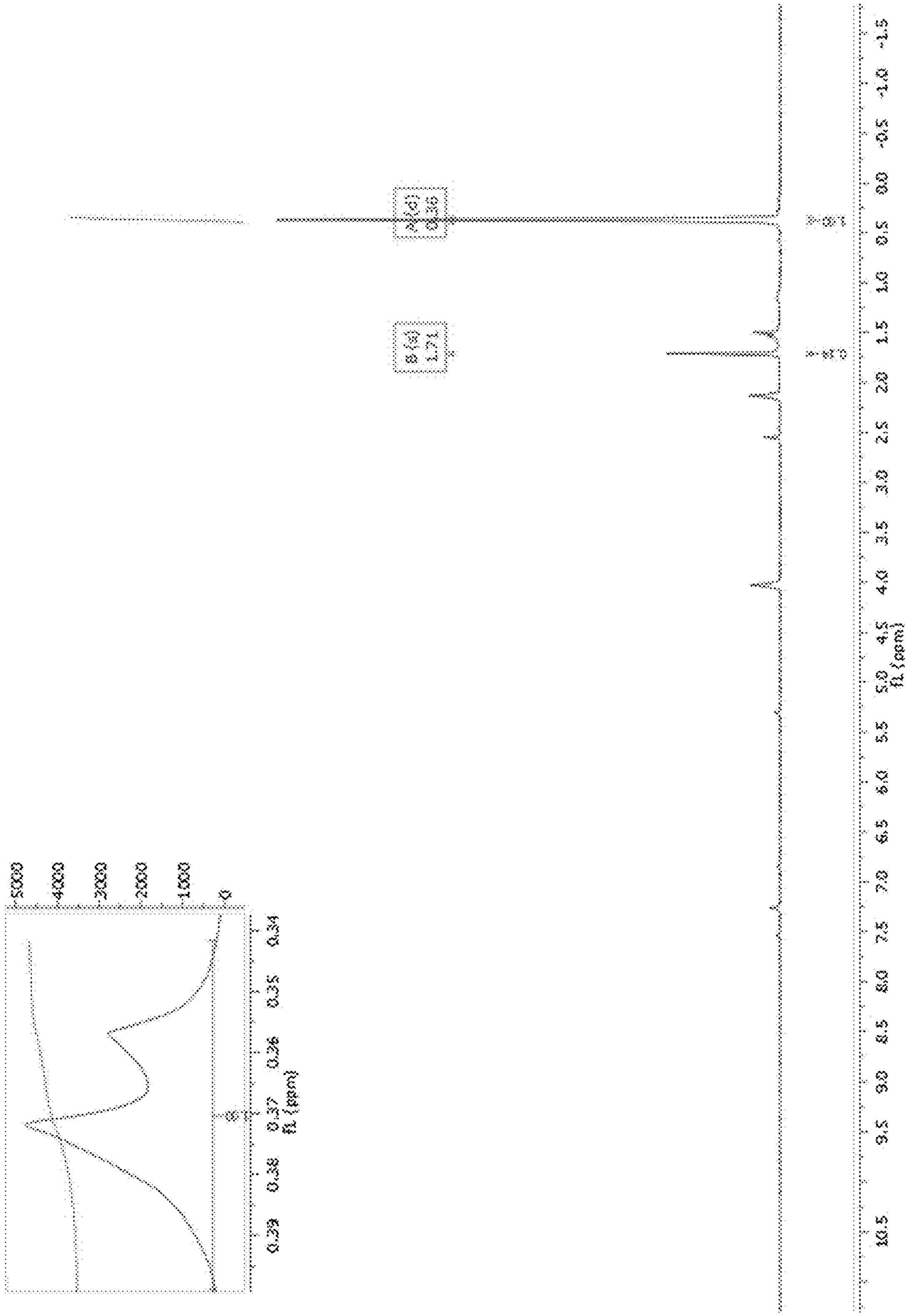
FIGS. 12A-12E: Chemical characterization of the products of $D_5$ rearrangement.
Figure 12B:
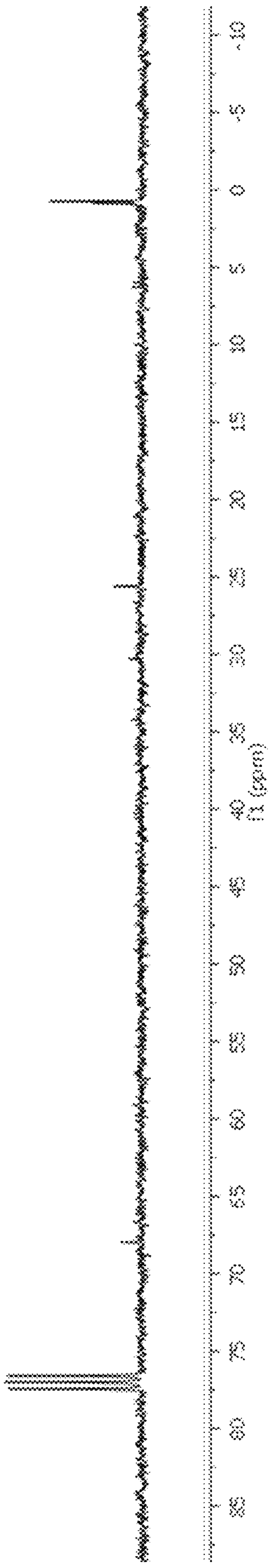
Figure 12C:
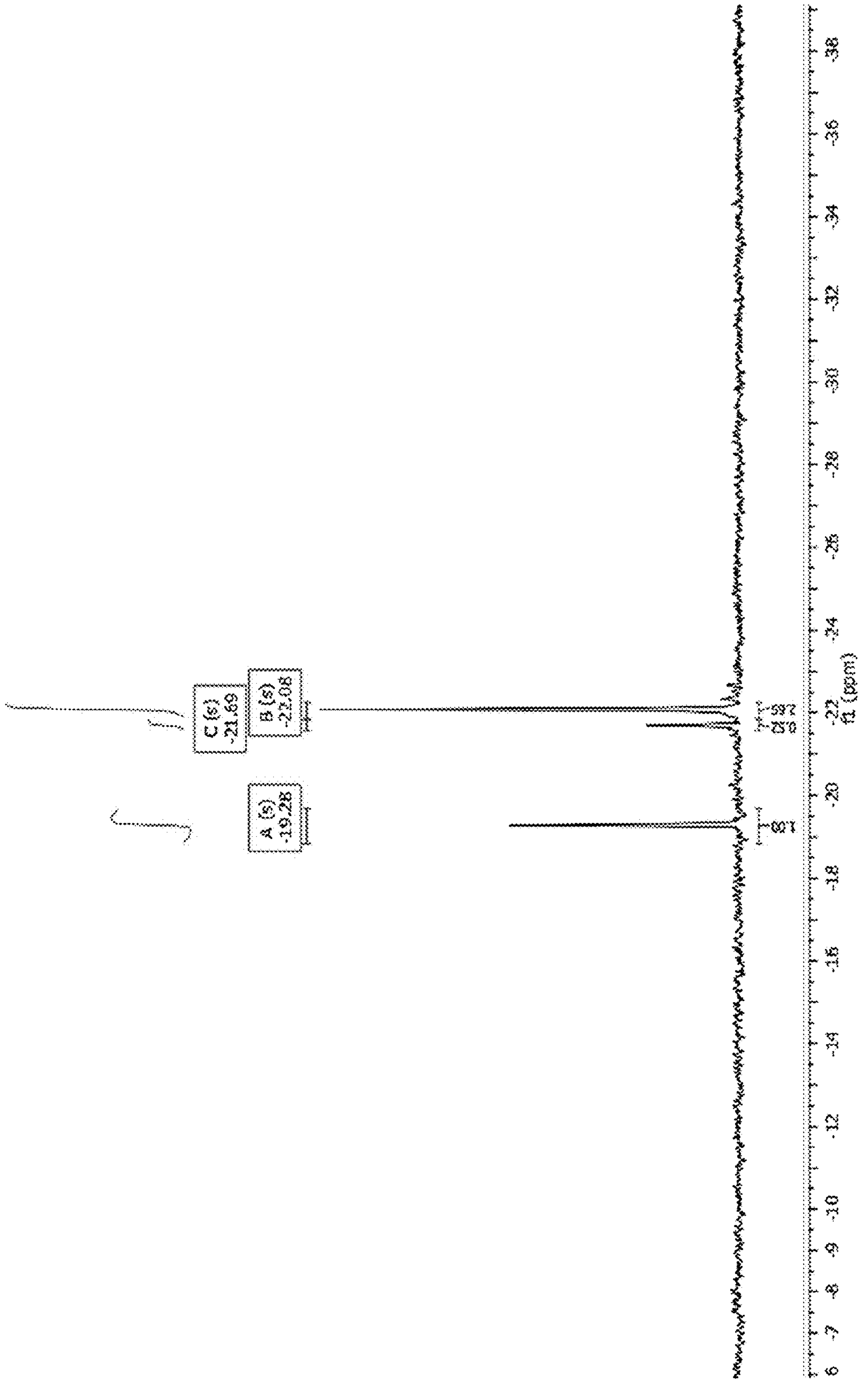
Figure 12D:
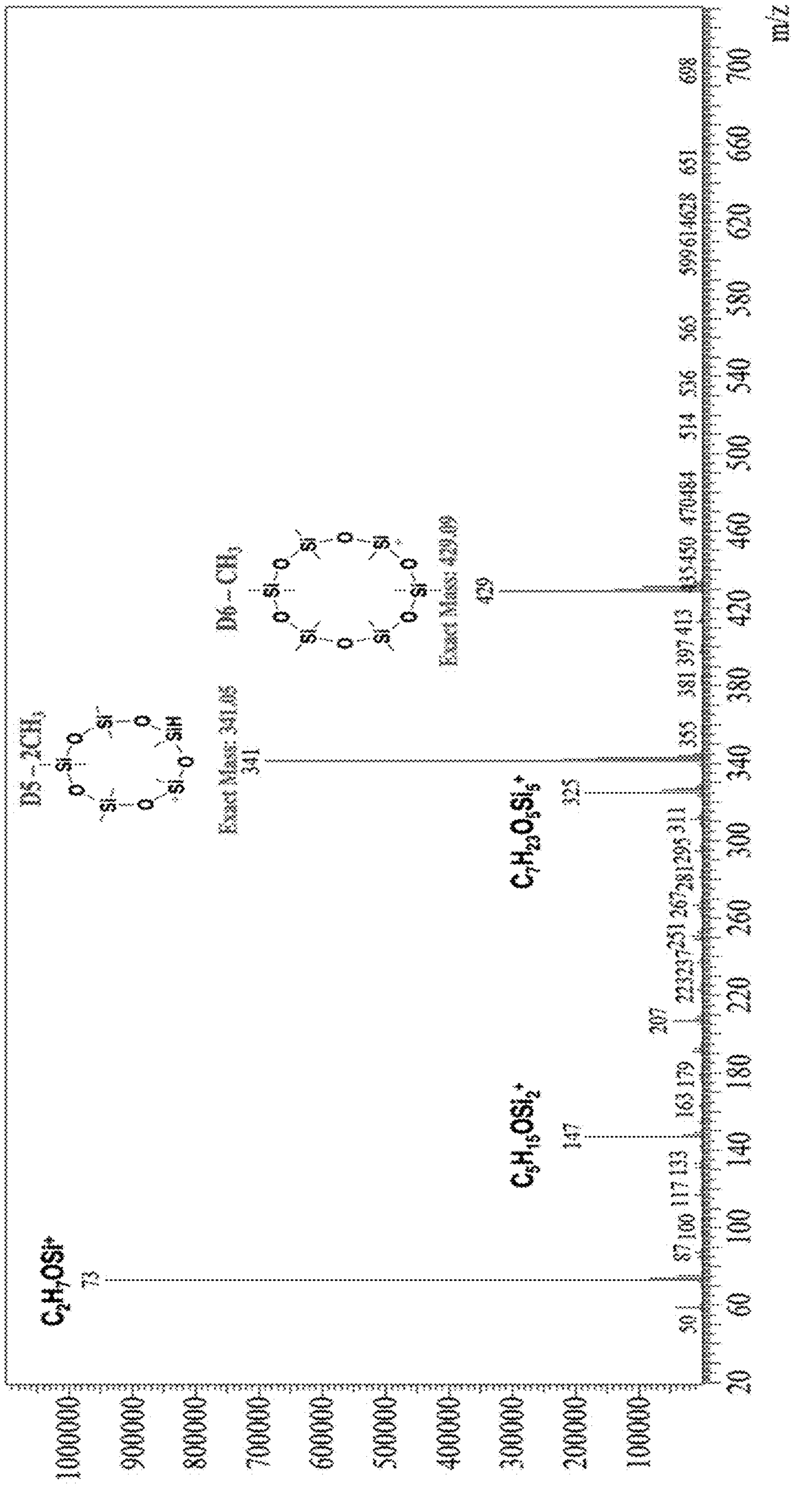
Figure 12E:
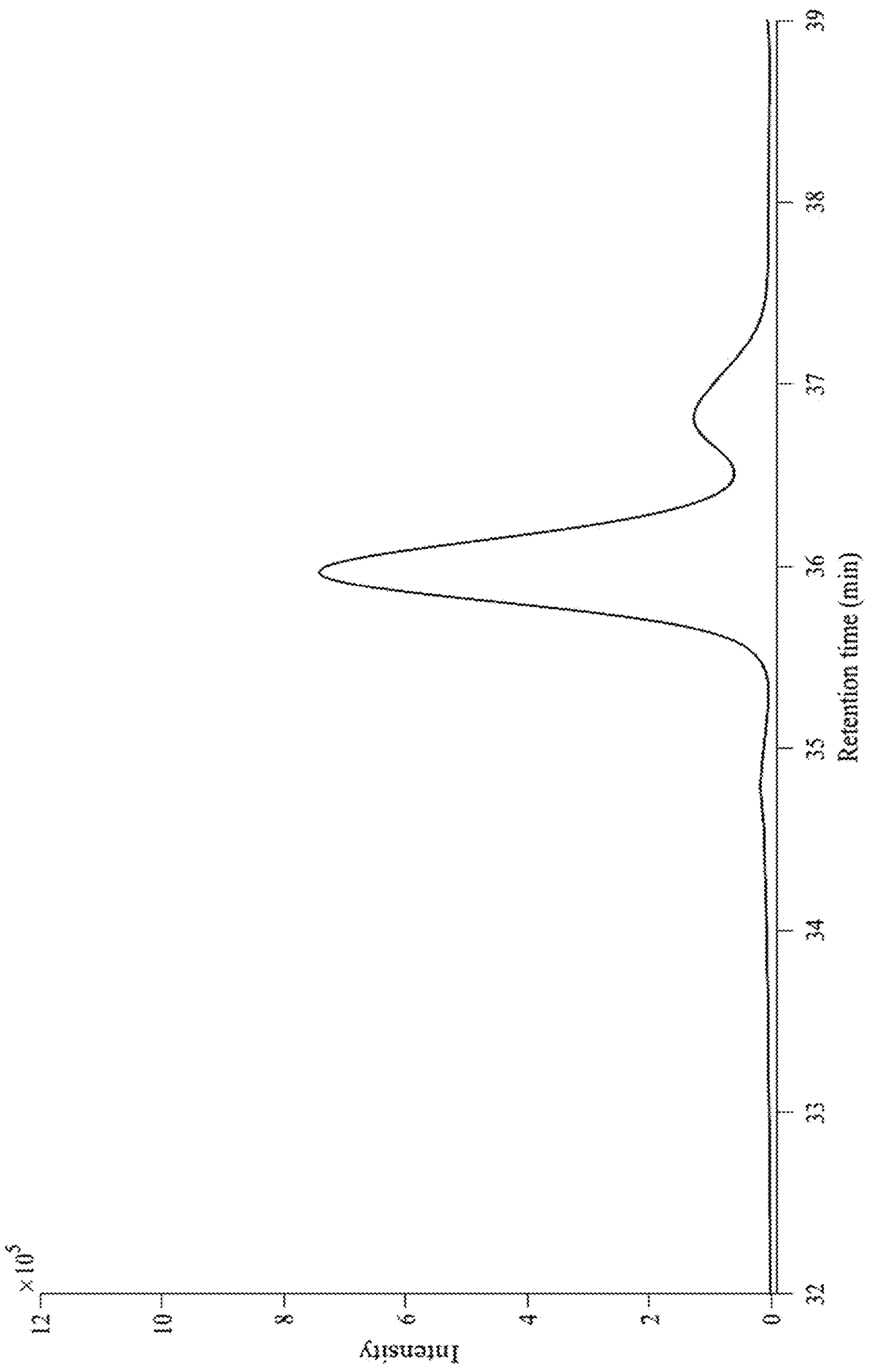
Figure 13A:
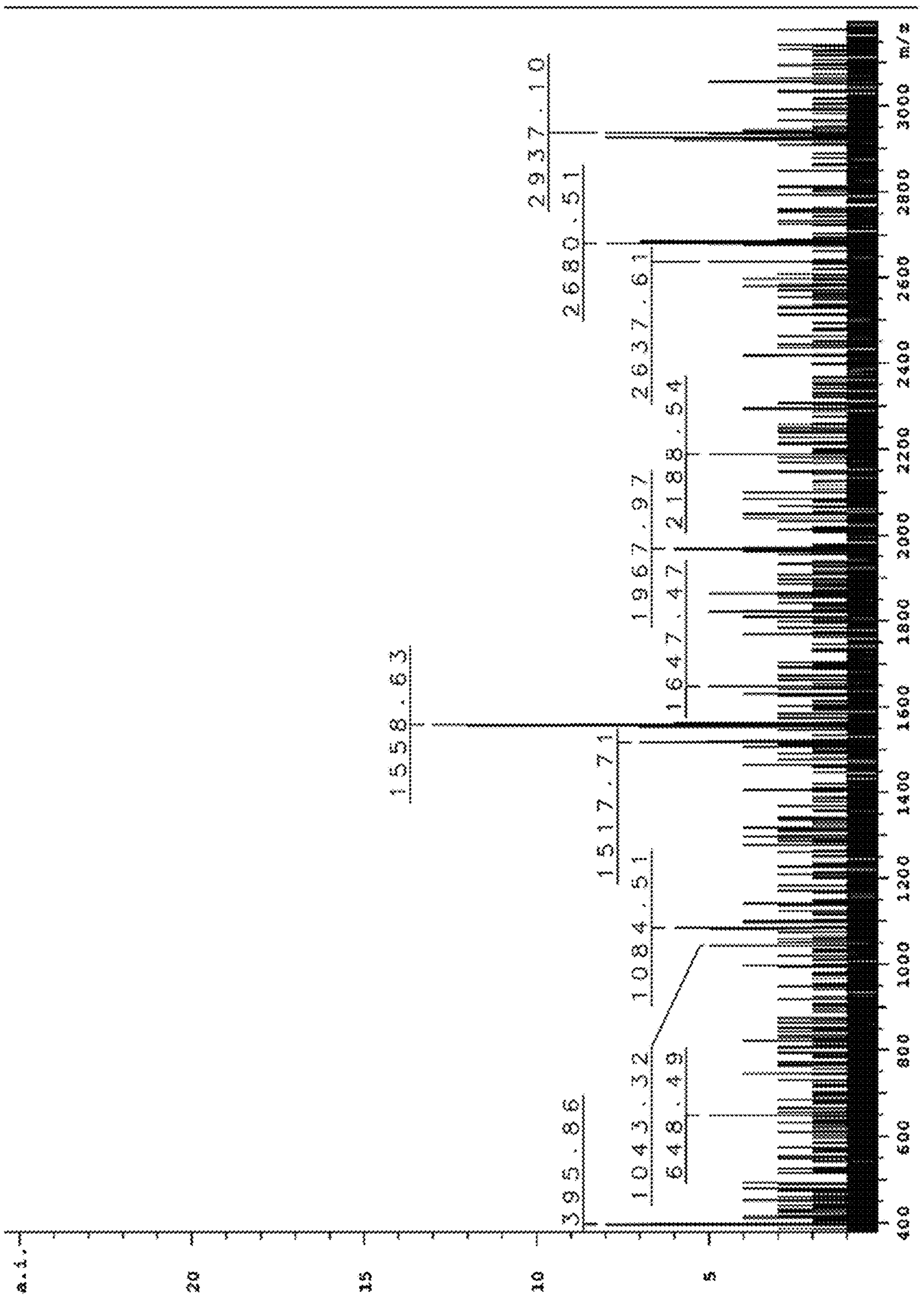
FIGS. 13A-13B: Chemical characterization of polyphenylmethylsiloxane polymer.
Figure 13B:
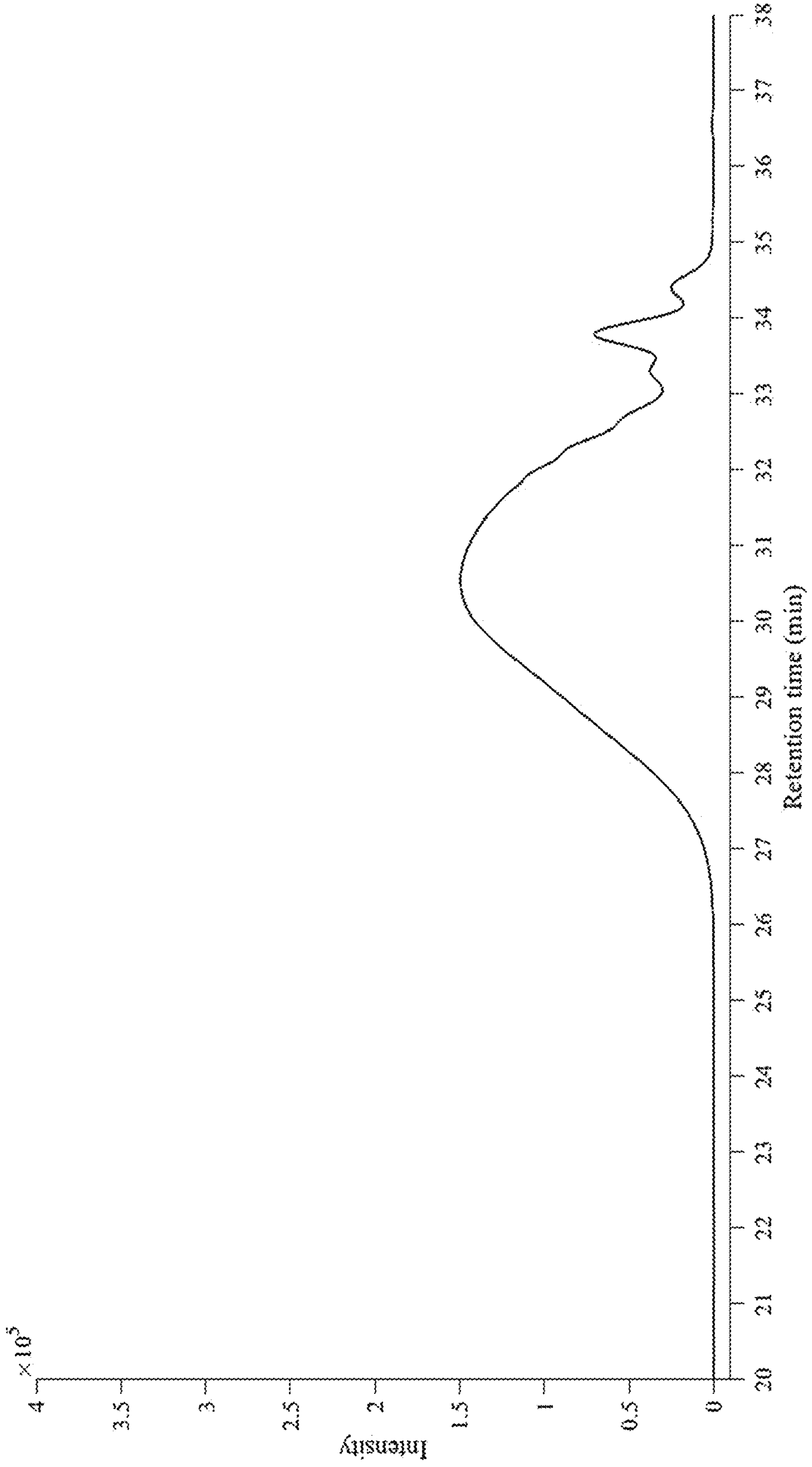
Figure 14A:
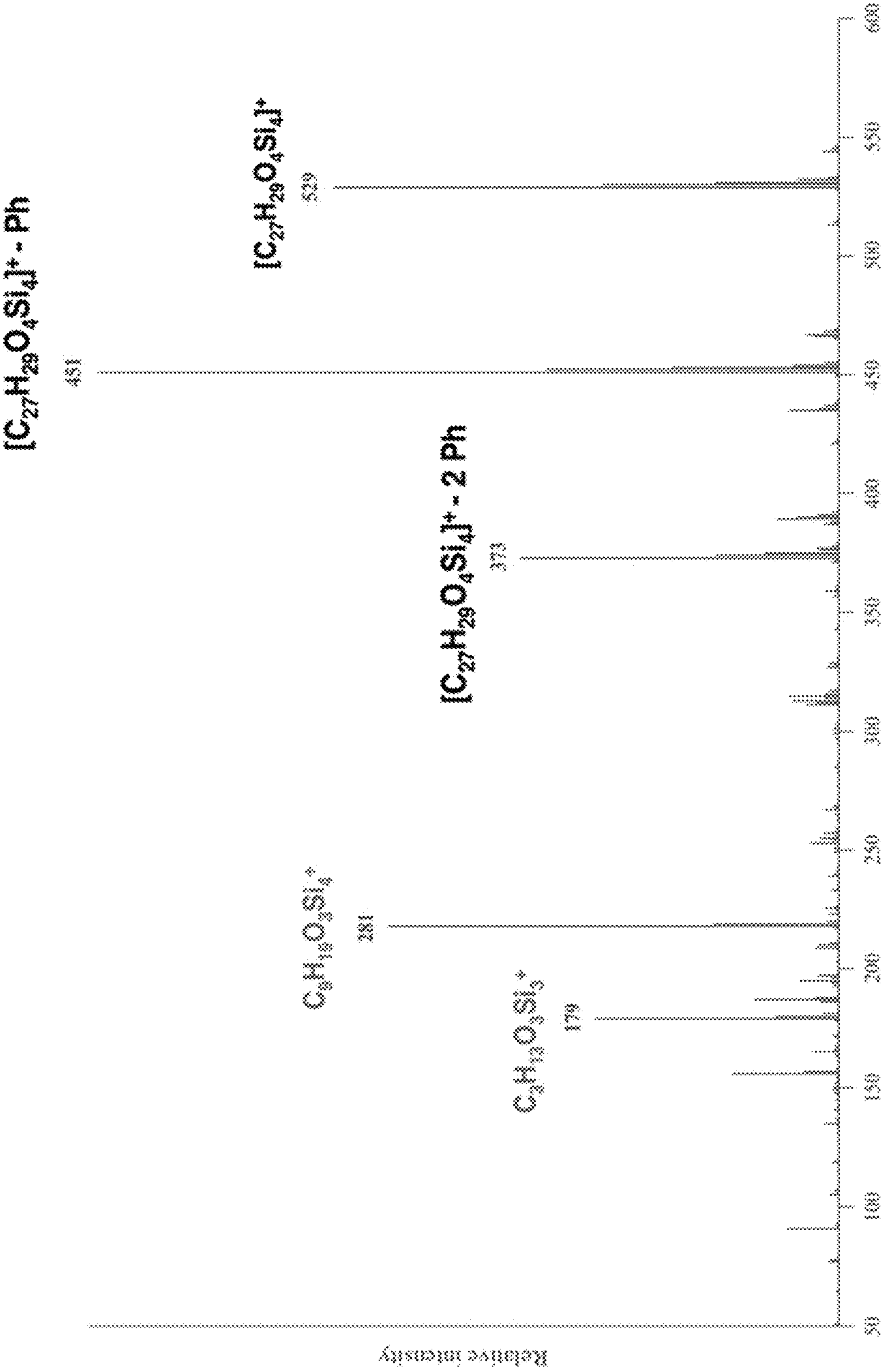
FIGS. 14A-14C: Chemical characterization of the products of polyphenylmethylsiloxane depolymerization.
Figure 14B:
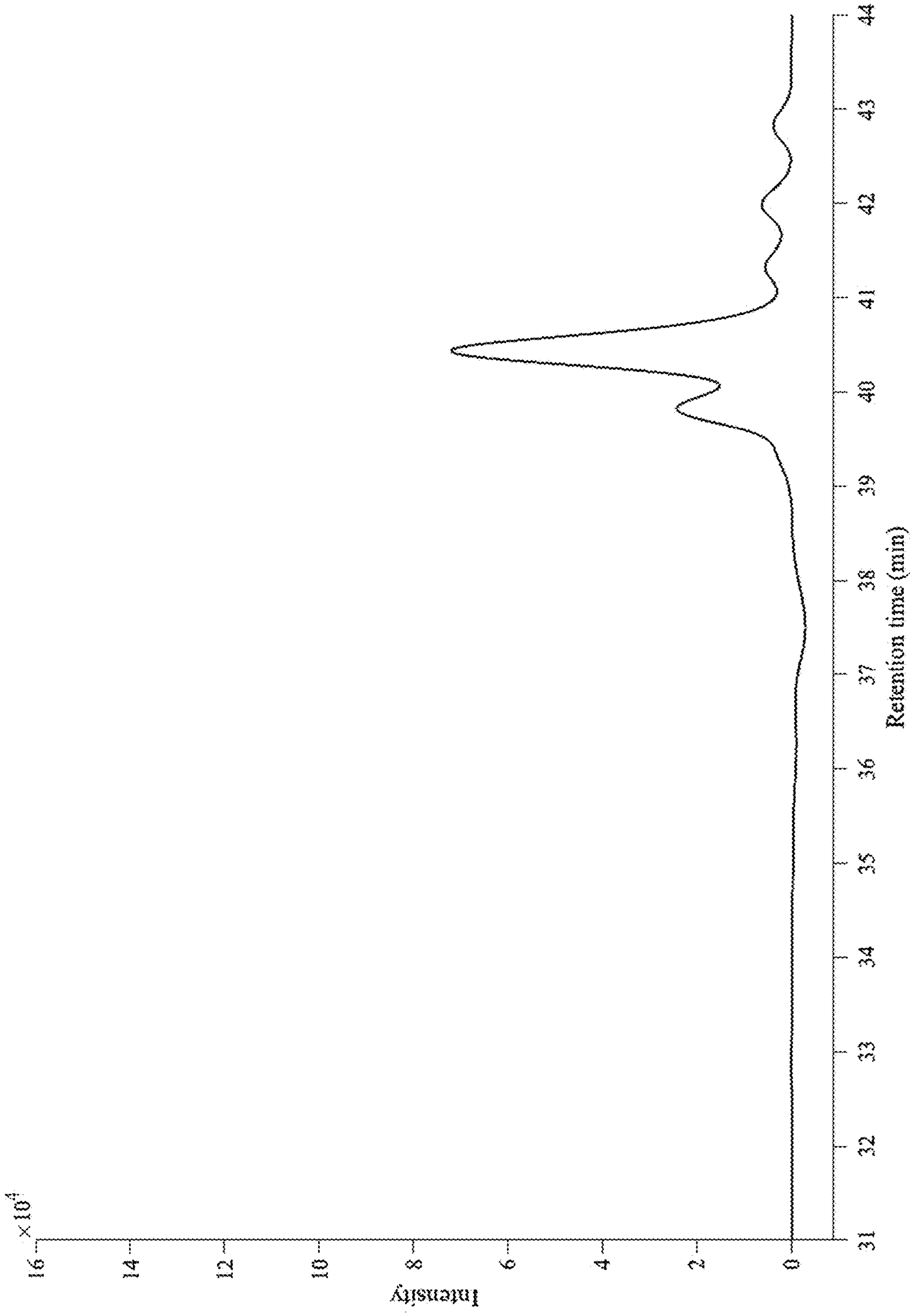
Figure 14C:
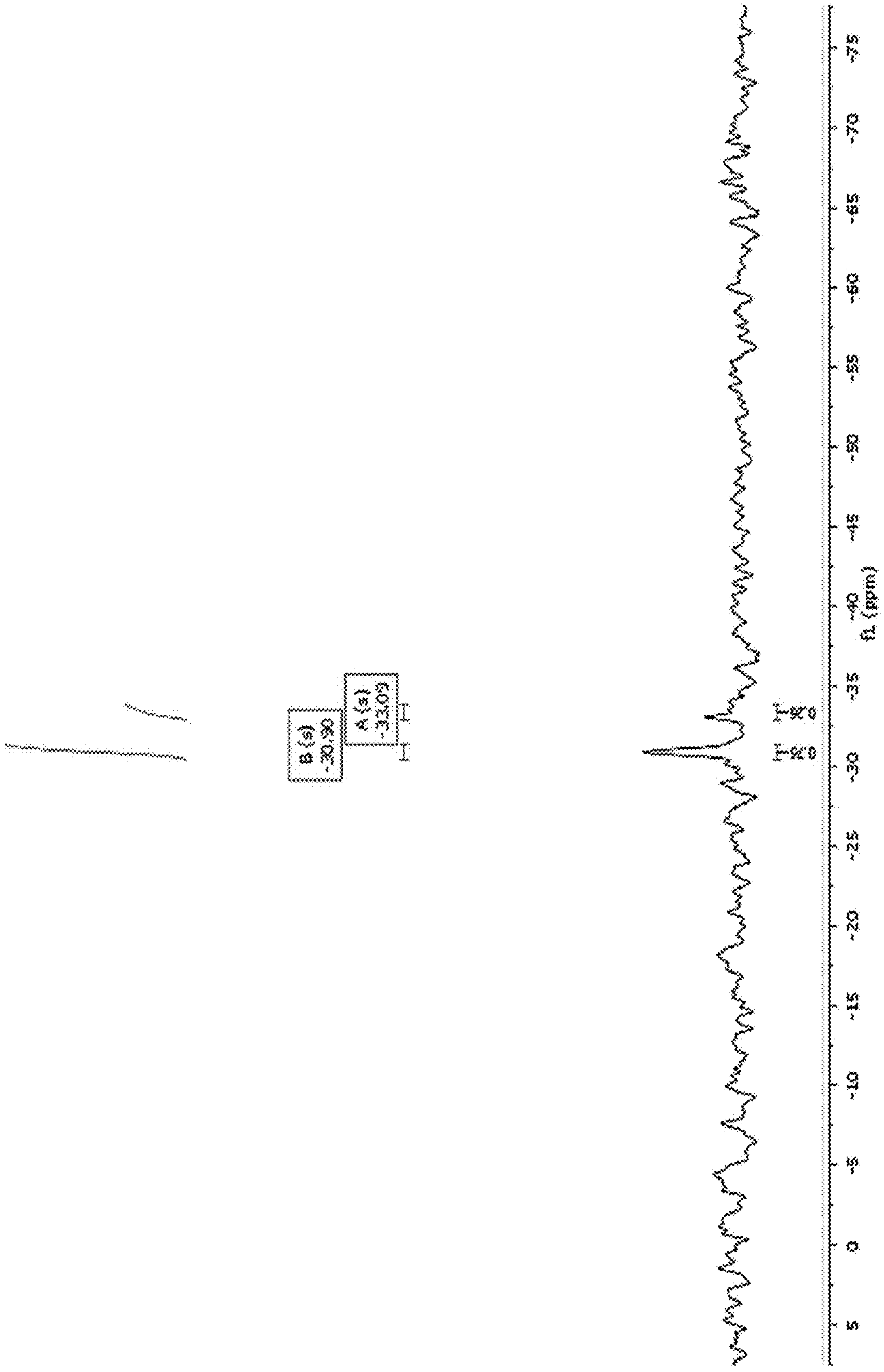
Figure 15:
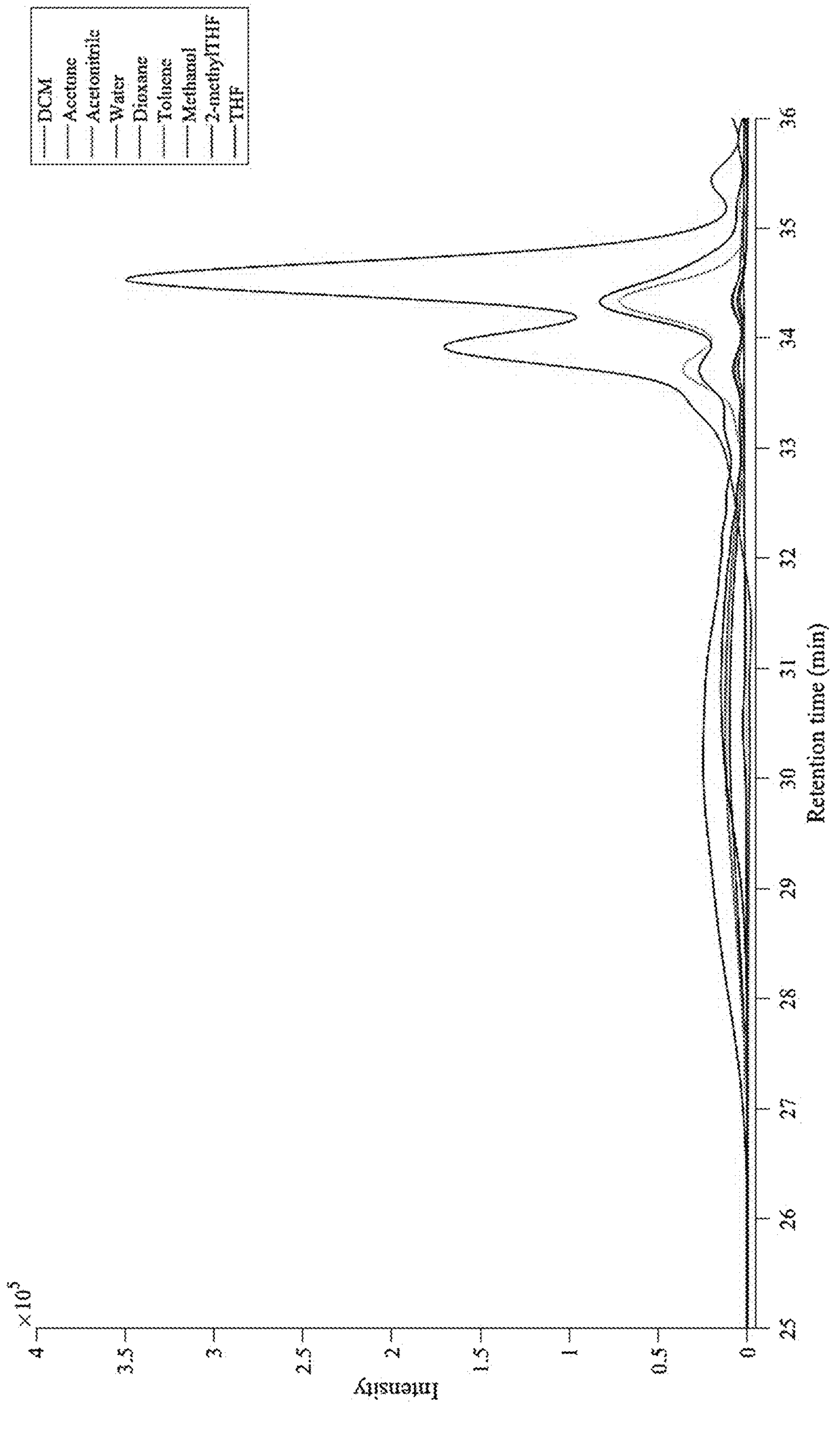
FIG. 15: GPC of depolymerization of polyphenylmethylsiloxane solvent type study.

The $^{29}$Si NMR for $D_5$ and the subsequent rearrangement reaction are shown in FIGS. 12, 19, 20, and FIG. 4, respectively. A clear conversion of $D_5$ to a mixture of $D_4$, $D_5$, and $D_6$ is observed, with the products primarily being $D_4$ and $D_6$ (Table 2). By $^{29}$Si NMR the ratio of the formed products from $D_5$ rearrangement is 27% ($D_4$), 12% ($D_5$), and 61%. GCMS of the $D_5$ reaction are shown in FIG. 12D, which can be compared to the starting $D_5$ in FIG. 11D. By GCMS, the $D_6$ product is most prominent, and shows reasonable fragmentation patterns for this set of mixed products. The scrambling of $D_5$ led to much cleaner products than initially expected for the dimethyl systems.

Figure 4A:
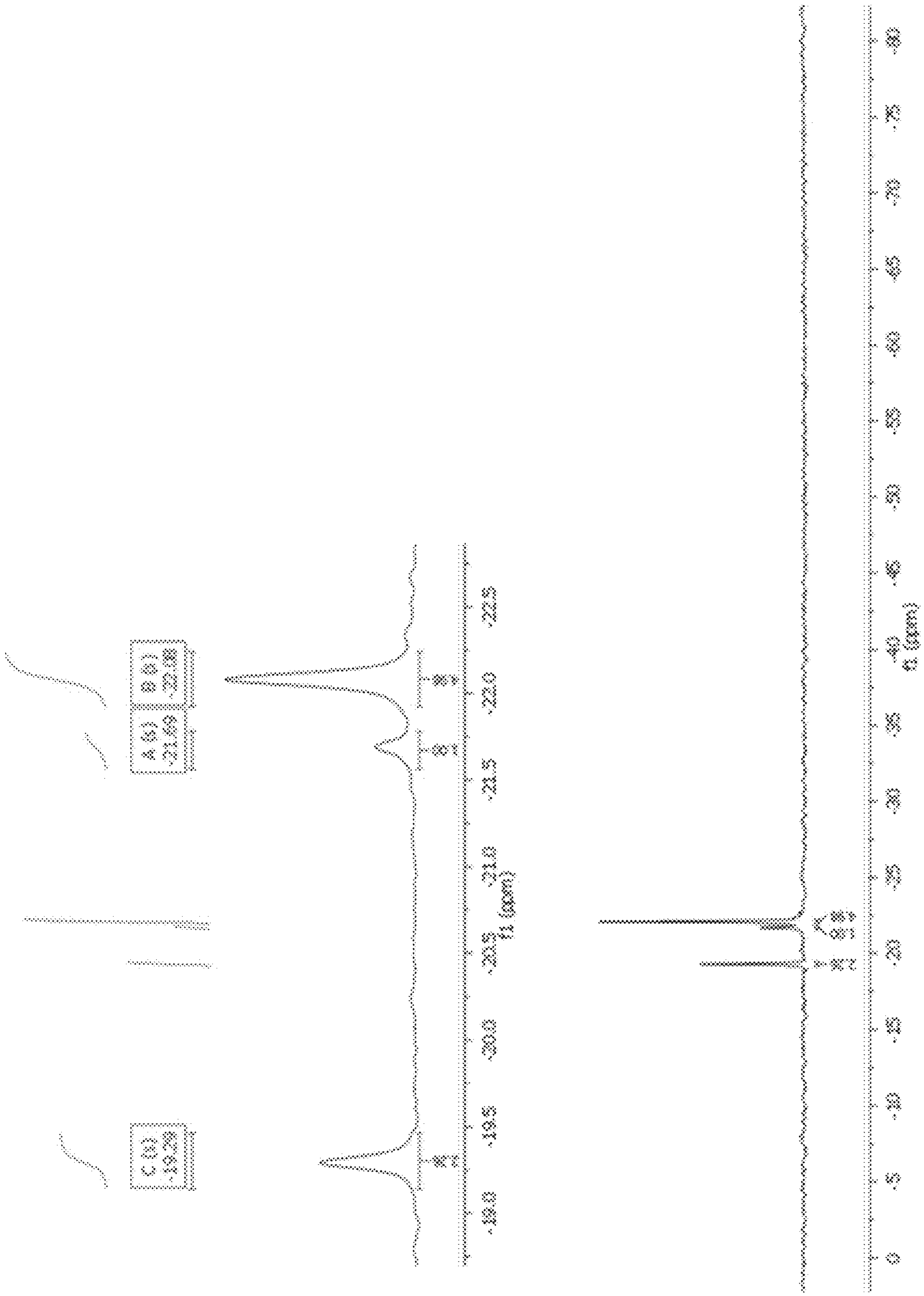
FIGS. 4A-4B: $^{29}Si$ NMR of the products of $D_5$ (FIG. 4A) and 6000 Da vinyl terminated PDMS (FIG. 4B). A is product $D_5$, B is product $D_6$, and C is product $D_4$.
Figure 4B:
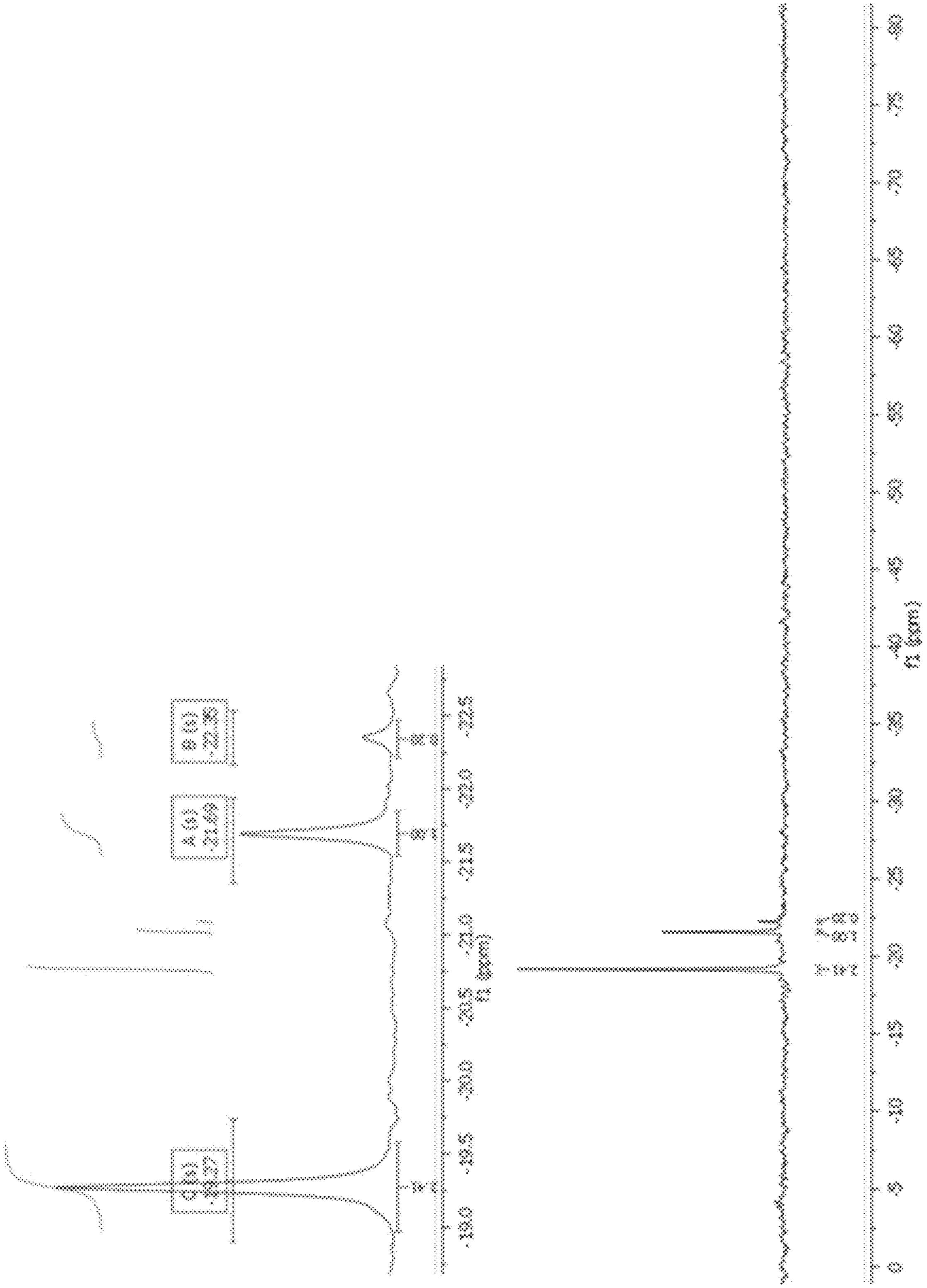
Figure 5A:
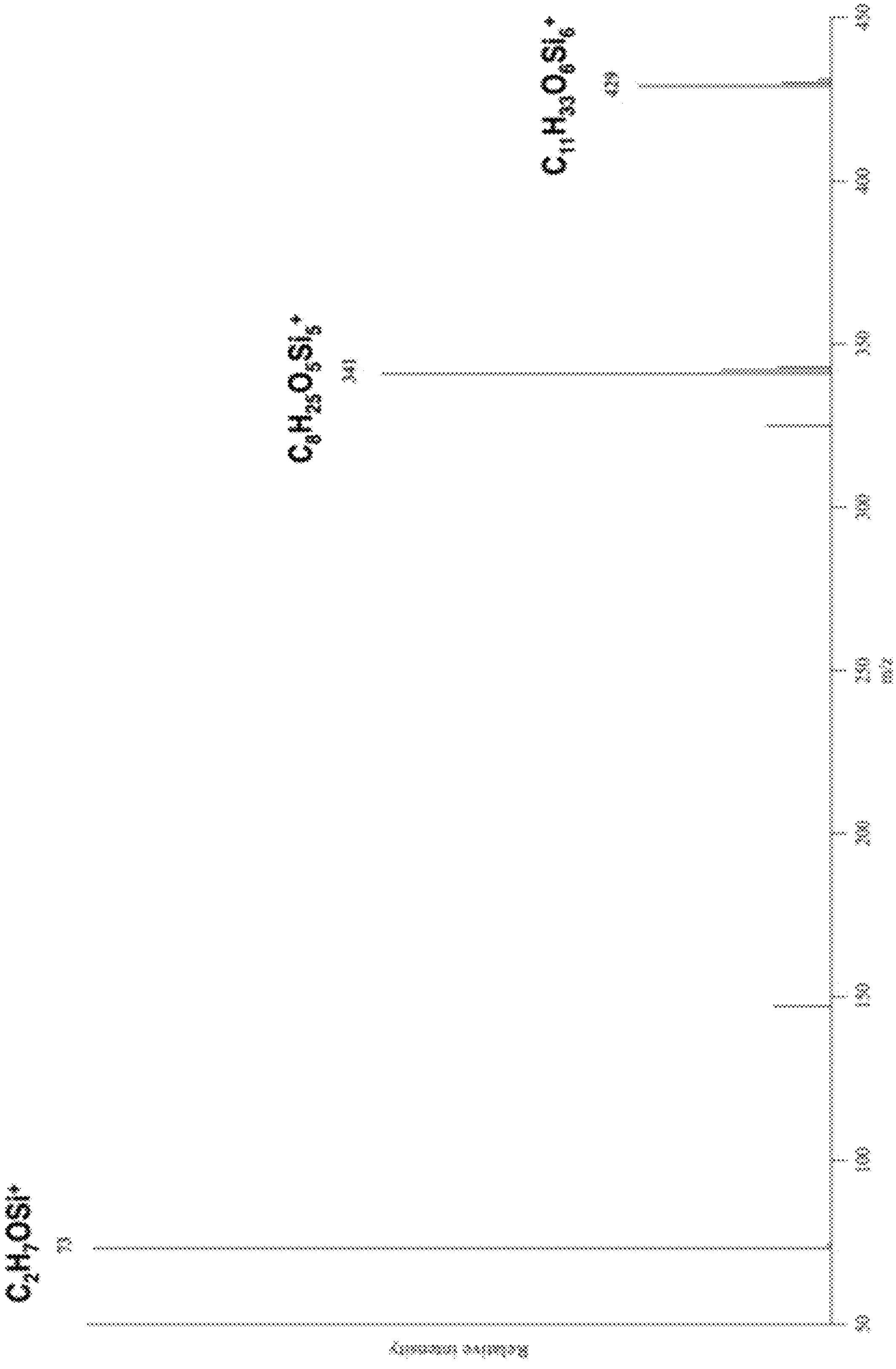
FIGS. 5A-5B: GCMS of products of Mw~6000 Da vinyl terminated PDMS, $D_5$ (FIG. 5A) and $D_6$ (FIG. 5B).
Figure 5B:
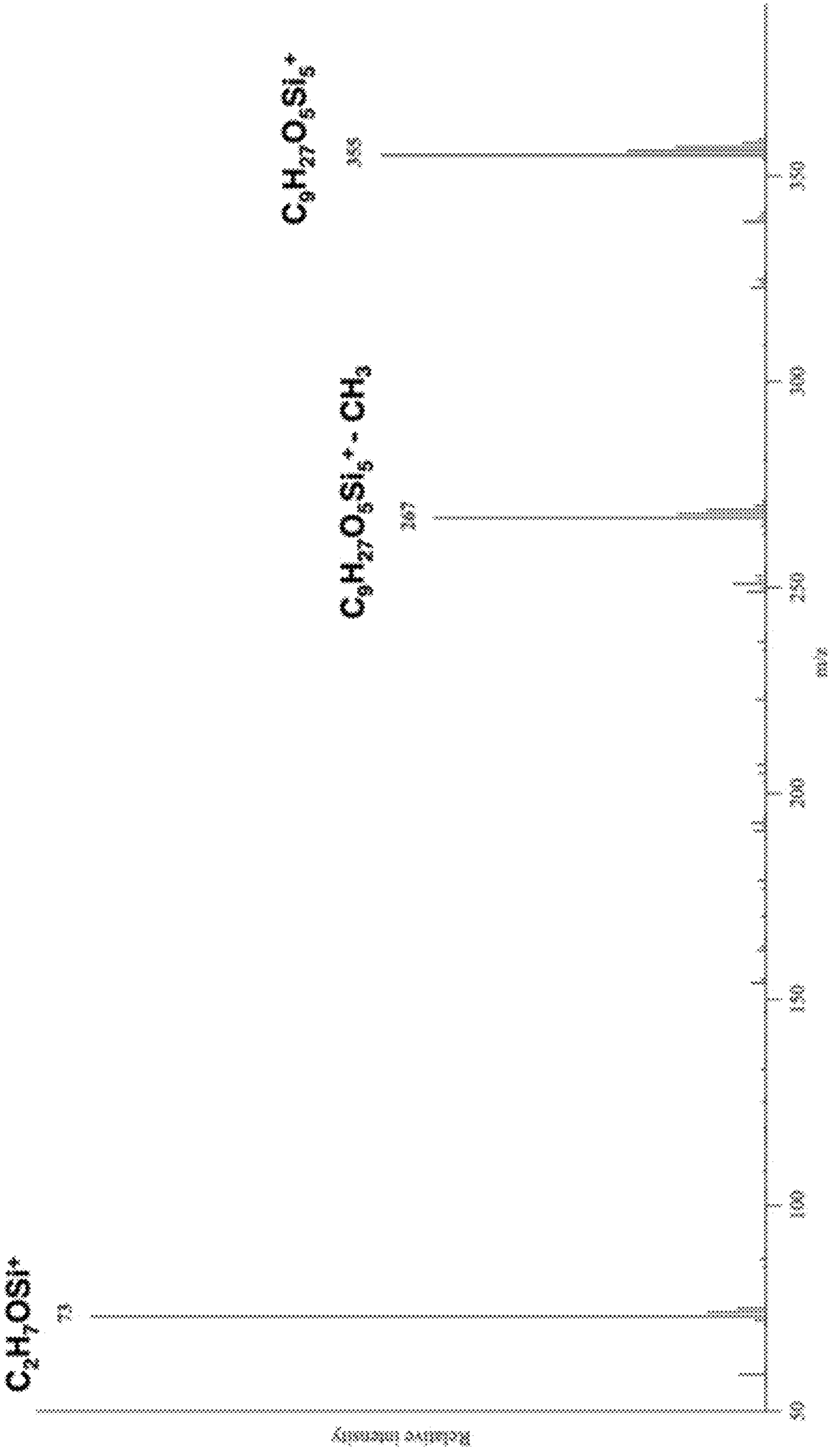
Figure 19A:
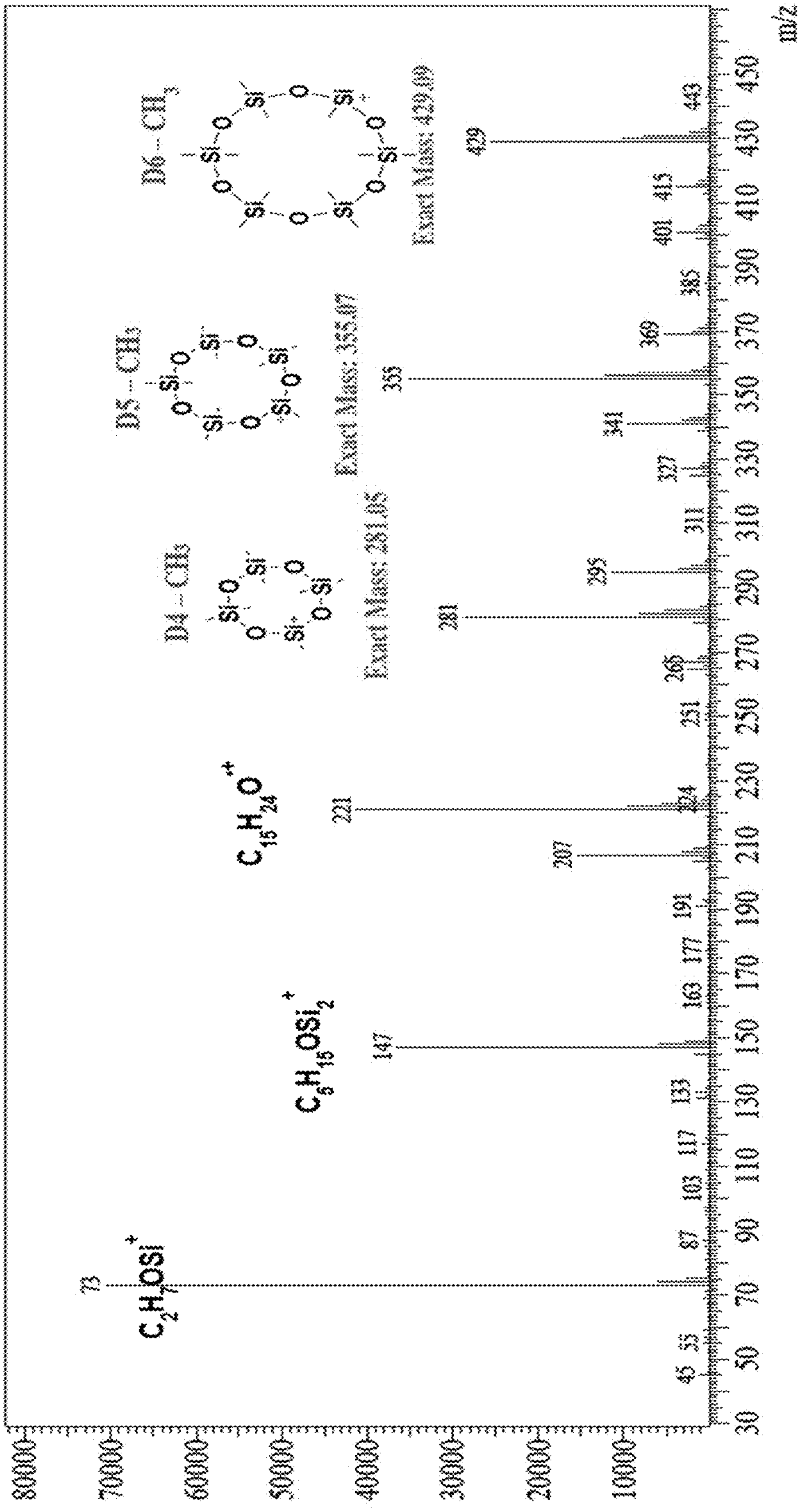
FIGS. 19A-19B: Depolymerization of polydimethylsiloxane (Mw≈500) example study.
Figure 19B:
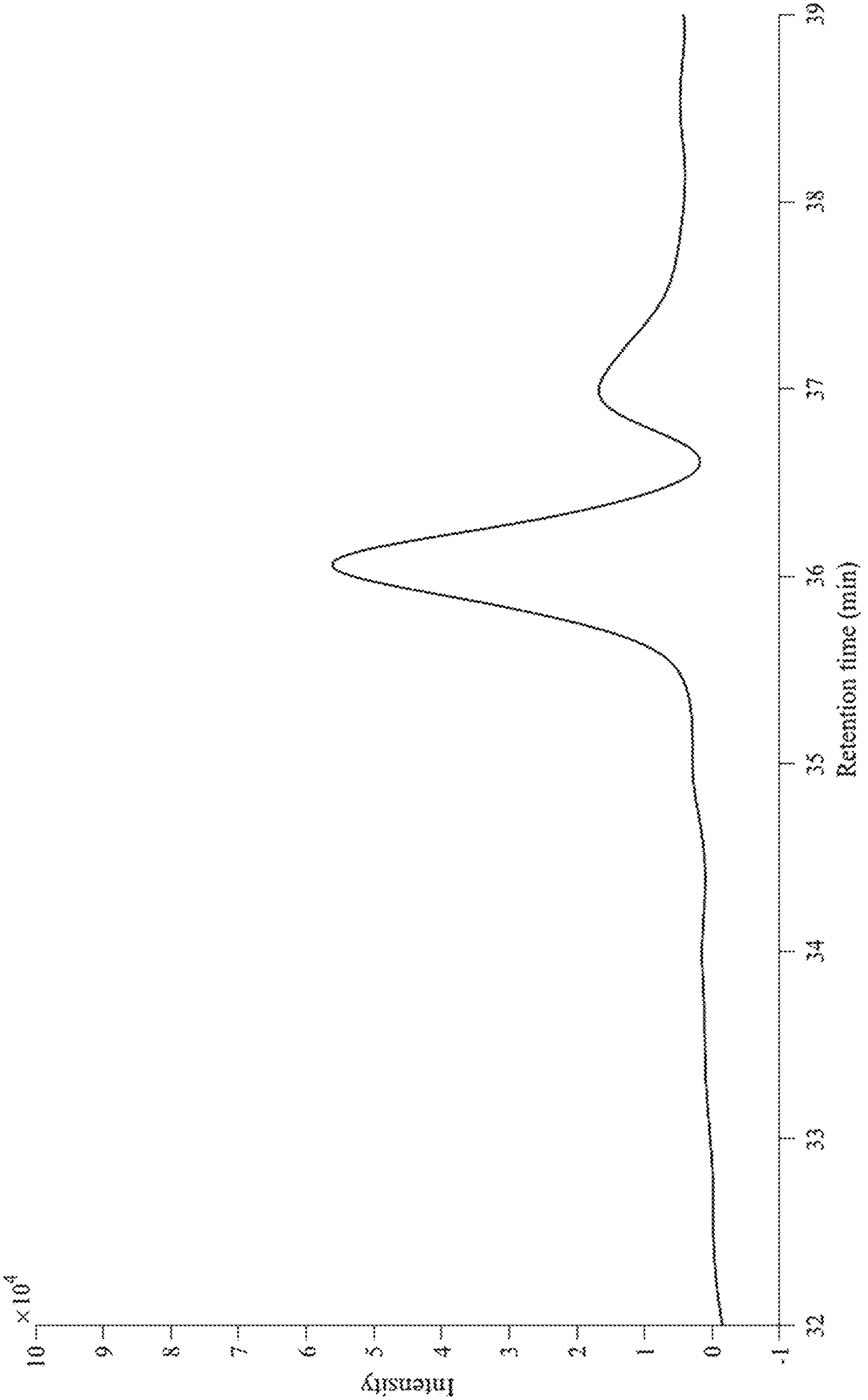
Figure 20A:
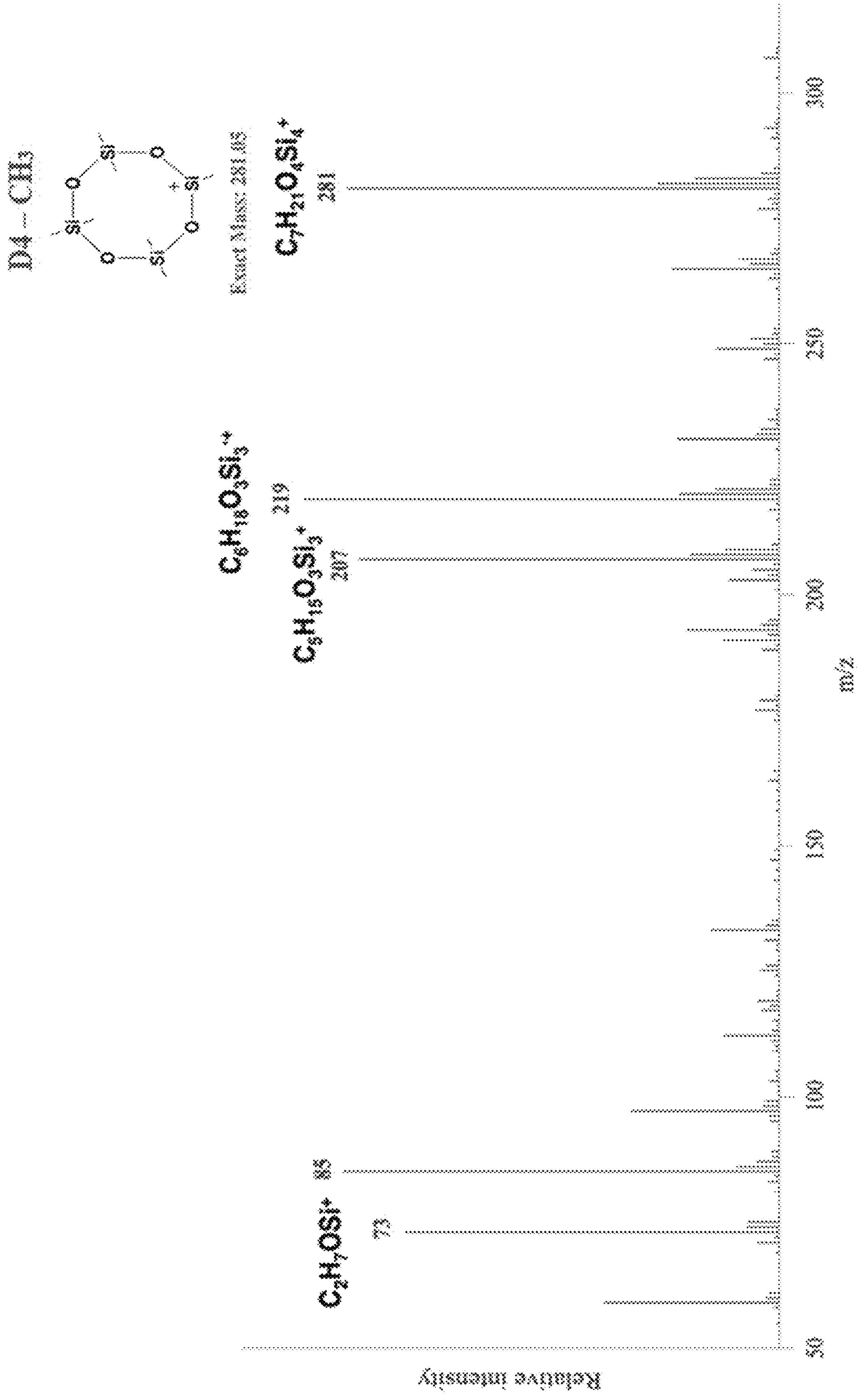
FIGS. 20A-20C: Depolymerization of polydimethylsiloxane (Mw≈6000) example study.
Figure 20B:
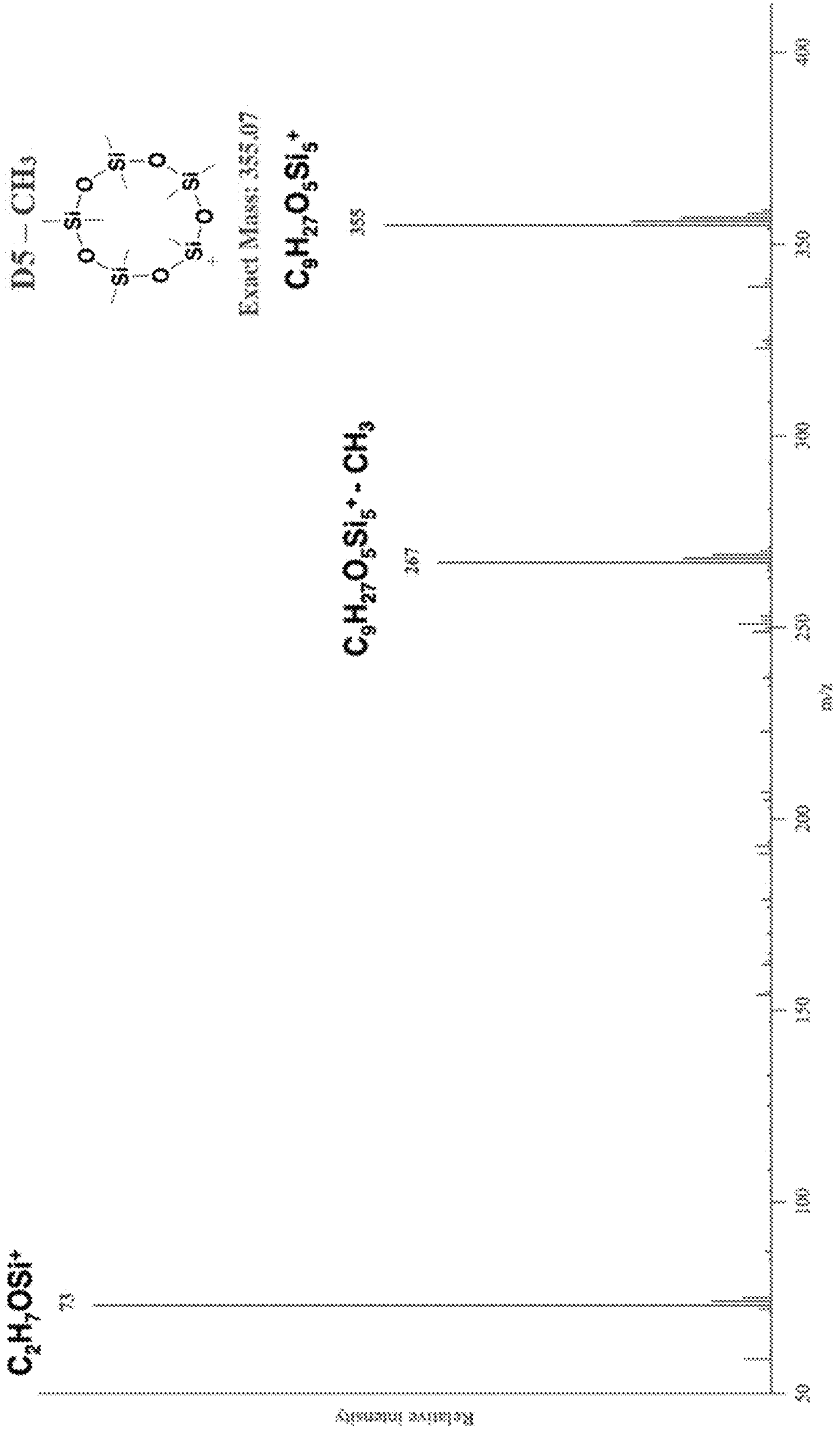
Figure 20C:
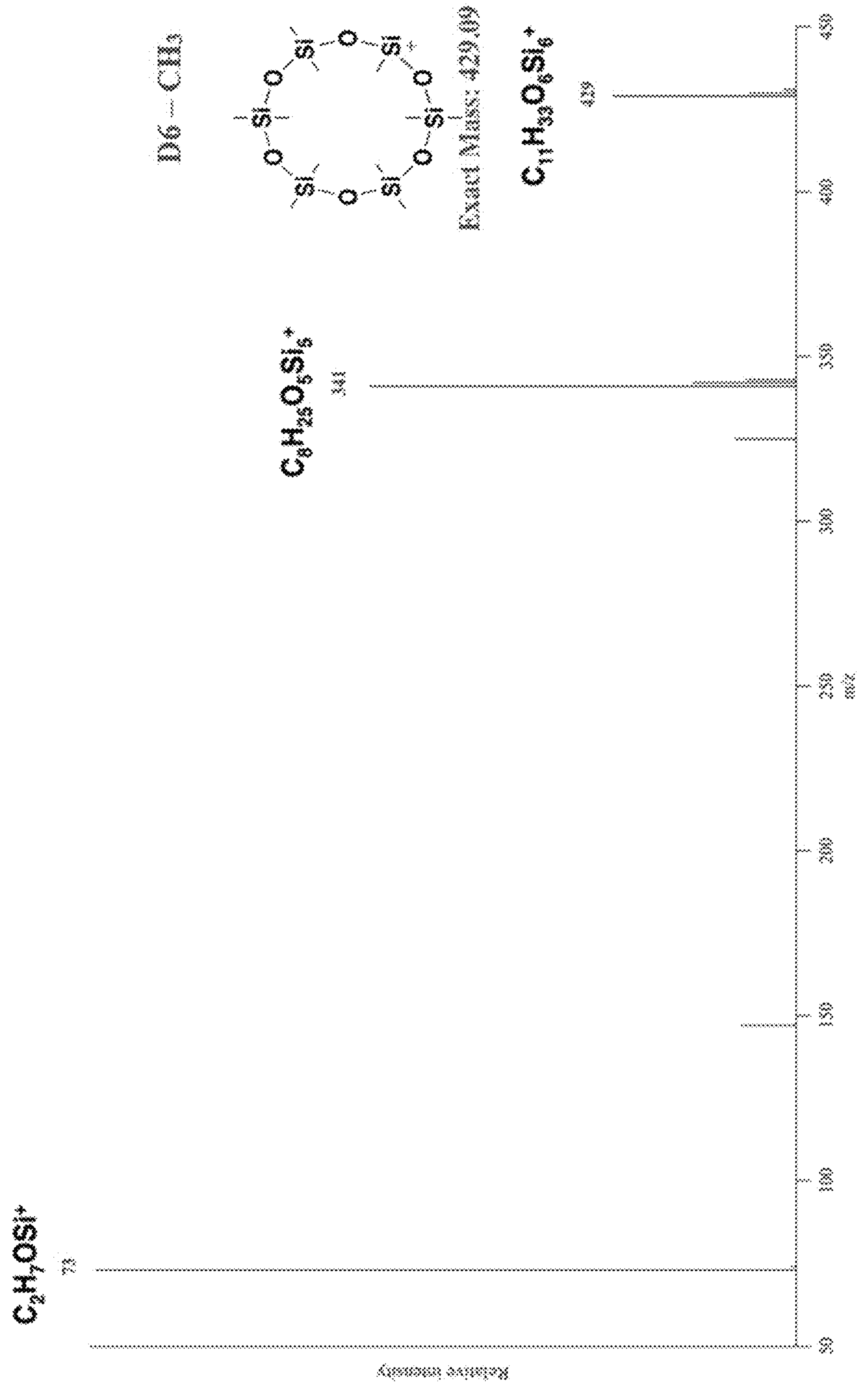
Figure 21A:
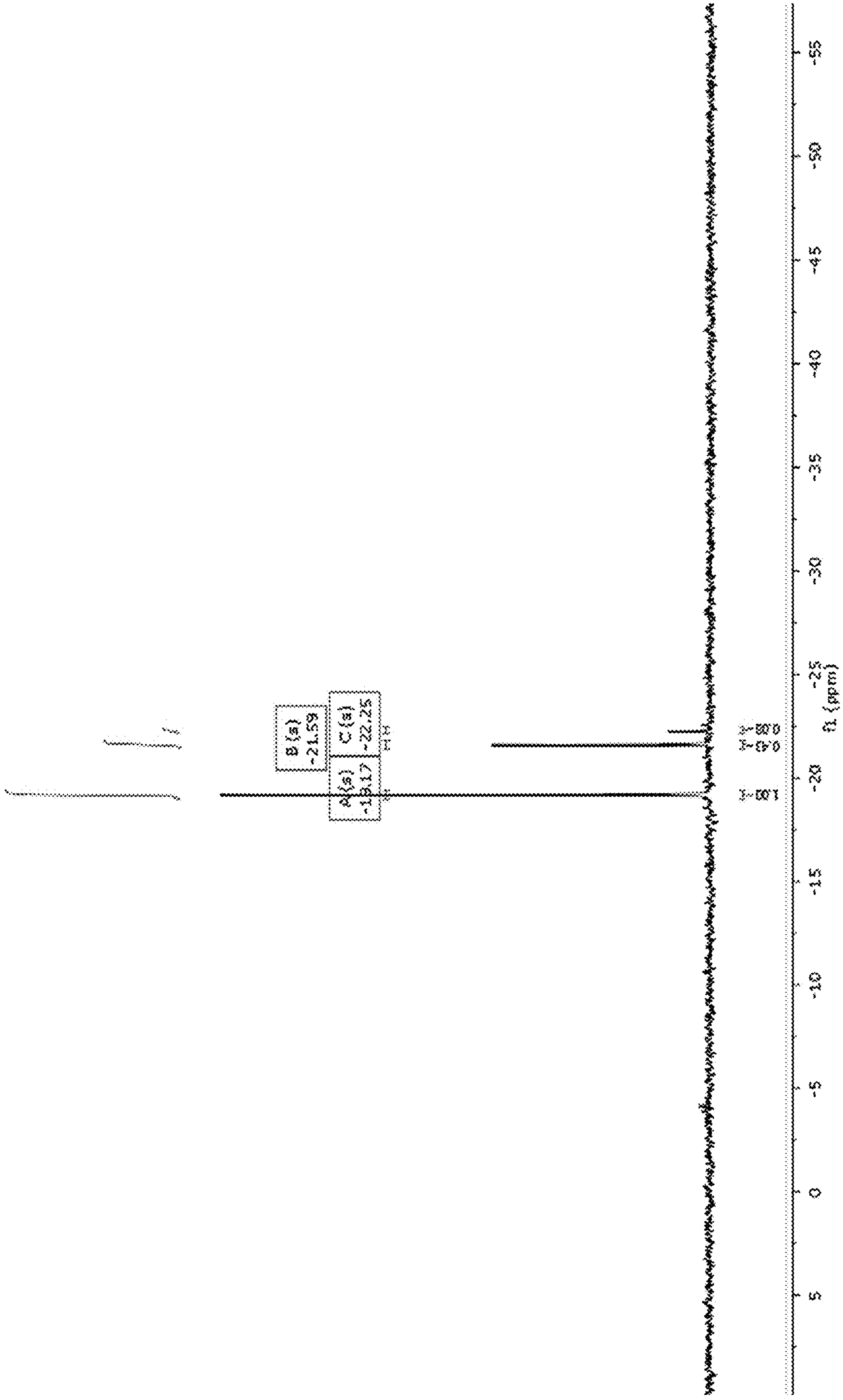
FIGS. 21A-21B: $^{29}Si$ NMR products of polydimethylsiloxane at 59.6 MHz, 6000 mw (FIG. 21A), and GPC of products of polydimethylsiloxane 6000 mw depolymerization (FIG. 21B).
Figure 21B:
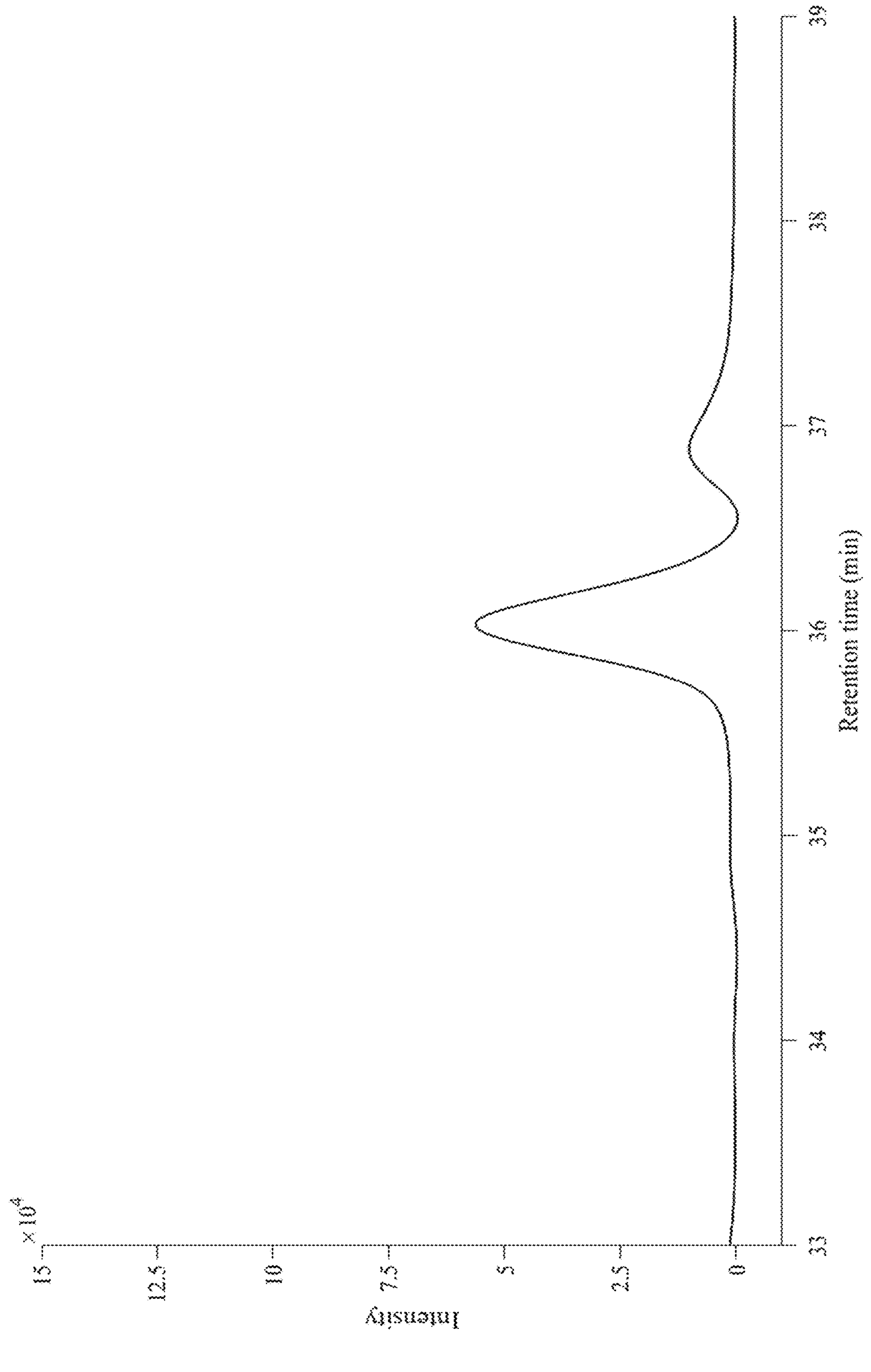
Figure 22A:
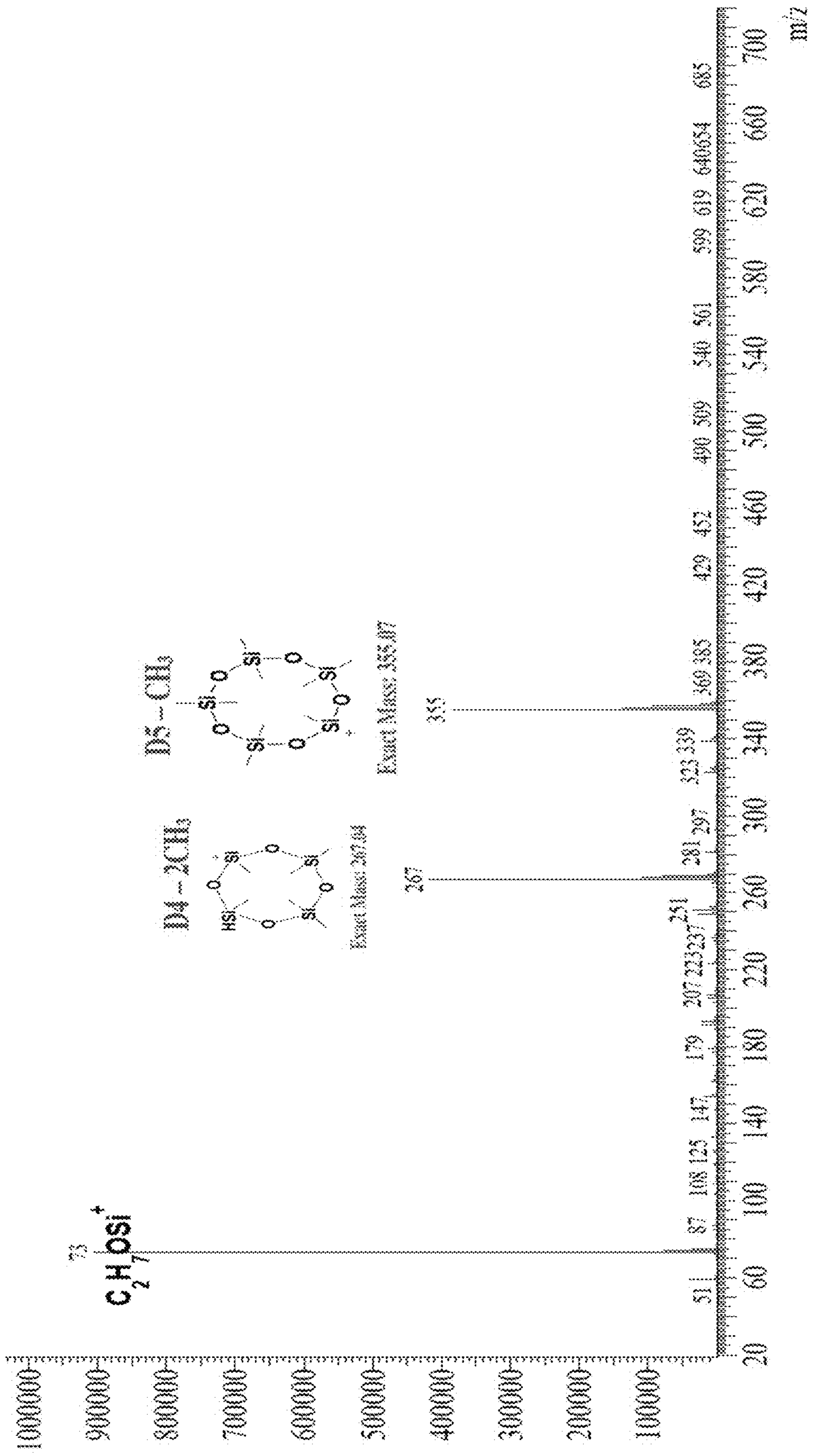
FIGS. 22A-22B: Depolymerization of Sylgard example study.
Figure 22B:
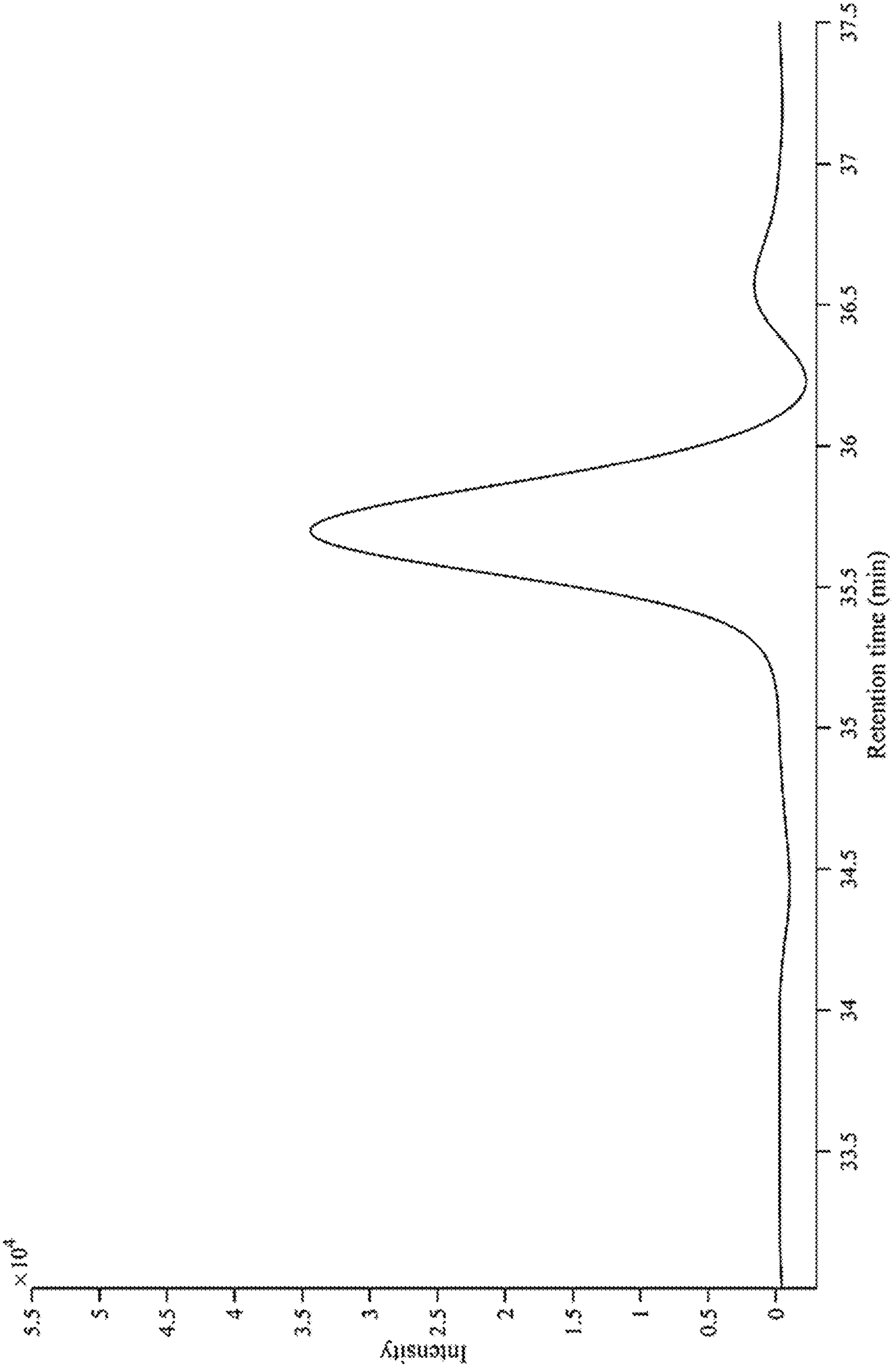
Figure 23A:
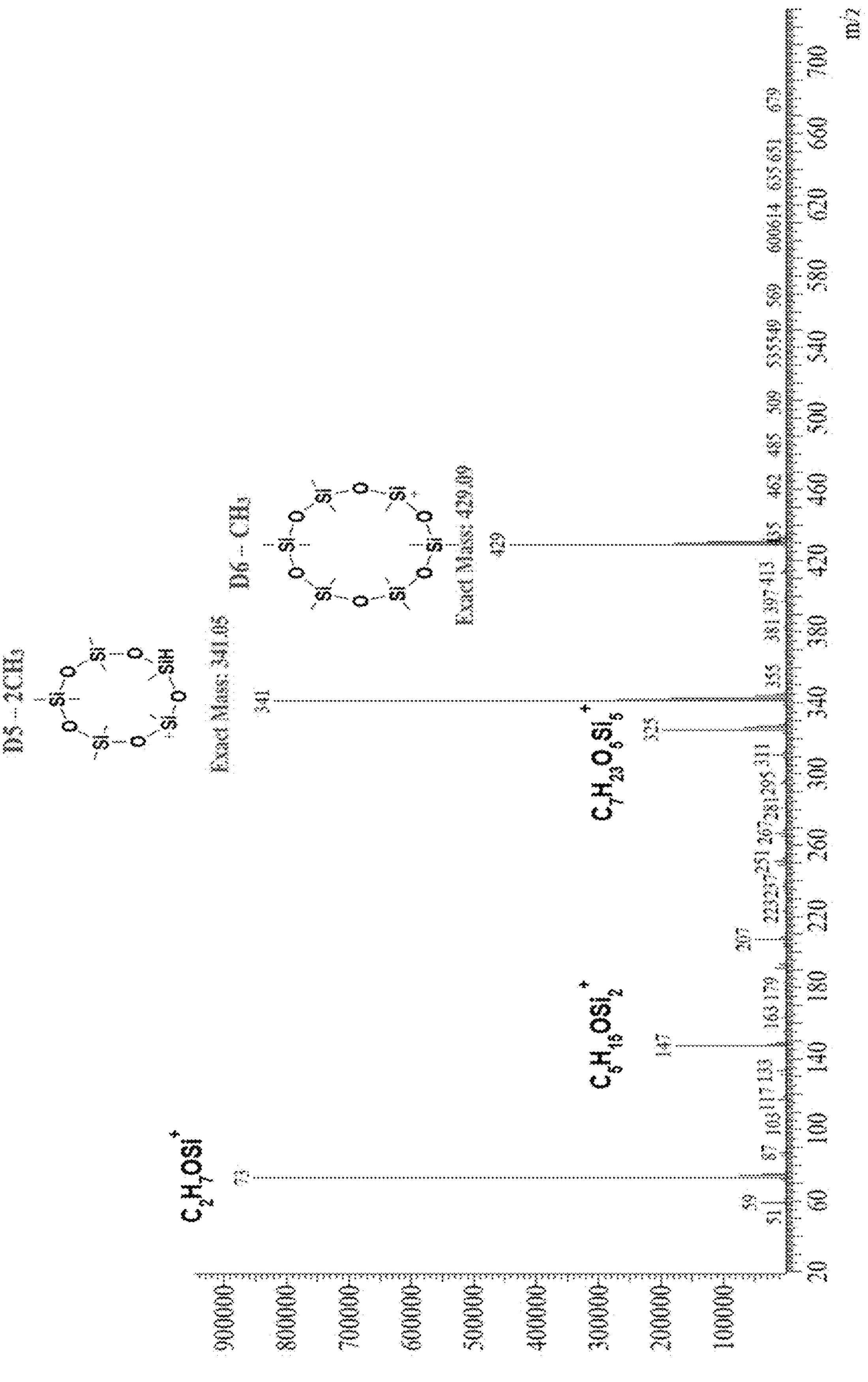
FIGS. 23A-23B: Depolymerization of Ecoflex 00-30 example study.
Figure 23B:
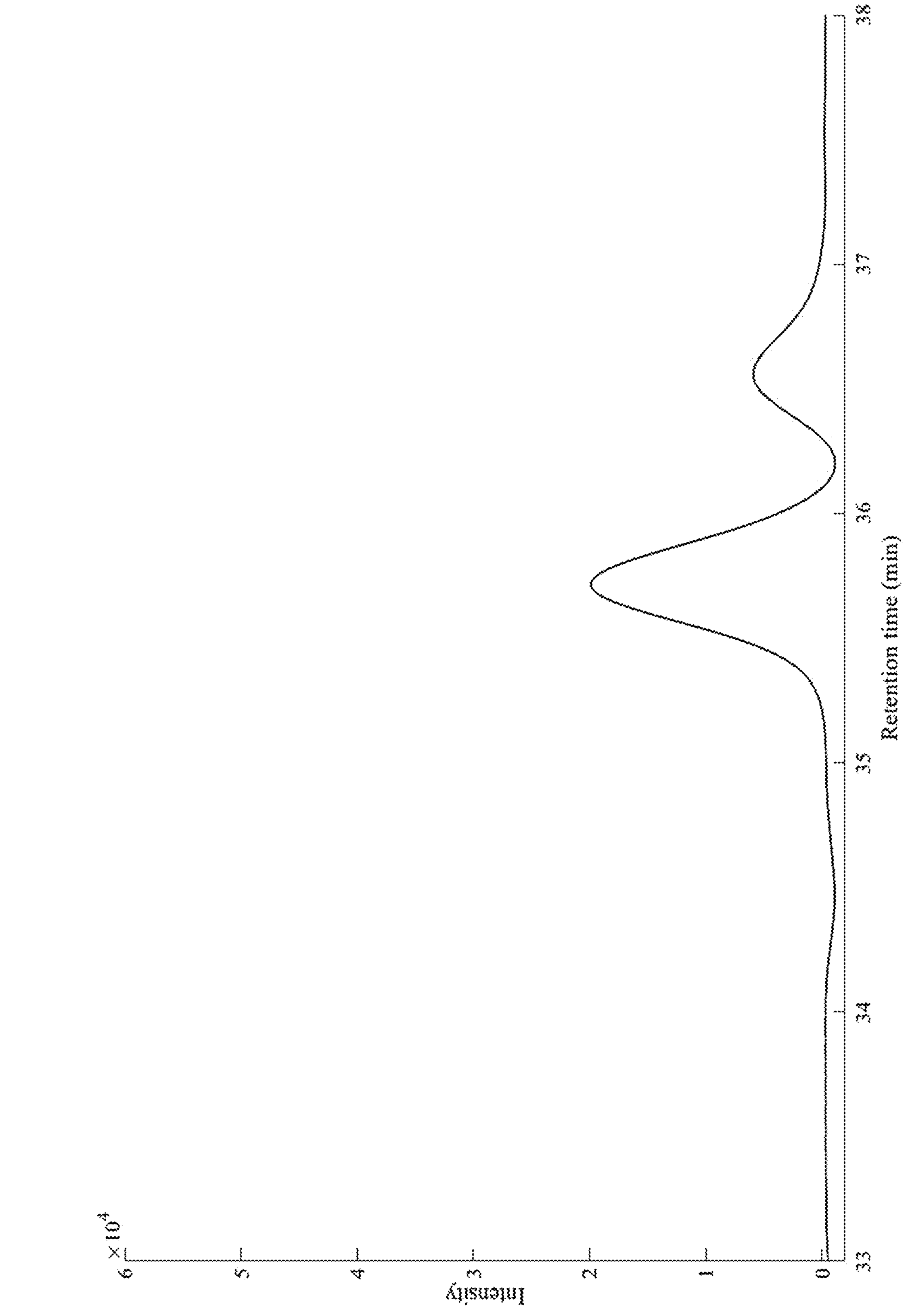
Figure 24A:
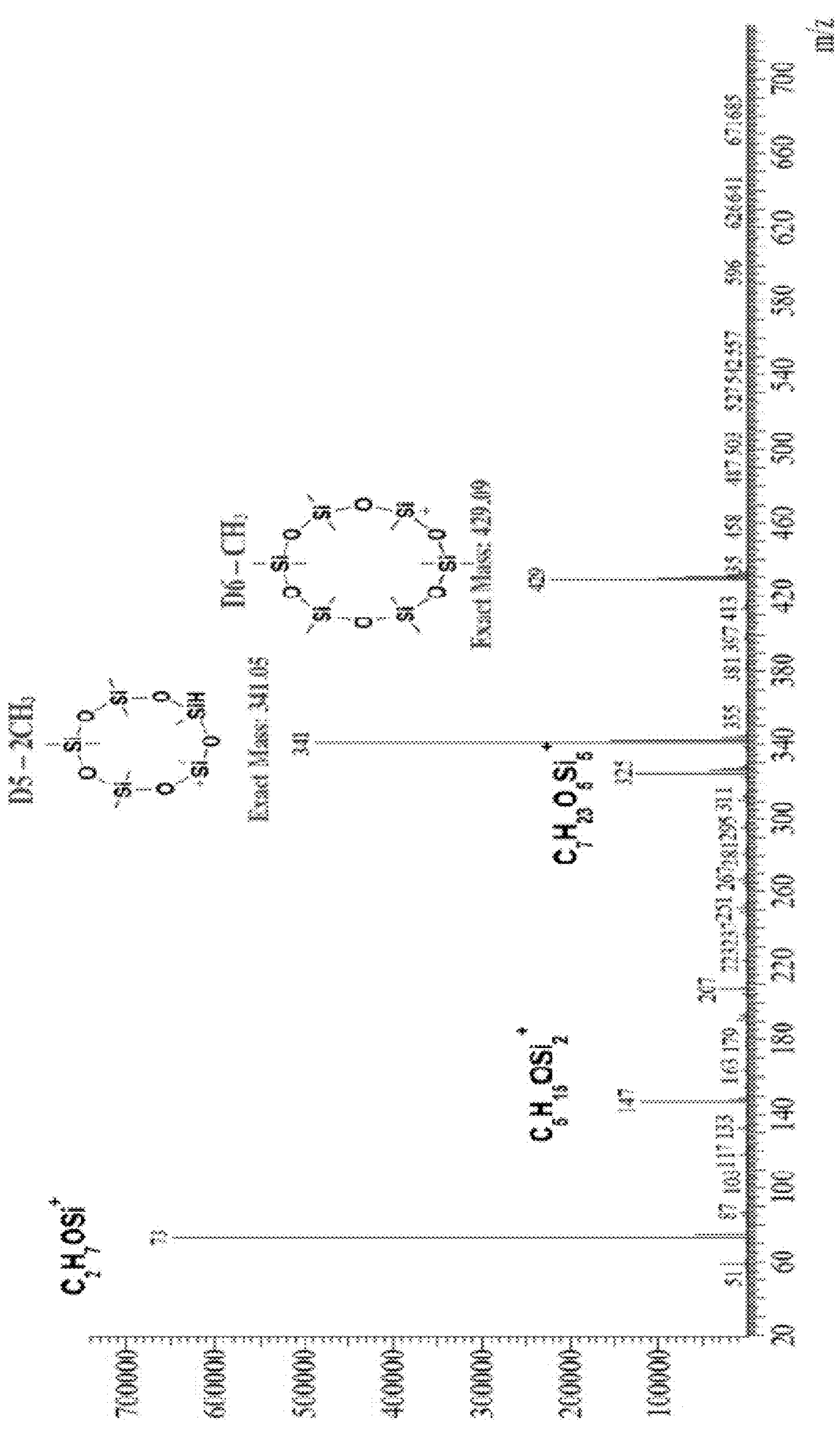
FIGS. 24A-24B: Depolymerization of Smooth-Sil 950 example study.
Figure 24B:
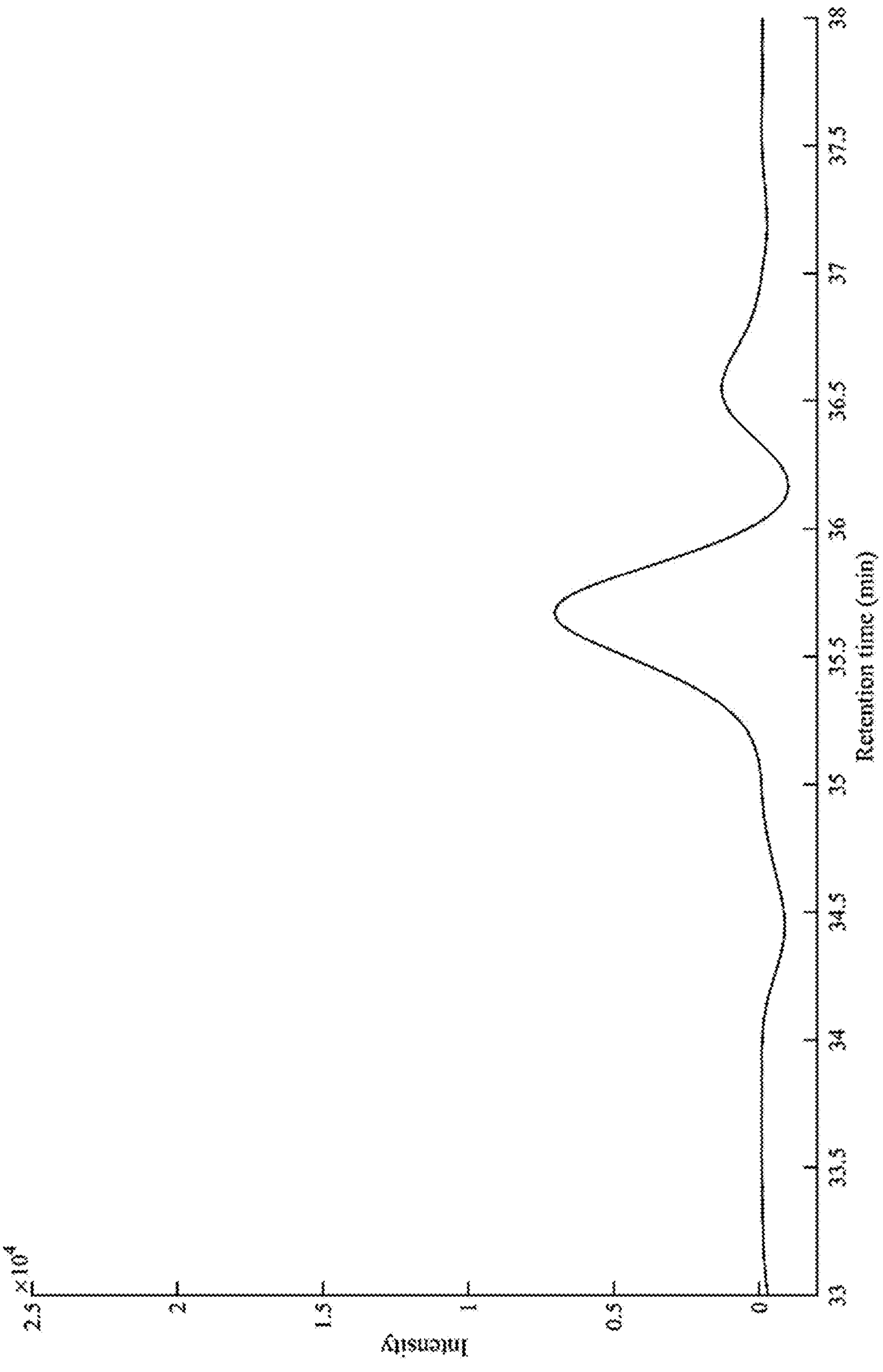

The depolymerization reactions of the two linear PDMS (vinyl terminated) systems of 500 and 6000 Da show very similar results to $D_5$, indicating that the products formed are highly consistent across the dimethylsiloxy starting materials (Table 2). However, a slight variation in cyclic product ratios is observed. This may be due to slight differences in equilibration time, similar to observations in silsesquioxane equilibration chemistry. The GCMS and $^{29}$Si NMR spectra for the 6000 Da PDMS depolymerization are shown in FIG. 4B and FIGS. 5A-5B, respectively. The data here looks nearly identical to that of $D_5$ rearrangement (FIG. 12D), however the product ratios tend to favor the smaller ring sizes as evidenced in $^{29}$Si NMR, ($D_6$), 67% ($D_4$), 28% ($D_5$), and 6% ($D_6$). Though by $^{29}$Si NMR the product ratios are quite clear, by GCMS the chromatogram is quite complex for most of these derivatives due to significant ring structure breakdown and mixing with column blead materials, especially for the smaller rings (FIG. 20A). This complexity limited the use of GC peak integration to determine product ratios. GPCs and 500 Da PDMS data are shown in FIGS. 19B and 20C. By GPC the depolymerization is very clear by observing the disappearance of the broad peaks from ~31 to 34.5 min and growth of the cyclics peak at 35.3 min. Note that the vinyl termini are a small component and are not discernable in the product mixtures.

Figure 6A:
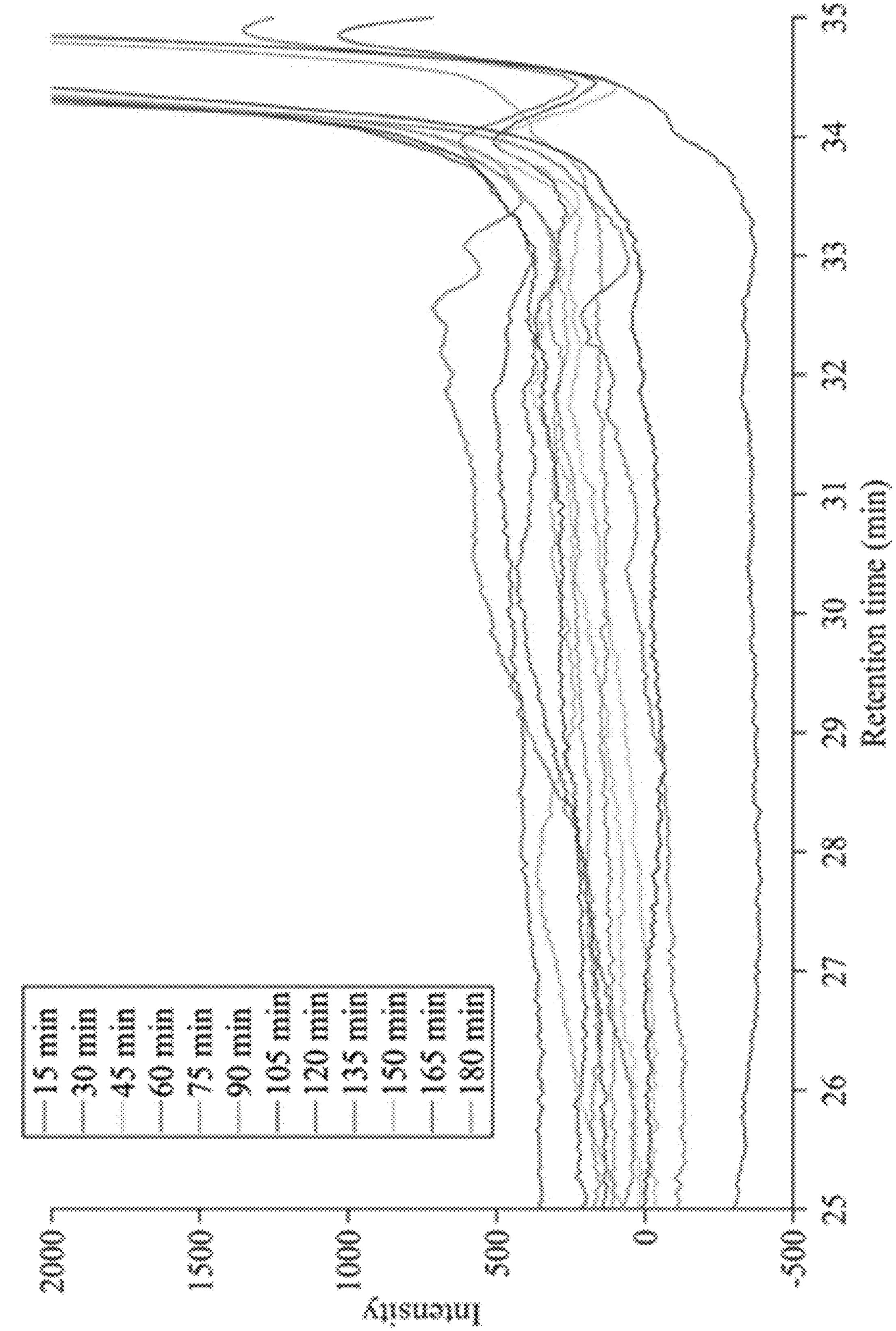
FIGS. 6A-6B: GPC graphs of polydimethylsiloxane ~6000 Da kinetic study, 2 g of polydimethylsiloxane polymer, 200 mL of THF, and 0.2 mL of TBAF under room temperature.
Figure 6B:
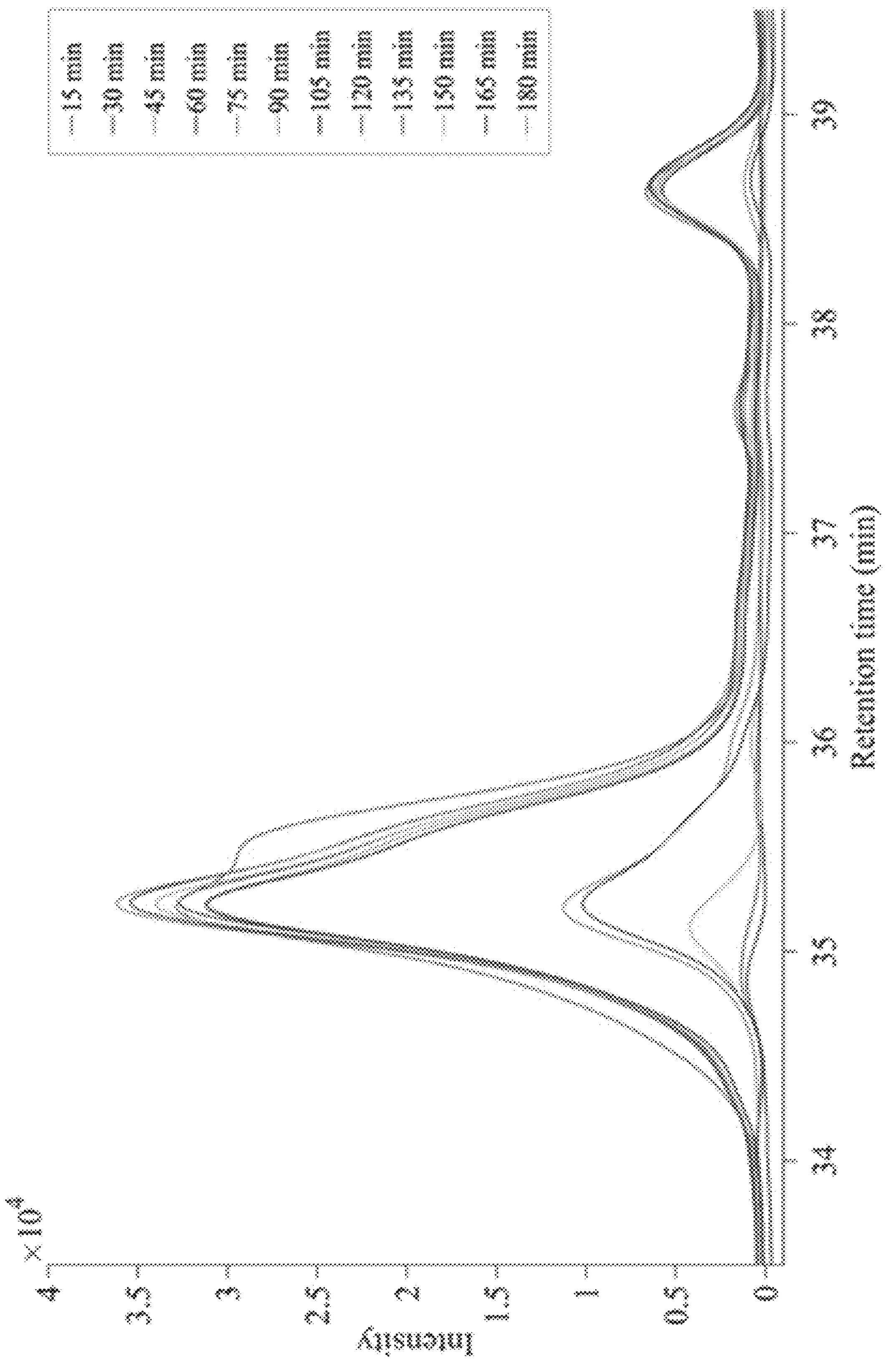
Figure 7A:
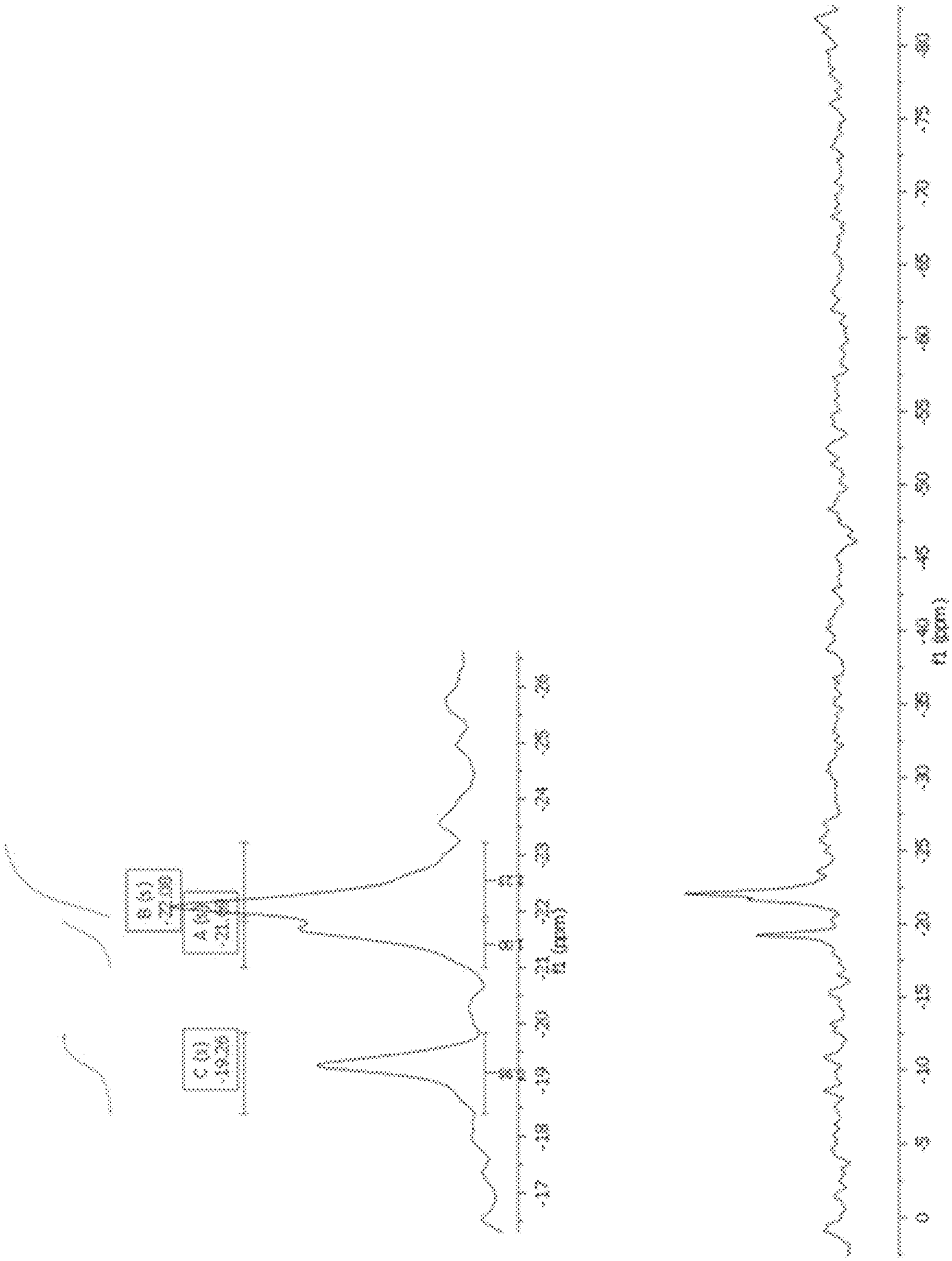
FIGS. 7A-7D.
Figure 7B:
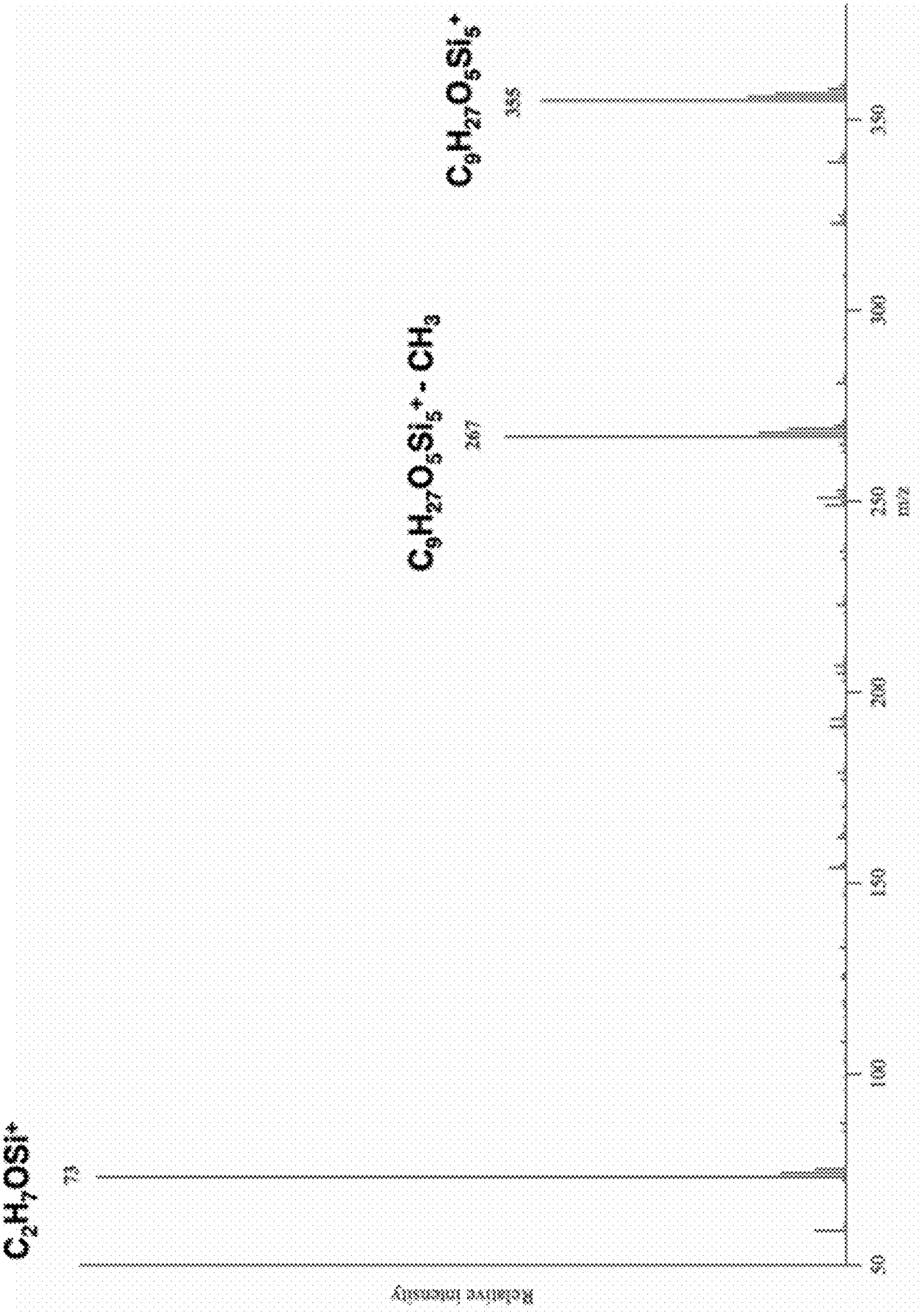
Figure 7C:
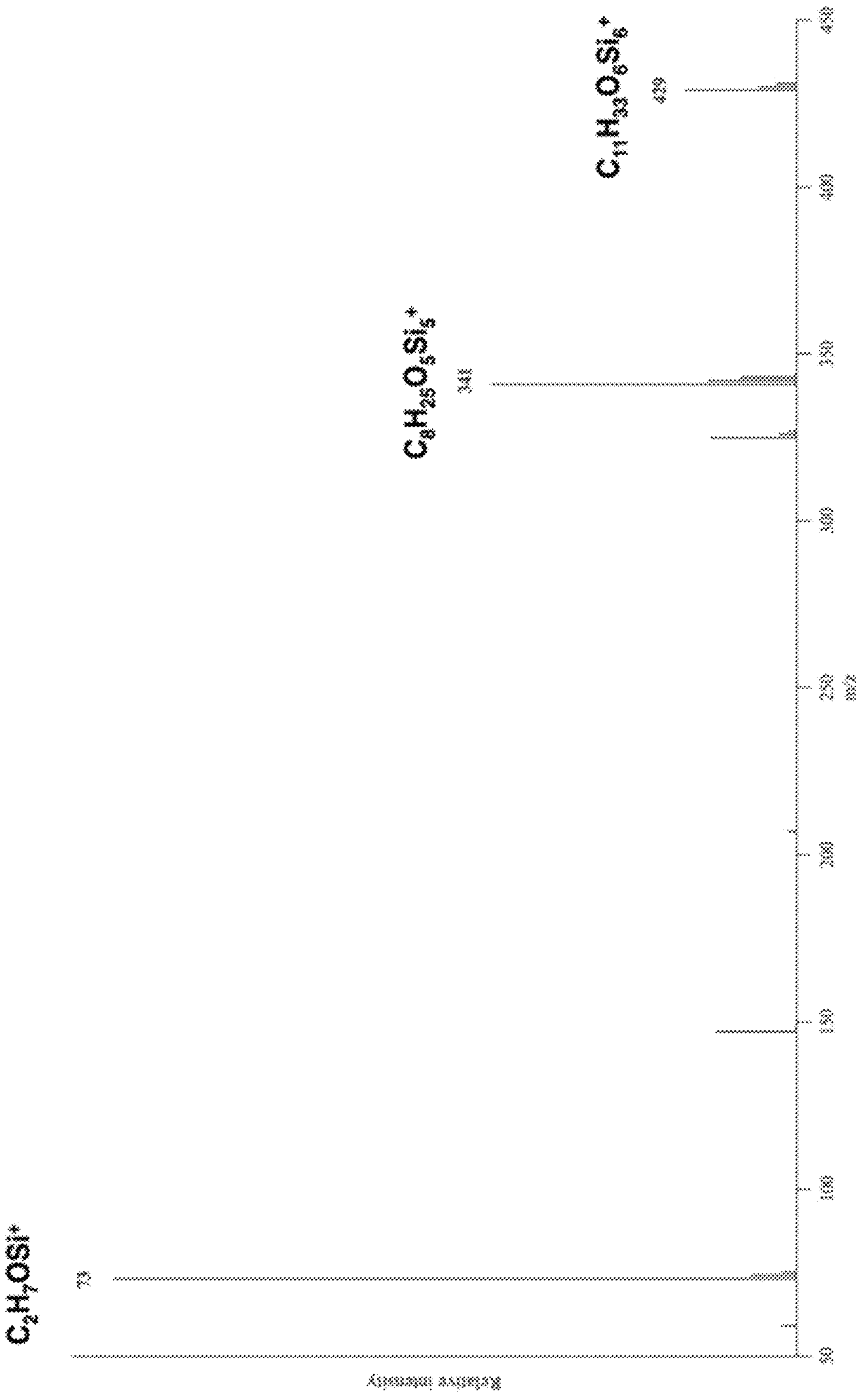
Figure 7D:
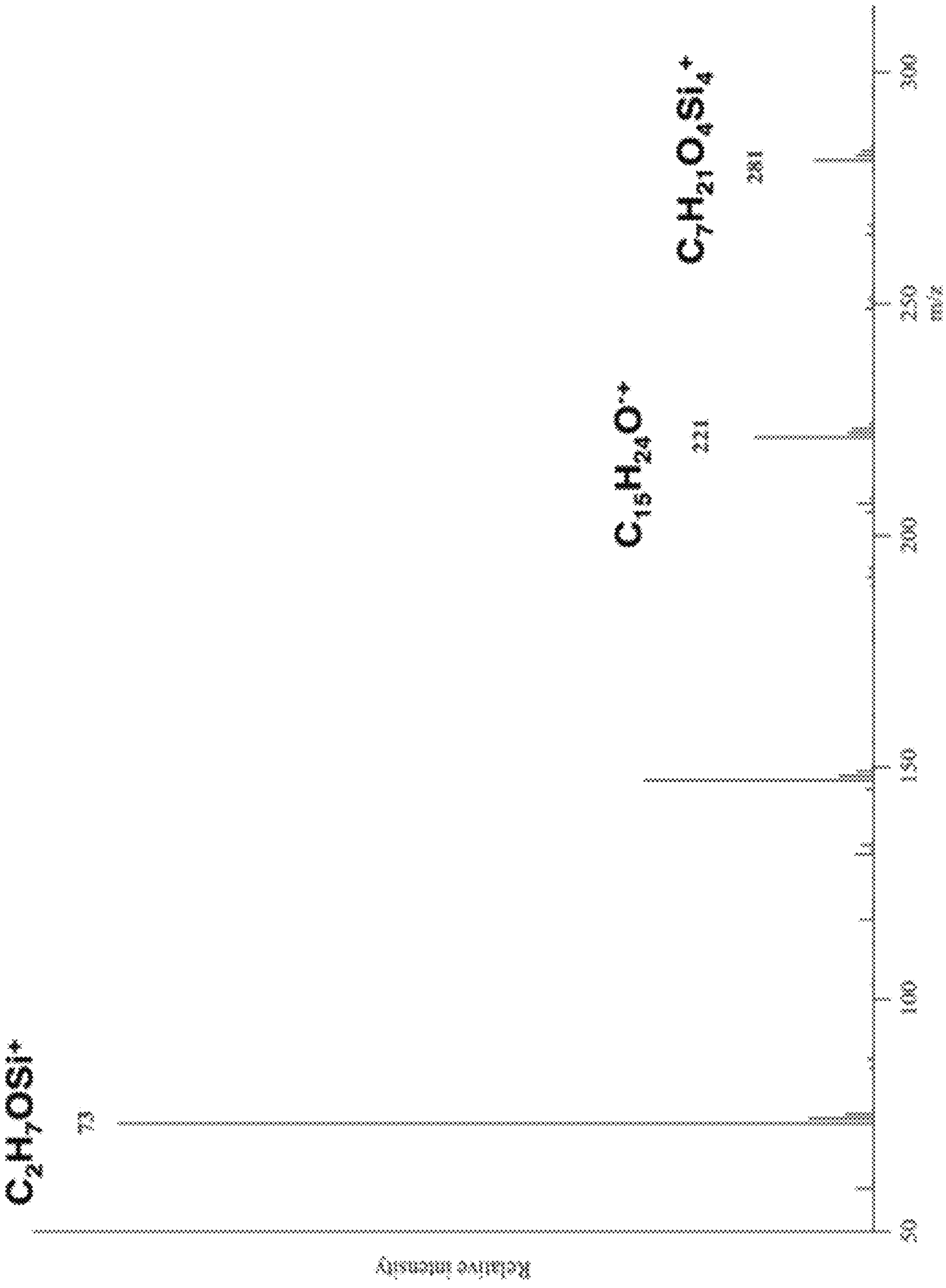
Figure 18A:
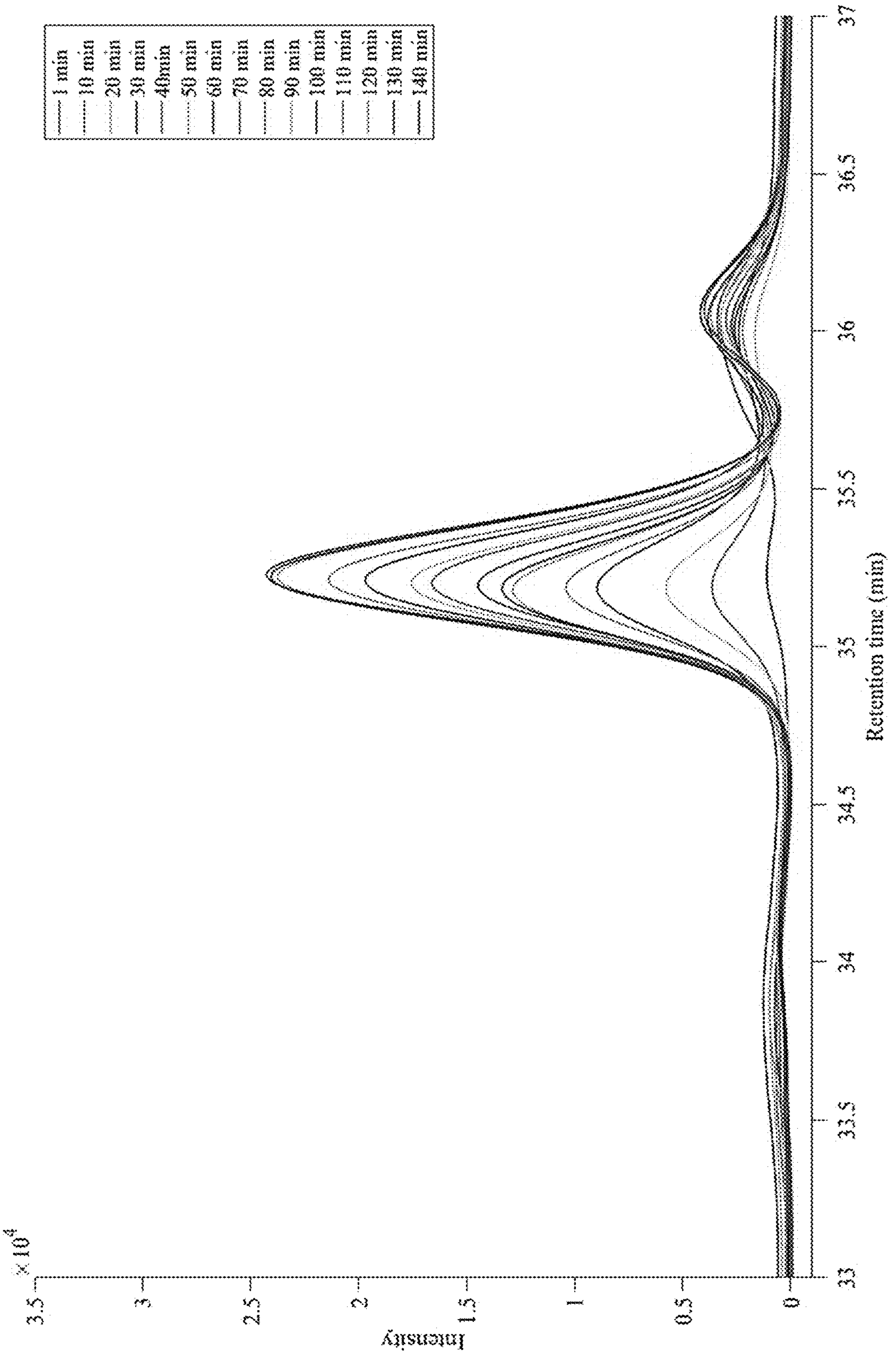
FIGS. 18A-18B: Kinetic study of polydimethylsiloxane (PDMS) 500 Da.
Figure 18B:
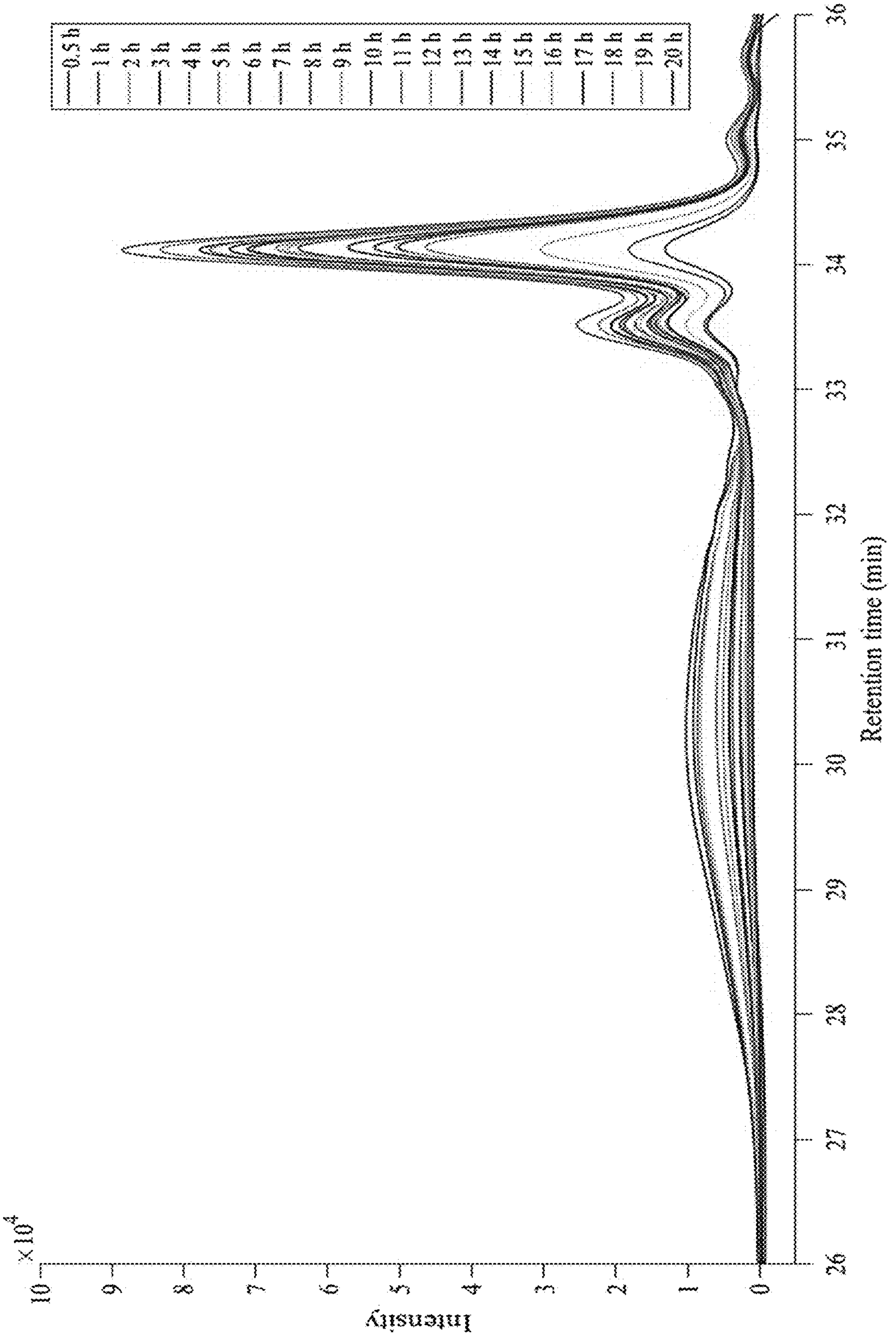

The reaction progress of the 6000 Da vinyl terminated PDMS conversion to cyclics using 200 mL of THF, 0.5 mol % TBAF, and 2 g of starting siloxane was followed by GPC over the first 180 min of reaction (FIG. 6), at which time conversion is at or near completion (see FIG. 18 for 500 Da PDMS and PMPS depolymerization). Even within the first 10 minutes of reaction, substantial depolymerization is observable. After 180 min no polymer is observable by GPC. Each time point was recorded at the point at which quenching with $CaCl_2$ began to stop the process, with samples being run after 1 hour of quenching and then filtering. This is important since the time it takes to run GPC can result in significant additional depolymerization if not quenched.

Commercial Siloxane Polymer Systems

Given the enormous success with the depolymerization of base PDMS polymers, the depolymerization of commercial siloxane systems was evaluated. Sylgard 184, Ecoflex 00-30, Smooth-Sil 950, Dragon Skin 10 FAST, and Ace brand 100% silicone caulk materials were analyzed (Table 3, entry 4-9). Because the exact component ratios of most of these are proprietary and none of these examples dissolve in THF, it was not clear depolymerization would be very effective. The estimated components based on SDS for each of the resins is given in Table 4. Most of these materials contain various cross-linkers besides dimethylsiloxane components, complicating product identification. Despite these complications and insolubilities, it was found that THF was able to swell all of these materials quite readily to allow for solvent and fluoride ions to penetrate at least part way into their structures (100 mg samples). In these materials, visible inspection shows depolymerization with and without stirring over a couple of hours using the optimized conditions above, with solids disappearing into solution. The best performance of the commercial systems was from Elastosil 3003-40AB, which is primarily made up of dimethylsiloxane polymers with cured reactive end groups (FIG. 7, Table 2, entry 9). This depolymerization shows very similar results to those for the base siloxanes studied above.

TABLE 3

| Commercial siloxane depolymerization study | | | | | | | | | |
|---|---|---|---|---|---|---|---|---|---|
| Entry | Polymer | Specimen Size | Solvent | Solvent volume | Catalyst/ TBAF mol % | Total Mass Recovered, mg | Yield of $D_4$/mg | Yield of $D_5$/mg | Yield of $D_6$/mg |
| 4 | Sylgard-184 | 100 mg | THF | 10 mL | 0.5 | 93.3[a] | — | 93.3[a] | — |
| 5 | Ecoflex 00-30 | 100 mg | THF | 10 mL | 0.5 | 91.5[b] | — | — | — |
| 6 | Smooth-Sil 950 | 100 mg | THF | 10 mL | 0.5 | 95.4[b] | — | — | — |

TABLE 3-continued

Commercial siloxane depolymerization study

| Entry | Polymer | Specimen Size | Solvent | Solvent volume | Catalyst/ TBAF mol % | Total Mass Recovered, mg | Yield of $D_4$/mg | Yield of $D_5$/mg | Yield of $D_6$/mg |
|---|---|---|---|---|---|---|---|---|---|
| 7 | Dragon Skin 10 FAST | 100 mg | THF | 10 mL | 0.5 | 90.8 | 59.9 | 23.4 | 7.5 |
| 8 | Ace Brand silicone caulk | 100 mg | THF | 10 mL | 0.5 | 93.6[a] | 4.37 | 87.48 | 1.75 |
| 9 | Wacker Elastosil 3003 | 100 mg | THF | 10 mL | 0.5 | 94.1 | 22.1 | 22.1 | 49.8 |

Reaction conditions: PDMS derivative 100 mg, TBAF 0.5 mol %, THF 10 mL, RT, 24 h, with product ratios determined by $^{29}$Si NMR.
[a] $^{29}$Si NMR was only clear for $D_5$, and other components were not determined.
[b] No clear products observed by $^{29}$Si NMR, only total mass recovered given after depolymerization.

TABLE 4

Commercial silicone product components

| Commercial Product | Chemical components |
|---|---|
| Sylgard | 0.5 wt % xylene,<br>0.2 wt % ethylbenzene,<br>>60 wt % dimethylvinyl-terminated dimethyl siloxane,<br>30 to 60 wt % dimethylvinylated and trimethylated silica<br>1 to 5 wt % tetra(trimethylsiloxy) silane |
| Ace Brand silicone Caulk | (A) 100 parts of a base formulation consisting essentially of an aqueous emulsion having 40 to 60% by weight solids and a pH in the range of about 4 to 6, of a silanol-terminated polydiorganosiloxane having a molecular weight of about $5 \times 10^3$ to about $15 \times 10^3$, and an effective amount of a nonionic surfactant,<br>(B) 0.1 to 5 parts and preferably 0.5 to 1.5 part of a silane cross-linker,<br>(C) 25 to 70 parts of calcium carbonate, and<br>(D) 0.3 to 2 parts and preferably 0.4 to 1.5 part of a stannoxane catalyst |
| EcoFlex 0030 | 100 parts of a vinyl-containing polysiloxane where the vinyl concentration is at least 0.005 mole percent,<br>0.1 parts per million of a platinum catalyst and from 1 to 50 parts based on 100 parts of the vinyl-containing polysiloxane of a hydrogen-containing polysiloxane<br>inhibitor compounds -<br>tertiary butyl hydroperoxide, methylethylketone hydroperoxide, cumene hydroperoxide, 1,1,3,3,-tetramethylbutyl hydroperoxide and 2,5-dimethyl-2,5-dihydroperoxyhexane. |
| Smooth-Sil 950 | Vinyl ends Polydimethylsiloxane (Average chain length about 200, 700-1300 mPas) 63.7 0.0125 0.80<br>Si—H terminal Polydimethylsiloxane, per molecule 2 Si—H, 1 to 50 mPas, chain length 10 to 20 4.6 0.20 0.92<br>Organohydropolysiloxane, 3 Si—H or more per molecule, 20-50 mPas, chain length 20-30 2.4 0.77 1.85<br>Pt-catalyst (Platinum-divinyl tetramethyl-Disiloxane complexes) platinum 15 ppm<br>Hydrophobized silica (BET 300 $m^2$/g) 27.2<br>Divinyltetramethyldisiloxane 0.04 0.01075 0.004<br>α-methacryloyloxymethyl-Trimethoxysilane 2 - Sum SiH/SiVi 3.4 |
| Dragon Skin 10 FAST | Vinyl ends Polydimethylsiloxane 70~1300 mPas, chain length 200100 to 200 mPas,<br>Chain length 100~120 52.5 11.3 0.0042 0.027 0.23 0.31<br>Si—H terminal Polydimethylsiloxane, per molecule 2 Si—H,<br>1 to 50 mPas, chain length 10 to 20 9.0 0.18 1.62<br>Organohydropolysiloxane, 3 Si—H or more per molecule 20-50 mPas, chain length 20-30 20 to 70 mPas, chain length 45 to 60 0.7 1.0 0.77 1.15 0.54 1.15<br>Pt-catalyst (Platinum-divinyl tetramethyl- Disiloxane complexes) platinum 15 ppm<br>Hydrophobized silica (BET 300 $m^2$/g) 23.4 -<br>Divinyltetramethyldisiloxane 0.04 0.01075 0.004 (H) α-methacryloyloxymethyl-<br>Triethoxysilane 2 - Sum SiH/SiVi 6.1 |
| Wacker Elastosil 3003 | 1. Silicon polymer: FD 80(Wacker Chemie GmbH)<br>2. Plasticizer: "Weichmacher 100" (rfacker Chemie GmbH)<br>3. Filler: HDK V 15 (Wacker Chemie GmbH)<br>4. Filler: R 972 (Wacker Chemie GmbH)<br>5. System A: Silicon polymer FD 80 and filler HDK V 15 |

TABLE 4-continued

| Commercial silicone product components | |
|---|---|
| Commercial Product | Chemical components |
| | 6. System 3: Silicon polymer FD 80 and filler R 972<br>7. System C: Sillicon polymer FD 80, Tiller HDK V 15 and plasticizer Weichmacher 100<br>8. System D: Silicon polymer FD 80, filler R 972 and platicizer Weichmacher 100. |

EcoFlex0030, Smooth-Sil 950, and Dragon Skin 10 FAST materials are all platinum cured silicone materials which are similar in chemical components.

Figure 25A:
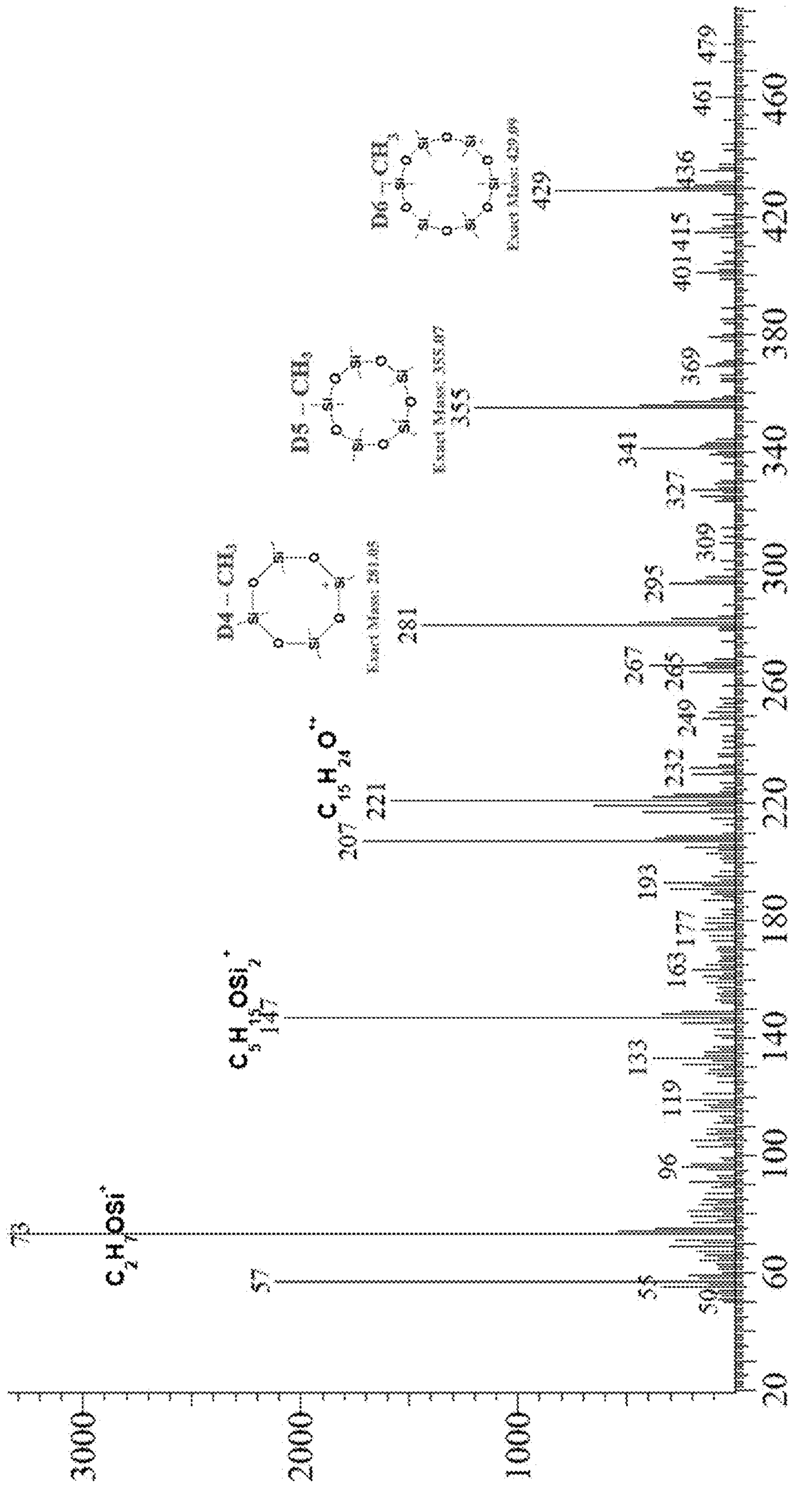
FIGS. 25A-25B: Depolymerization of Dragon Skin 10 FAST example study.
Figure 25B:
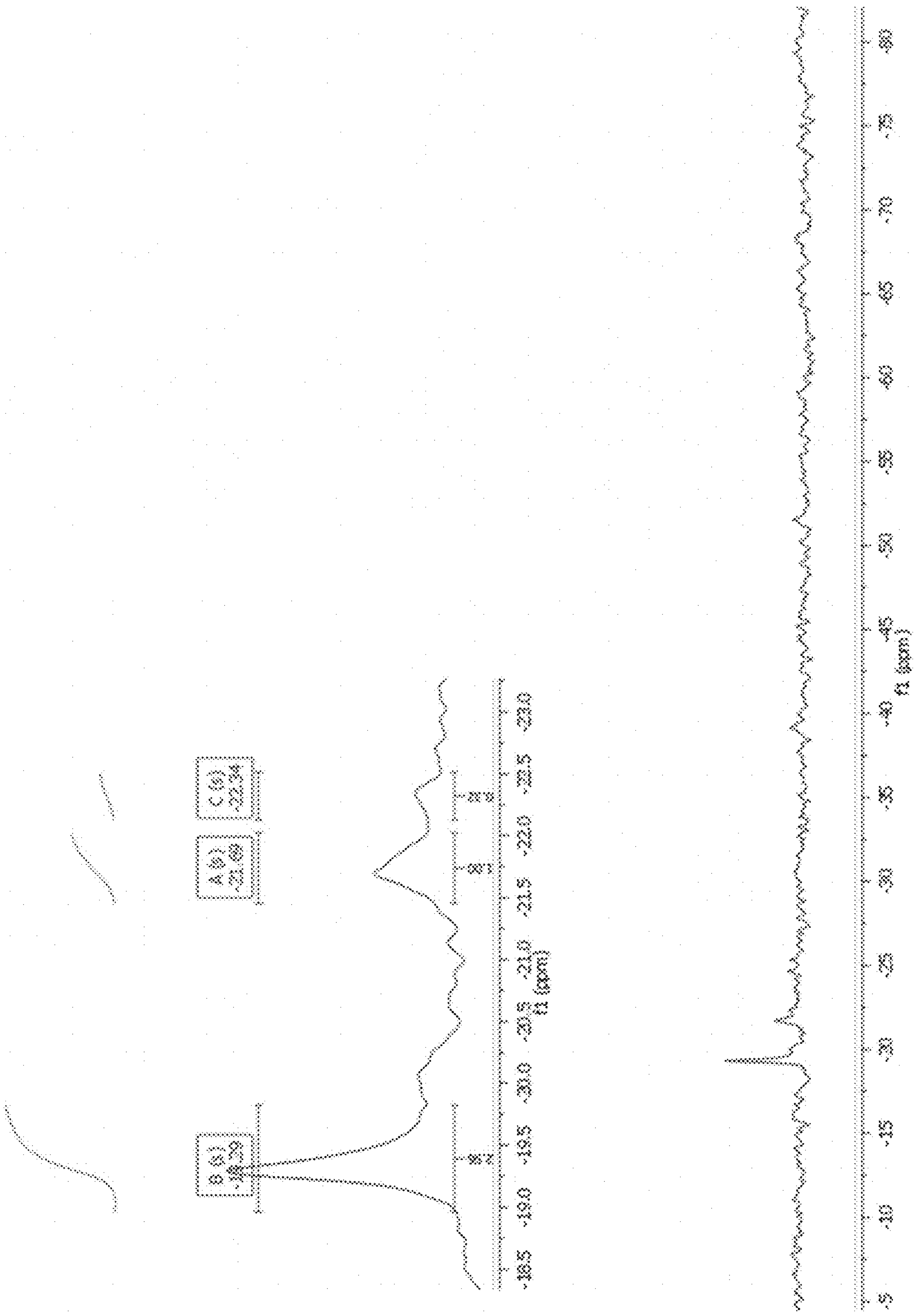
Figure 25C:
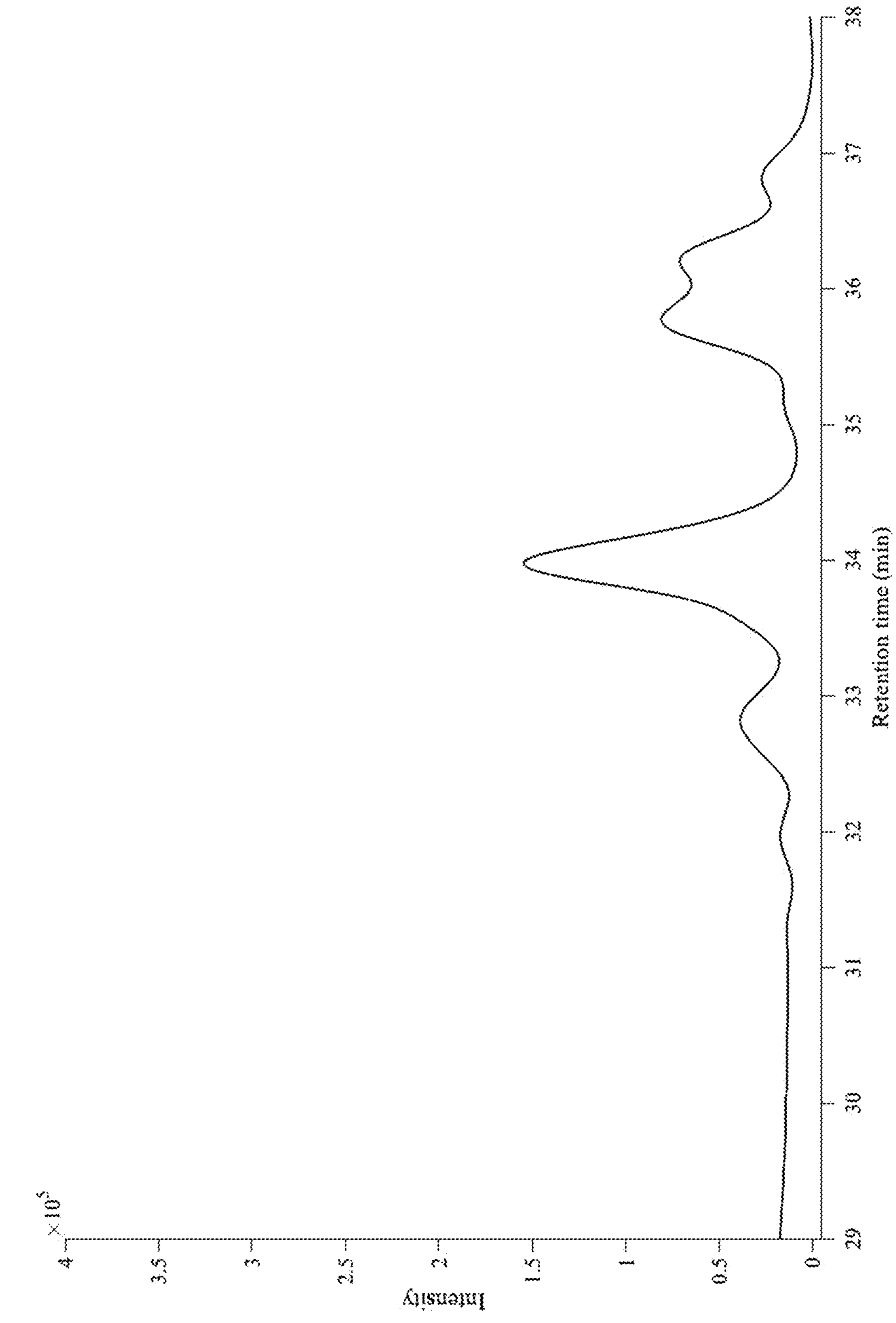
FIG. 25C shows GPC of the Dragon Skin 10 FAST, in which the two main rearrangement peaks can be observed.
Figure 26A:
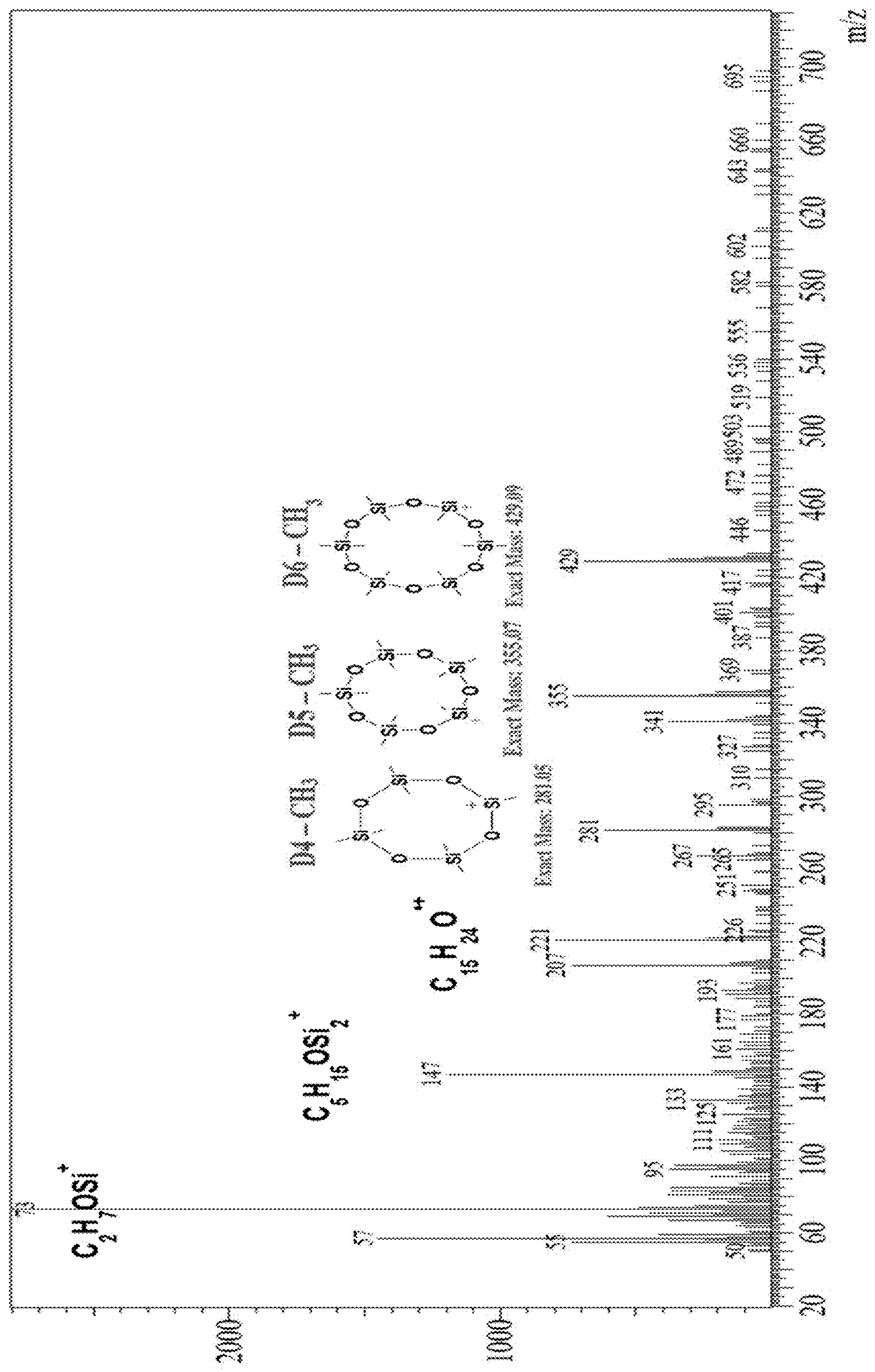
FIGS. 26A-26C: Depolymerization of Ace Silicone Caulk example study.
Figure 26B:
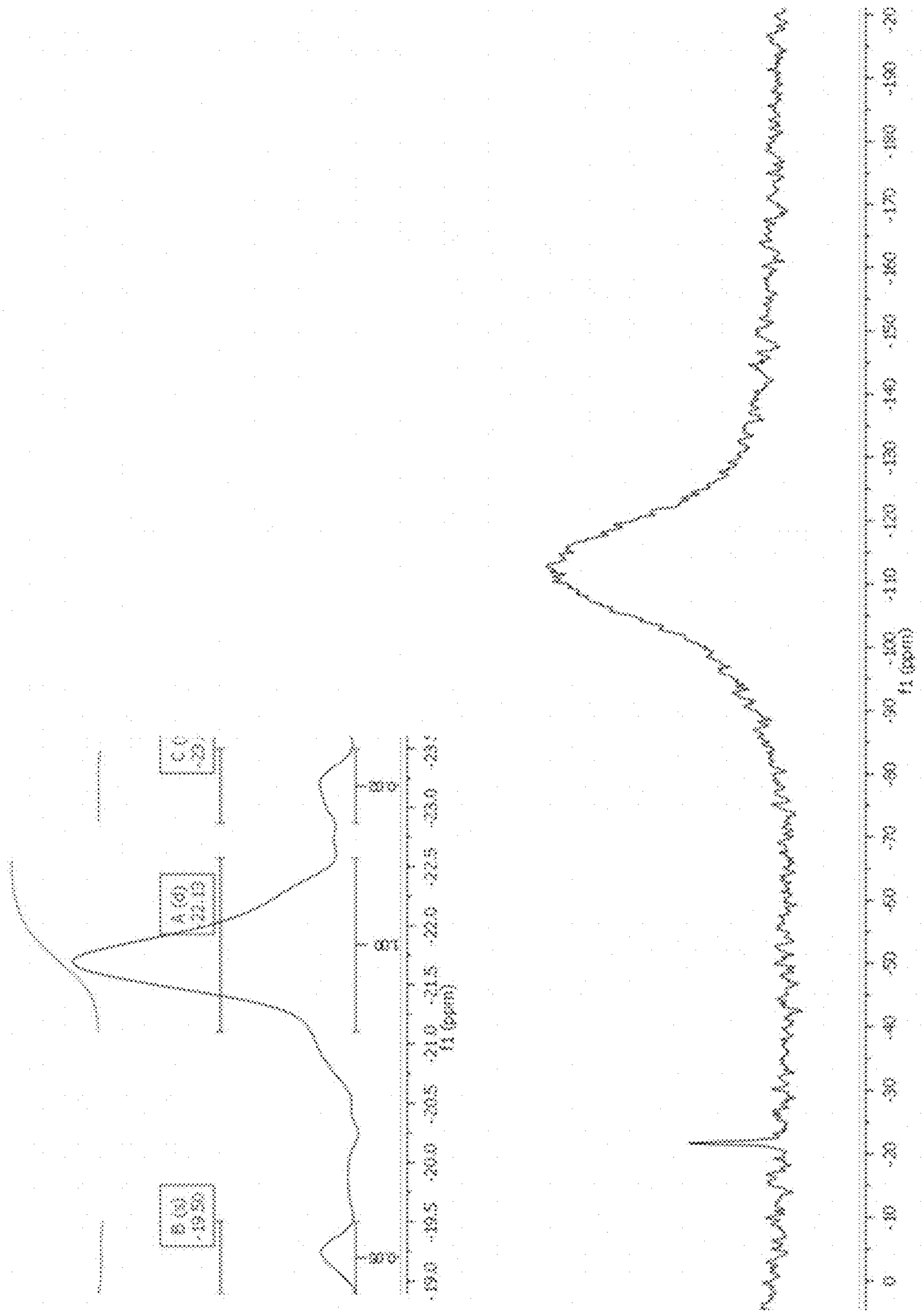
Figure 26C:
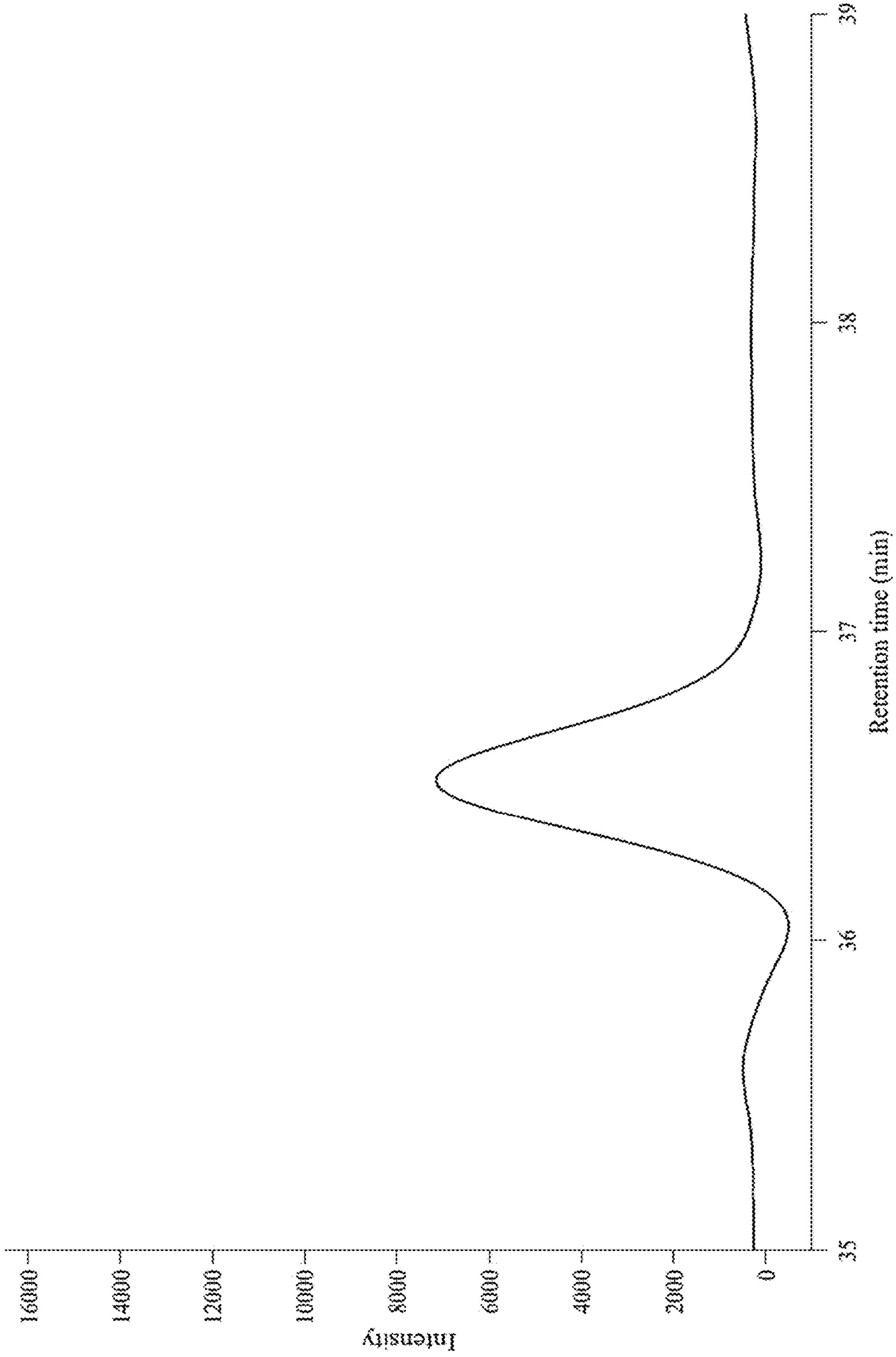
Figure 27A:
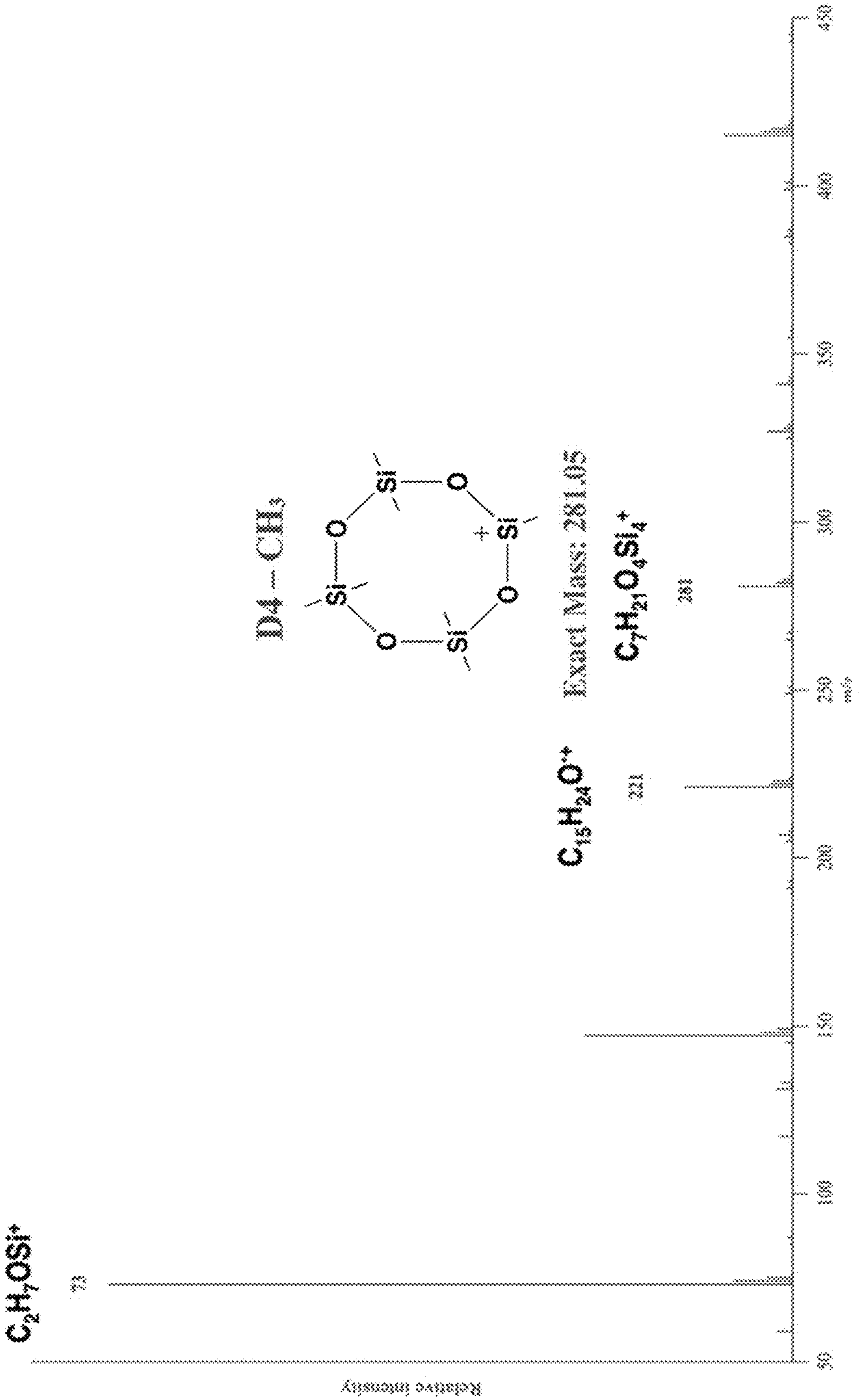
FIGS. 27A-27D: Depolymerization of Silicone rubber sheet from Wacker (Elastosil) example study.
Figure 27B:
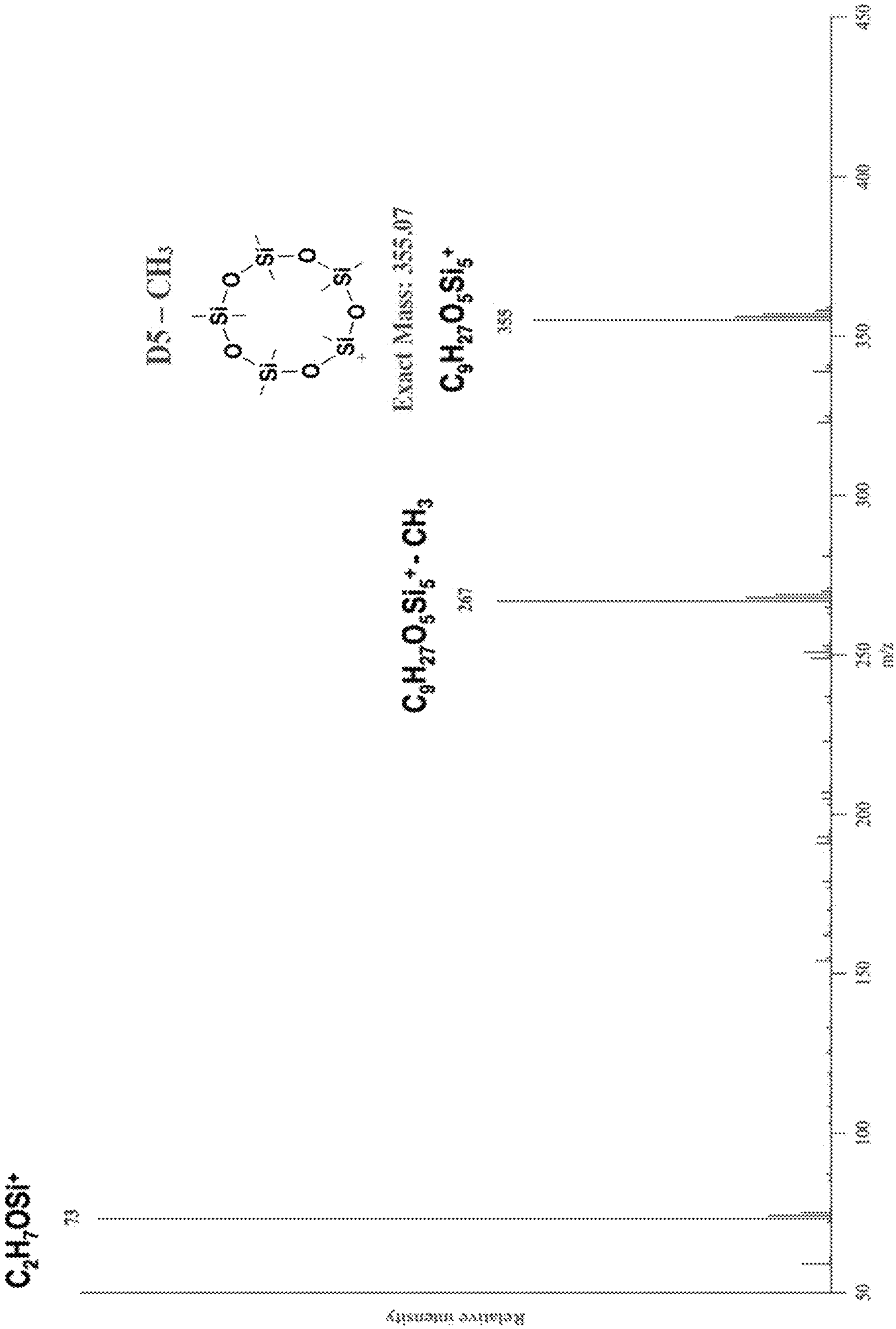
Figure 27C:
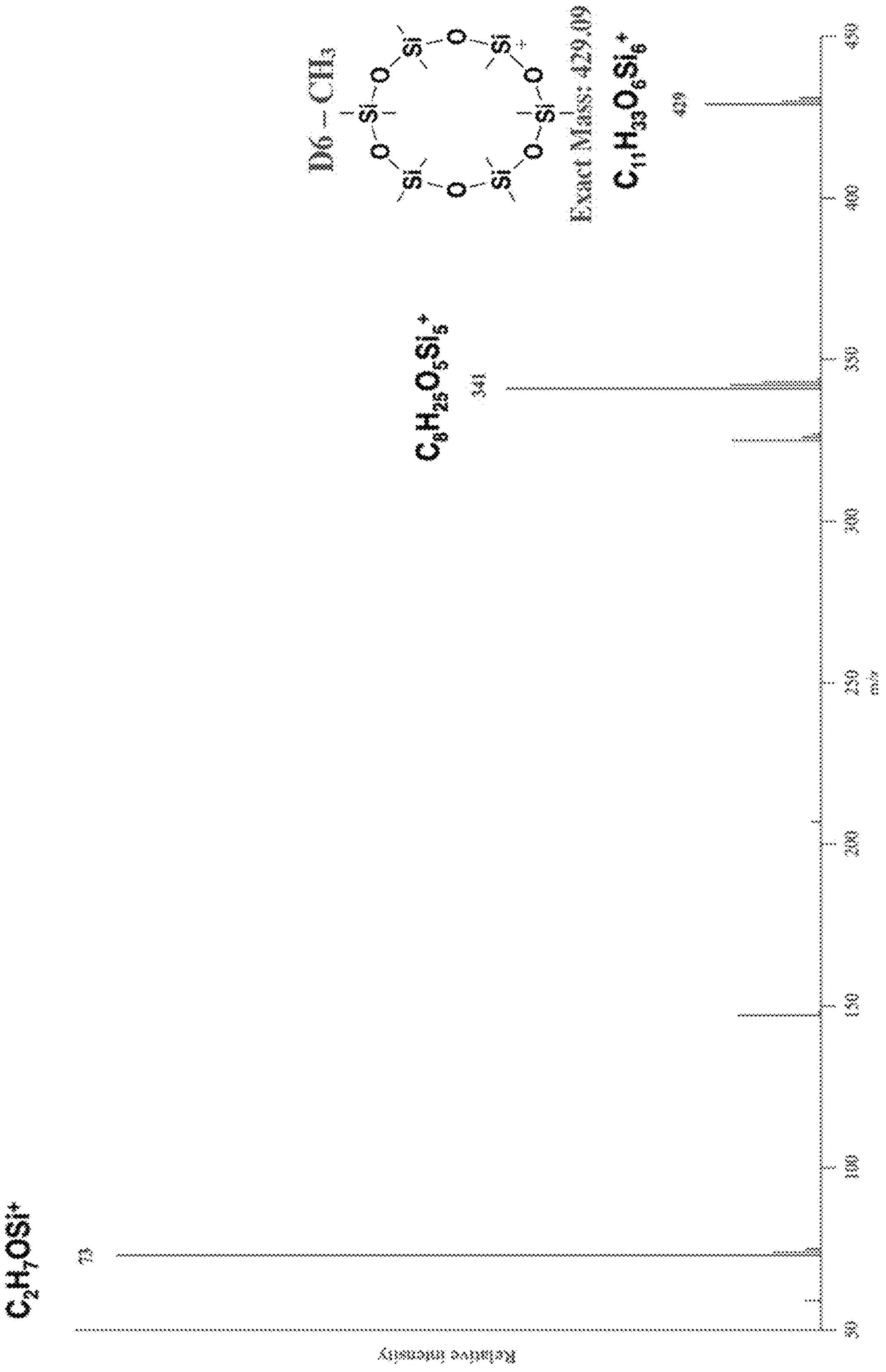
Figure 27D:
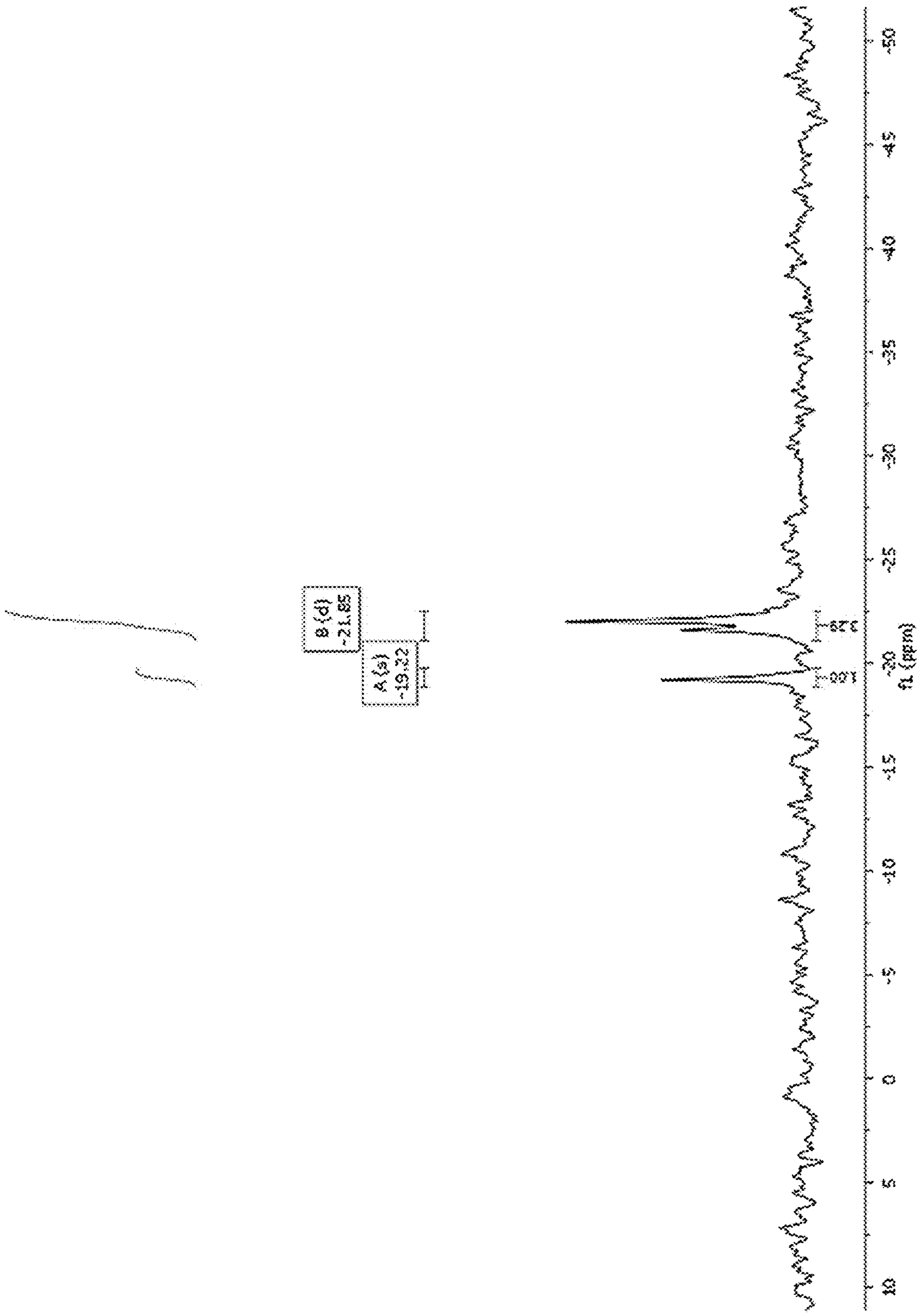

Clear depolymerization to cyclics is also observed in Dragon Skin 10 FAST and Ace brand 100% silicone, and is clearly evidenced by $^{29}$Si NMR and GCMS (FIGS. 25, 26, and Table 3). Dragon Skin 10 FAST strongly favored the formation of $D_4$ and $D_5$ over the $D_6$ system favored in Elastosil. This indicates that a more complex structural reorganization is occurring, where those favoring small rings may have shorter stretches of dimethylsiloxane units. A further complication comes with these types of materials since they often contain combinations of several cross-linkers, stabilizers, fillers, impact modifiers, and pigments. Due to this complexity it would be expected that cyclics could not be identified or would consist of a large array of components, however in most cases the thermodynamic stability and favorability of the desired cyclics comes through. This complexity does add significant hurdles for entries 4, 5, and 6 of Table 3. Each of these commercial resins has a more complex siloxane structure consisting of extensive crosslinking and modifiers. This is especially true of Silgard 184, which contains significant embedded vinyl and H—Si groups. This makes formation of clear cyclic products difficult. However, by GCMS, the products clearly show evidence of cyclic compound formation (FIGS. 22A, 23A, 24A, 25A, 26A, and 27A), even if they could not be observed by $^{29}$Si NMR. Even so, the solids depolymerize rapidly into smaller fragments (including cyclics and other more complex derivatives) and can be repolymerized into new resins.

Repolymerization of the Depolymerization Products of Polydimethylsiloxanes

Figure 8:
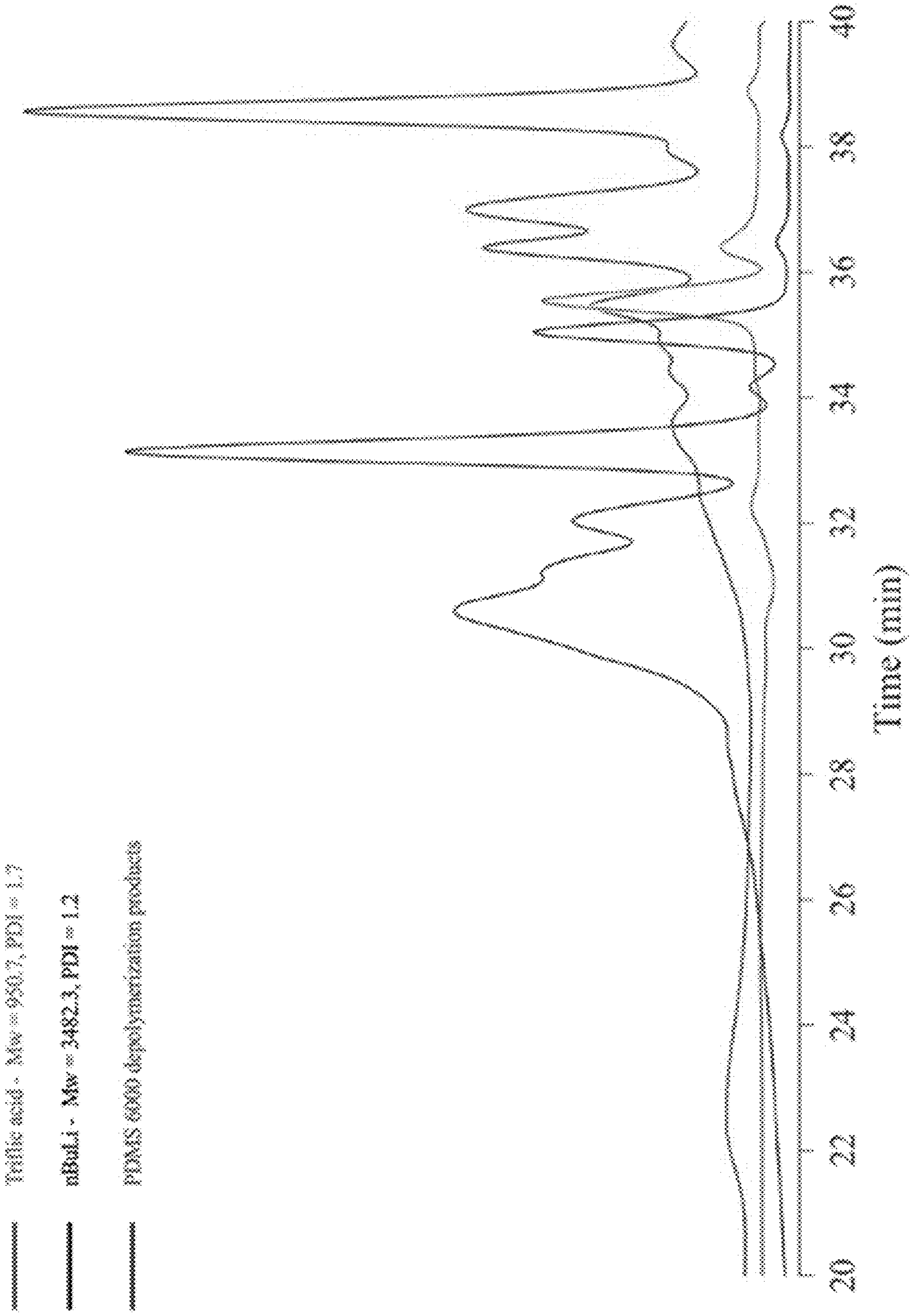
FIG. 8: GPC spectrum representing the repolymerization of the PDMS 6000 (vinyl terminated) depolymerization products (red), using n-BuLi initiation (black) and triflic acid polymerization (blue).
Figure 28:
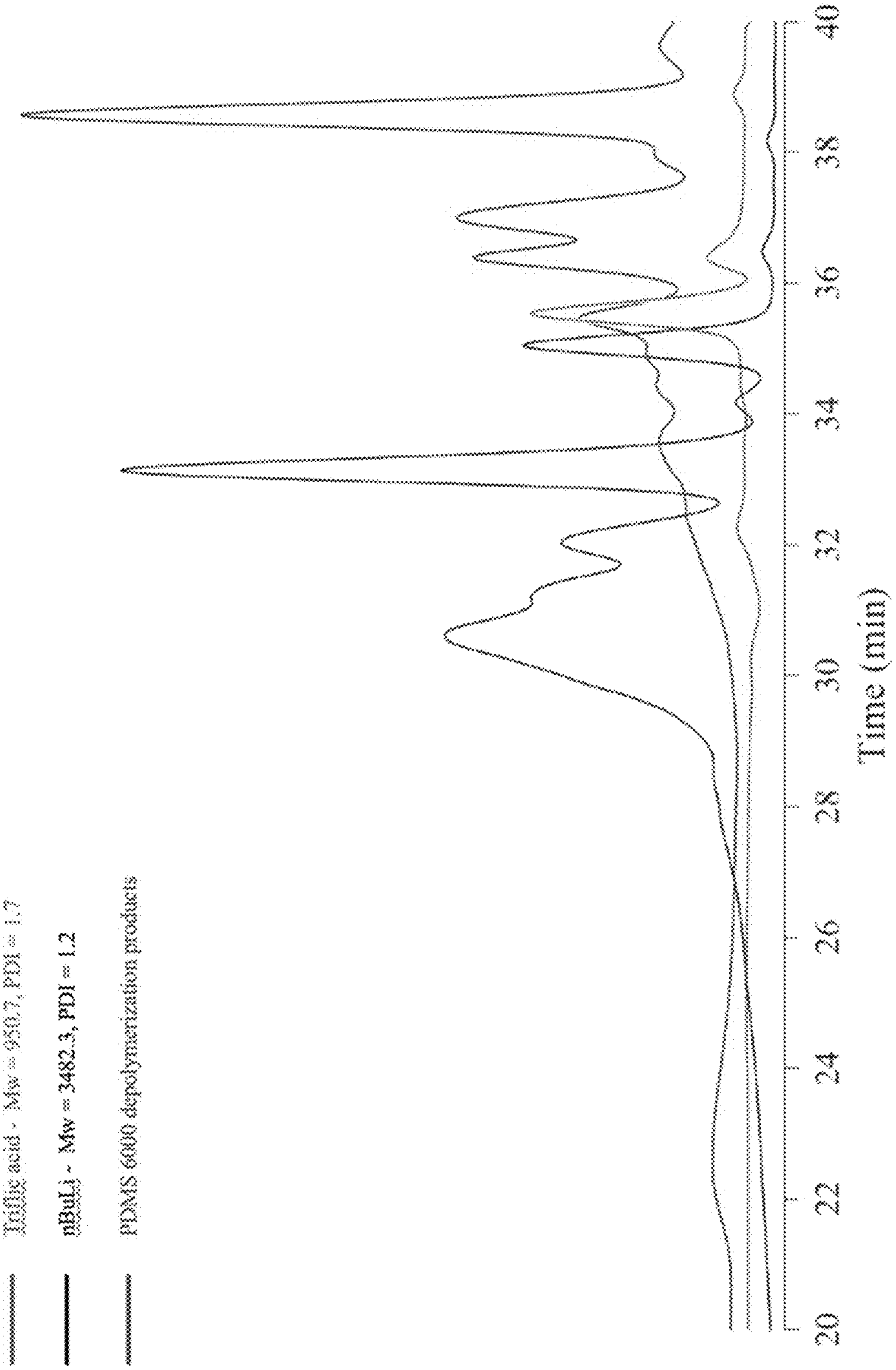
FIG. 28: Repolymerization of polydimethylsiloxane 6000 mw depolymerization products by using nBuLi and Triflic acid.
Figure 29A:
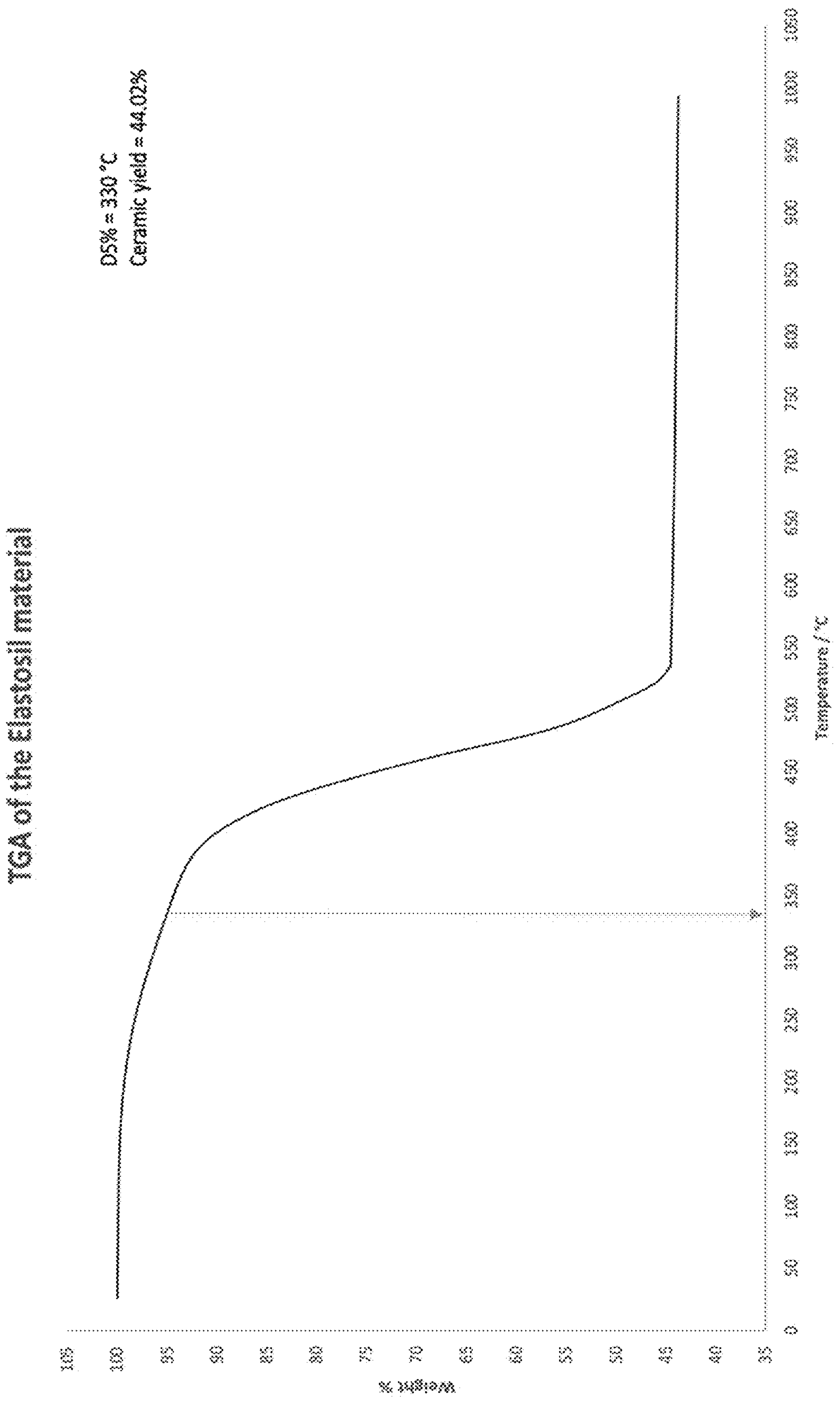
FIGS. 29A-29B: TGA graphs of Elastosil and the Oligomerized Elastosil resin.
Figure 29B:
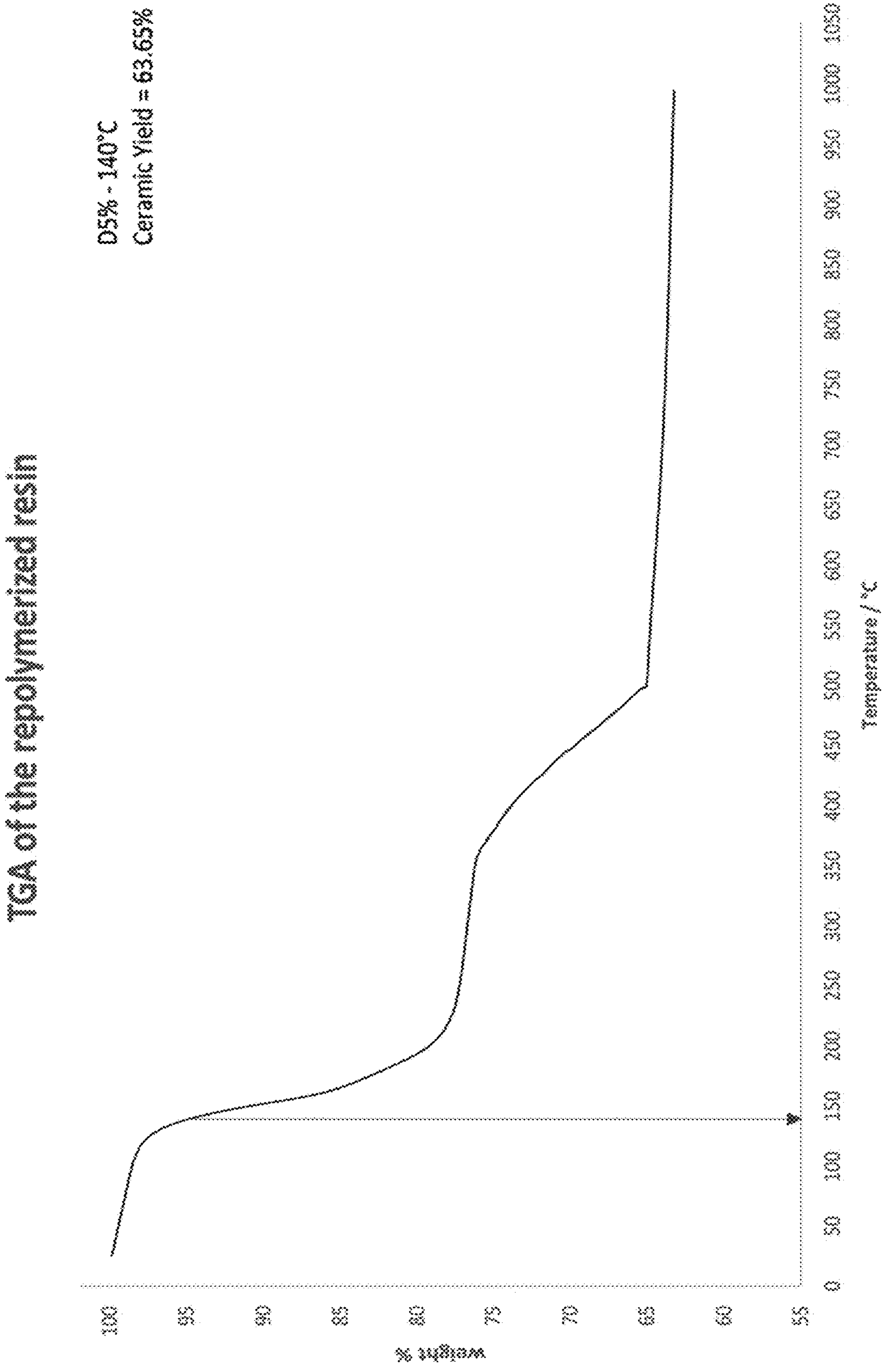
Figure 30A:
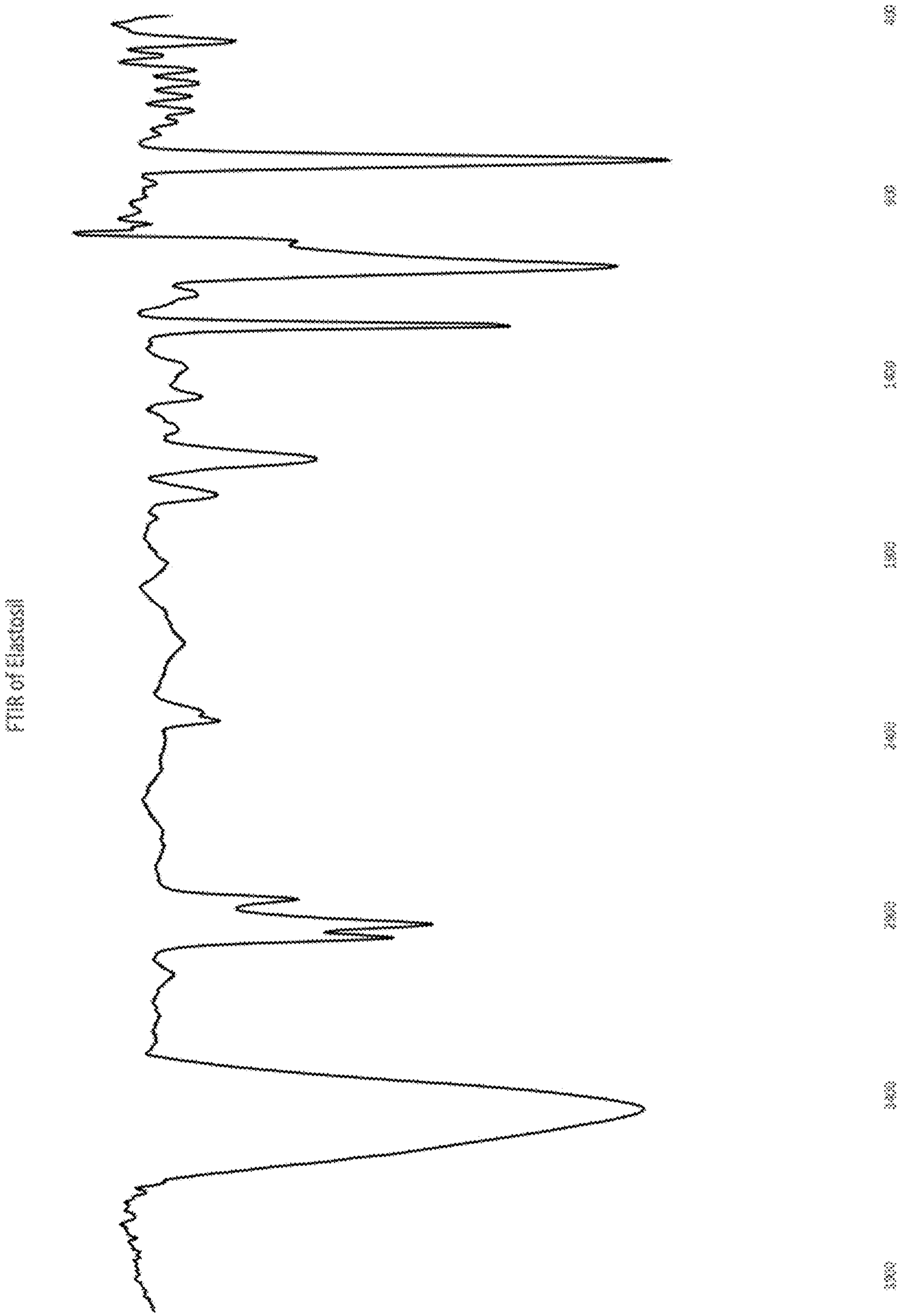
FIGS. 30A-30B: FTIR graphs of Elastosil (FIG. 30A) and the Oligomerized Elastosil resin (FIG. 30B).
Figure 30B:
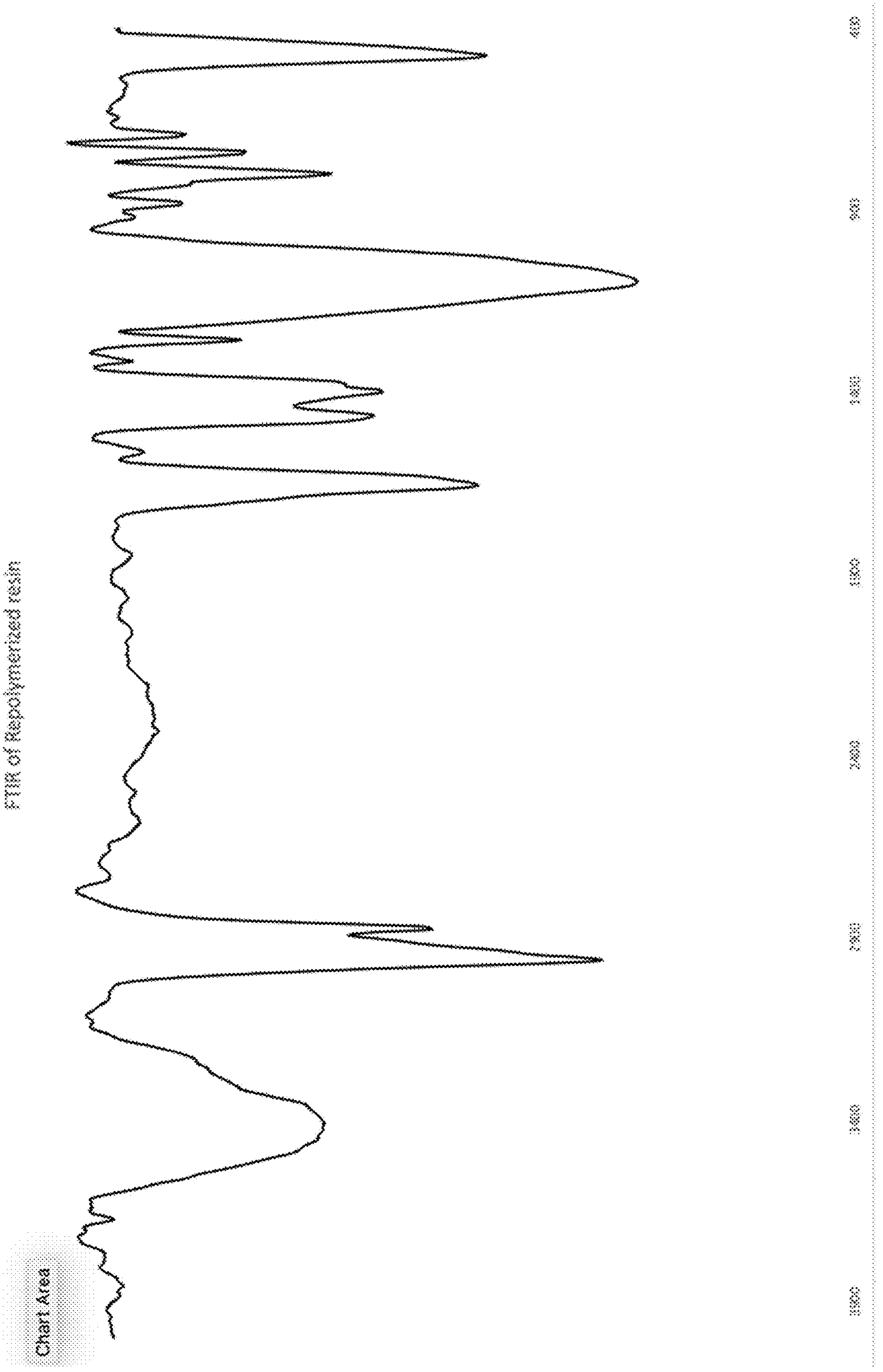

To complete the desired materials cycle, whether the cyclics obtained from depolymerization methods could be repolymerized was evaluated. The products of these reactions could be fractionally distilled to isolate each of the ring sizes as desired, or repolymerized directly as a mixture. It has been demonstrated that the depolymerized materials can be repolymerized simply by three different methods. The resulting spoils from 6000 Da PDMS depolymerization of the polydimethylsiloxane study were treated with n-BuLi for base catalyzed polymerization (see also repolymerization of phenylmethyl cyclics, FIG. 28), triflic acid for acid catalyzed polymerization, and recast without the removal of catalyst for fluoride catalyzed resin formation. The resulting polymers from n-BuLi and triflic acid were characterized by GPC (FIG. 8), and while the Mw values from the crude reactions are lower than the starting siloxanes, polymerization is evident. This showed that going full circle is possible, and polymers can be reformed from the cyclic depolymerization products.

Figure 9:
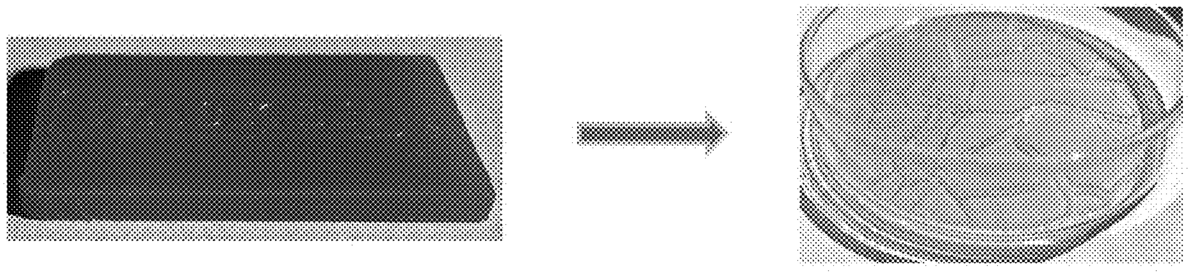
FIG. 9: Elastosil rearrangement or oligomerization after depolymerization with TBAF.

The fluoride catalytic formation of resins was also explored. Since fluoride was already present in the reaction mixture, materials can be made directly from the preformed commercial products. A non-stirred standard condition depolymerization of Elastosil 3003 (FIG. 9) was allowed to simply dry out in the presence of fluoride. Since fluoride was not quenched by $CaCl_2$, concentrating the mixture allowed for fluoride to act as a polymerization catalyst, resulting in a new resin directly. This resin is much stiffer (almost glassy) than the original starting Elastosil. This offers another way to directly depolymerize and possibly reapply directly various siloxanes.

Mechanism

Figure 10:
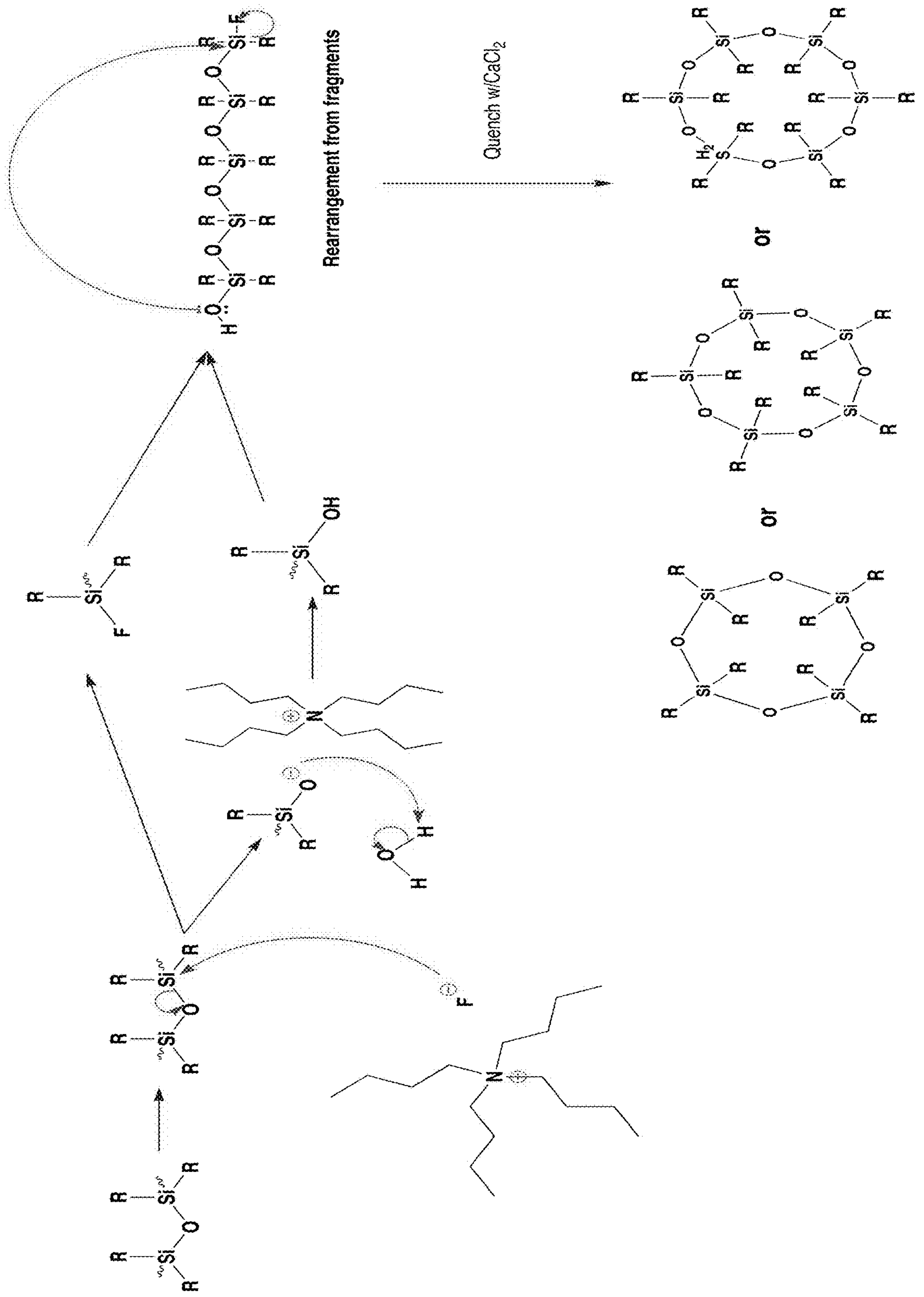
FIG. 10: Scheme 3, showing the mechanism for the depolymerization of polysiloxanes and the formation of cyclic products through a back-biting mechanism. R can be methyl or phenyl group.

The mechanism of depolymerization is similar to that for silsesquioxane cage scrambling. An abbreviated schematic of a synthetic process is depicted in FIG. 10. In silsesquioxane scrambling, for example, fluoride must attach directly to the cage in order to activate the silicon for future attack by water or other oxygen present within a structure in the reaction. In this case, without wishing to be bound by theory, it is believed that this process starts the same way and that the fluoride likely initiates at either a chain end or in the middle, followed by back biting to form cyclics or breakdown to smaller fragments that then reassemble. In the mechanism of silsesquioxane rearrangement there is no clear evidence for complete structural breakdown, and instead only a few small fragments must "exchange" between structures. This would account for why $D_5$ scrambles to a mixture of cyclic sizes and may also be the case for fluoride catalyzed PDMS depolymerization. To reach the final structures without further scrambling or polymerization upon removal of solvent, the reaction is quenched so that all remaining fluoride ions are scavenged, effectively stopping the depolymerization process.

Conclusion

A simple and efficient room temperature process that allows for the depolymerization and subsequent recycling of many commercial siloxanes and their resin counterparts to cyclic starting materials of 4, 5, and 6 membered rings has been described. This process is most efficient using THF and fluoride ions, due to the high swelling nature of the solvent and catalytic reorganization of Si—O bonds using fluoride. The method is very efficient, with full depolymerization at room temperature within 120 min. The methodology can also be used to depolymerize a series of commercial cross-linked resins. The resulting cyclics were then successfully repolymerized using acid and base catalysis to reform polymeric siloxanes, as well as fluoride catalyzed formation of resins. A mechanism derived from silsesquioxane chemistry was put forth. This industrially feasible process allows for the recyclability of silicone resins used in many consumer products and industries, enabling a better end of life outcome through rebirth.

Experimental

General

All the materials were purchased from reputable chemical companies and used without further purification steps. Tetrabutylammonium fluoride (TBAF) solution 1M THF Sure Seal was purchased from Acros Organics, polydimethylsiloxanes ($D_5$, 500 and 6000 Da), and polymethylphenylsiloxane, were received from Gelest and Alfa Aesar, respectively. The silicone resins were obtained from commercial sources including Ecoflex 00-30, Smooth-Sil 950, and Dragon Skin 10 FAST from Smooth-On Inc., 100% silicone caulk from Ace Hardware, and cured silicone rubber sheet (thickness 0.2) was obtained from Wacker Chemical Co. (Elastosil 3000-40AB).

The products were identified by GC-MS and quantitatively analyzed by gas chromatography. GC-MS measurements were carried out on a Shimadzu GC-2010 gas chromatograph (30 m ZB-5 ms column, 60-350° C.) linked with a Shimadzu GCMA-QP 2010 Plus mass spectrometer. Matrix Assisted Laser Desorption Ionization (MALDI) measurements were obtained on a Bruker Daltronics Omniflex using dithranol (DIT) as the calibration matrix. The reactant silicones and products were compared using gel permeation chromatography (GPC). The analytical GPC measurements were carried out on a Shimadzu CTO-10A VP and Styrogel column (7.8×300 mm HR 0.5) in THF at 30° C. $^1H$, $^{13}C\{^1H\}$ and $^{29}Si\{^1H\}$NMR spectra were recorded on a Bruker Avance 300 spectrometer ($^1H$: 300 MHz; $^{13}C$: 75.468 MHz; $^{29}Si$: 59.6 MHz) using the proton signals of the deuterated solvents as reference.

General Procedure for the Depolymerization of the Polysiloxanes

A polysiloxane polymer (100 mg), 10 mL of tetrahydrofuran (THF) solvent, and tetrabutylammonium fluoride (TBAF) (0.5 mol %, as based on the polymer size) were placed in a closed flask. The flask was closed to prevent the evaporation of the solvent. The mixture was stirred at room temperature for 24 hour, quenched with 1 g $CaCl_2$ for 2 hours, and filtered, and solvent was removed under reduced pressure. The products were analyzed by GPC, GCMS or MALDI, and $^{29}Si\{^1H\}$NMR. The yield and quality of the products were determined by NMR spectroscopy. The products were not isolated from each other, but are distillable. The yield and quality of the products were determined by $^{29}Si$ NMR spectroscopy peak intensity and absolute yield of the products by weight. Refer to tables for exact conditions.

Repolymerization of the Depolymerized Polydimethylsiloxane Products

Using nBuLi

In this experiment, a percentage averaged molecular weight of 324.58 g/mol was used for the 3 cyclic products received from the starting PDMS 6000 material (67% of $D_4$, 28% of $D_5$, and 5% of $D_6$ products were received after the depolymerization). nBuLi 0.5% mol percentage was used for 100 mg of the polydimethylsiloxane (6000 Da) products with dry THF solvent, and was reacted at room temperature for 24 hrs under Argon conditions. Chlorotrimethylsilane (TMSCl) was used as the quencher at the same mol percent as nBuLi. Final polymers were analyzed by GPC, Mw≈3480 Da, PDI 1.2.

Using Triflic Acid

A percentage averaged molecular weight of 324.58 g/mol was used for the 3 cyclic products received from the starting PDMS 6000 material (67% of $D_4$, 28% of $D_5$, and 5% of $D_6$ products were received after the depolymerization). Triflic acid 0.5% mol percentage was used for 100 mg of the polydimethylsiloxane (6000 Da) products with dry THF solvent, and was reacted room temperature for 24 hrs under Argon conditions. Chlorotrimethylsilane (TMSCl) was used as the quencher at the same mol percent as triflic acid initiator. Final polymers were analyzed by GPC, Mw≈3480 Da, PDI 1.2.

Certain embodiments of the methods disclosed herein are defined in the above examples. It should be understood that these examples, while indicating particular embodiments of the invention, are given by way of illustration only. From the above discussion and these examples, one skilled in the art can ascertain the essential characteristics of this disclosure, and without departing from the spirit and scope thereof, can make various changes and modifications to adapt the methods described herein to various usages and conditions. Various changes may be made and equivalents may be substituted for elements thereof without departing from the essential scope of the disclosure. In addition, many modifications may be made to adapt a particular situation or material to the teachings of the disclosure without departing from the essential scope thereof.

What is claimed is:

1. A method of depolymerizing a siloxane polymer, the method comprising:

immersing the siloxane polymer in a solvent;

incorporating a source of fluoride into the solvent;

allowing a reaction between the fluoride and the siloxane polymer to cause rearrangement of the siloxane polymer into a cyclic monomer;

quenching the reaction to prevent repolymerization of the cyclic monomer; and recovering the cyclic monomer.

2. The method of claim 1, wherein the source of fluoride comprises an ionic liquid.

3. The method of claim 1, wherein the source of fluoride comprises tetrabutylammonium fluoride (TBAF), hydrogen fluoride, ammonium fluorides, hydrogen dialkylammonium fluoride ($NR_2H_2F$), hydrogen trifluoride ammonium ($NR_3$ ($_3$HF)), an alkali metal salt, an alkaline earth metal salt, alkyl hydrogen fluoride, hydrogen dialkylammonium fluoride, 1-fluoro-4-chloromethyl-1,4-diazoniabicyclo[2.2.2]octane bis(tetrafluoroborate), N,N'-difluoro-2,2'-bipyridinium bis (tetrafluoroborate), diethylaminosulfur trifluoride (DAST), $R_aR_bN$-$CF_2$-$R_c$ where $R_a$ is hydrogen or alkyl and $R_b$ and $R_c$ are each selected from alkyl or aryl, 1-fluoro-4-chloromethyl-1,4-diazoniabicyclo[2.2.2]octane bis(tetrafluoroborate), or a combination thereof.

4. The method of claim 1, wherein the quenching comprises adding a salt to the solvent and stirring for at least about 30 minutes.

5. The method of claim 4, wherein the salt is a chloride salt.

6. The method of claim 4, wherein the salt comprises $CaCl_2$), AgCl, NaCl, KCl, chlorotrimethylsilane (TMSCI), or a combination thereof.

7. The method of claim 4, wherein the salt comprises chlorotrimethylsilane (TMSCI).

8. The method of claim 1, wherein the quenching comprises an aqueous wash, wherein the aqueous wash comprises adding water to the solvent to form two phases.

9. The method of claim 1, wherein the quenching comprises scavenging remaining fluoride ions and stopping the depolymerization.

10. The method of claim 1, wherein the reaction is at room temperature.

11. The method of claim 1, wherein the reaction is at a temperature ranging from about 0° C. to about 110° C.

12. The method of claim 1, wherein the source of fluoride is incorporated into the solvent prior to immersing the siloxane polymer in the solvent.

13. The method of claim 1, wherein the source of fluoride is incorporated into the solvent after immersing the siloxane polymer in the solvent.

14. The method of claim 1, wherein the siloxane polymer is a siloxane polymer comprising a siloxy group that is methyl terminated, hydroxide terminated, vinyl terminated, or hydride terminated.

15. The method of claim 1, wherein the siloxane polymer is a siloxane polymer having a structure of $R(CH_3)SiO[(CH_3)_2SiO]_x[(R^1)(R^2)SiO]_ySi(CH_3)_2R$, where R, $R^1$, and $R^2$ are identical or different.

16. The method of claim 1, wherein the siloxane polymer is a siloxane polymer having one of the following D units:

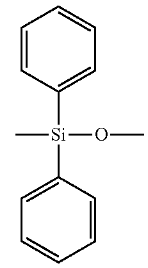 ; 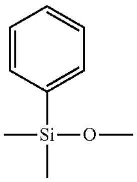 ; 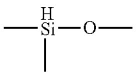 ;

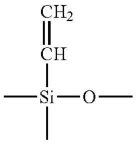 ; 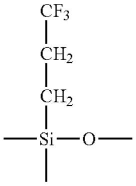 ; or 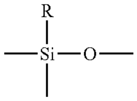 , wherein R is a C2-C14 alkyl.

17. The method of claim 1, wherein the cyclic monomer has one of Formula II, Formula III, or Formula IV:

Formula II

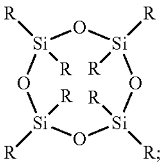

Formula III

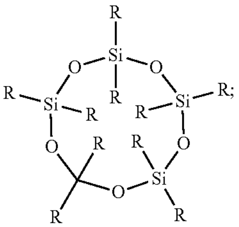

or

Formula IV

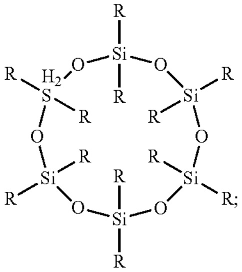

wherein each R is, independently, H or any organic group.

18. The method of claim 1, wherein the siloxane polymer comprises polydimethylsiloxane (PDMS), phenylmethylsiloxane (PMPS), or polydiphenylsiloxane.

19. The method of claim 1, wherein the cyclic monomer comprises $D_4$, $D_5$, $D_6$, $D^{Ph}_4$, or $D^{Ph}_5$:

$D_4$

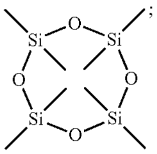

$D_5$

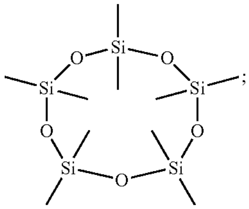

$D_6$

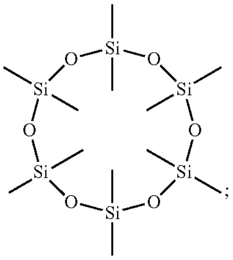

$D^{Ph}_4$

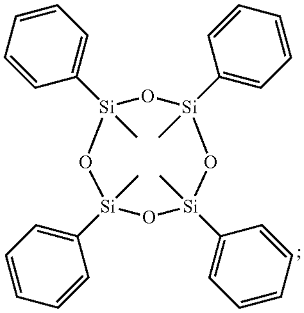

; or $D^{Ph}_5$

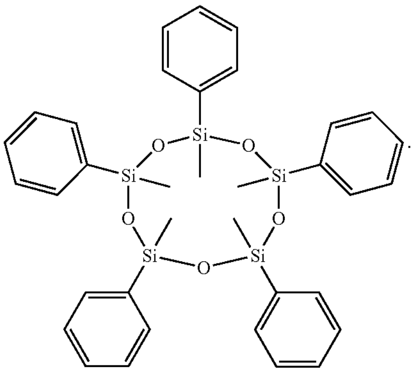

20. The method of claim 1, wherein the reaction is allowed to proceed for at least about 20 minutes before the quenching.

21. The method of claim 1, further comprising repolymerizing the cyclic monomer.

22. The method of claim 1, wherein the source of fluoride is incorporated into the solvent in an amount of up to about 2 mol %.

23. A method of recycling a material comprising silicone and a second substance, the method comprising:

immersing the silicone in a solvent;

incorporating a source of fluoride into the solvent;

allowing a reaction between the fluoride and the silicone to cause rearrangement of a siloxane polymer into a cyclic monomer, thereby dissolving the silicone off of the second substance;

quenching the reaction to prevent repolymerization of the cyclic monomer, wherein the quenching comprises either (i) adding a salt to the reaction and stirring for a period of time, or (ii) separating the reaction into two layers with an aqueous wash and thereby cause remaining fluoride ions to enter an aqueous phase while the siloxane polymer remains in an organic phase; and separating the second substance from the solvent containing the cyclic monomer.

24. The method of claim 23, wherein the reaction is at room temperature.

25. The method of claim 1, wherein the source of fluoride comprises hydrogen fluoride, an alkali metal salt, an alkaline earth metal salt, alkyl hydrogen fluoride, 1-fluoro-4-chloromethyl-1,4-diazoniabicyclo[2.2.2]octane bis(tetrafluoroborate), N,N'-difluoro-2,2'-bipyridinium bis(tetrafluoroborate), diethylaminosulfur trifluoride (DAST), $R_aR_bN-CF_2-R_c$ where $R_a$ is hydrogen or alkyl and $R_b$ and $R_c$ are each selected from alkyl or aryl, 1-fluoro-4-chloromethyl-1,4-diazoniabicyclo[2.2.2]octane bis(tetrafluoroborate), or a combination thereof.

26. The method of claim 23, wherein the source of fluoride comprises hydrogen fluoride, an alkali metal salt, an alkaline earth metal salt, alkyl hydrogen fluoride, 1-fluoro-4-chloromethyl-1,4-diazoniabicyclo[2.2.2]octane bis(tetrafluoroborate), N,N'-difluoro-2,2'-bipyridinium bis(tetrafluoroborate), diethylaminosulfur trifluoride (DAST), $R_aR_bN-CF_2-R_c$ where $R_a$ is hydrogen or alkyl and $R_b$ and $R_c$ are each selected from alkyl or aryl, 1-fluoro-4-chloromethyl-1,4-diazoniabicyclo[2.2.2]octane bis(tetrafluoroborate), or a combination thereof.

27. The method of claim 1, further comprising recovering a linear siloxane.

28. The method of claim 1, further comprising recovering a silanone.

* * * * *